(12) United States Patent
Ishiguro et al.

(10) Patent No.: US 7,708,305 B2
(45) Date of Patent: May 4, 2010

(54) AIRBAG APPARATUS

(75) Inventors: Naohiko Ishiguro, Aichi-ken (JP); Michihisa Asaoka, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 336 days.

(21) Appl. No.: 11/806,341

(22) Filed: May 31, 2007

(65) Prior Publication Data

US 2007/0278774 A1 Dec. 6, 2007

(30) Foreign Application Priority Data

| Jun. 2, 2006 | (JP) | ............................ 2006-155170 |
| Nov. 1, 2006 | (JP) | ............................ 2006-298067 |
| Apr. 2, 2007 | (JP) | ............................ 2007-096769 |
| May 7, 2007 | (JP) | ............................ 2007-122820 |

(51) Int. Cl.
*B60R 21/233* (2006.01)

(52) U.S. Cl. .................... 280/729; 280/742; 280/743.2

(58) Field of Classification Search ................ 280/740, 280/743.2, 742, 729
See application file for complete search history.

(56) References Cited

U.S. PATENT DOCUMENTS

| 2003/0006596 A1 | 1/2003 | Schneider et al. |
| 2006/0006633 A1 * | 1/2006 | Bito ........................... 280/740 |
| 2007/0278774 A1 * | 12/2007 | Ishiguro et al. ............. 280/740 |

FOREIGN PATENT DOCUMENTS

| EP | 0 657 329 A1 | 9/1994 |
| GB | 2 331 049 A | 11/1997 |
| JP | 9-220995 | 8/1997 |
| JP | 2001-080440 | 3/2001 |
| JP | 2002-254999 | 9/2002 |

* cited by examiner

*Primary Examiner*—Paul N Dickson
*Assistant Examiner*—Karen Jane J Amores
(74) *Attorney, Agent, or Firm*—Posz Law Group, PLC

(57) ABSTRACT

The airbag apparatus includes an airbag folded and housed in a housing. The airbag includes an outer bag constituting an outer wall of the airbag and an inner bag disposed inside the outer bag. The inner bag includes an outlet port supplying inflation gas into the outer bag and an arm inflatable into a tapered bag contour. The arm holds down a peripheral defected region of the outer bag defected from the housing onto a top plane of a ring of a steering wheel all the while that the inner bag remains completely inflated at the operation of the airbag apparatus.

16 Claims, 34 Drawing Sheets

End view taken along VIII-VIII

AIRBAG APPARATUS

The present application claims priority from Japanese Patent Application No. 2006-155170 of Ishiguro, filed on Jun. 2, 2006, Japanese Patent Application No. 2006-298067 of Ishiguro et al., filed on Nov. 1, 2006, Japanese Patent Application No. 2007-096769 of Ishiguro, filed on Apr. 2, 2007, and Japanese Patent Application No. 2007-122820 of Ishiguro, filed on May 7, 2007, the disclosures of which are hereby incorporated into the present application by reference.

BACKGROUND OF THE INVENTION

1. Field of the Invention

The present invention relates to an airbag apparatus mountable on a vehicle and including an airbag inflatable with inflation gas and protruding from a housing where the airbag was folded and housed. More particularly, the present invention relates to an airbag apparatus whose airbag includes an outer bag and an inner bag disposed inside the outer bag, and which is suitably used for a steering wheel or a front passenger's seat.

2. Description of Related Art

A conventional airbag apparatus mountable on a vehicle includes an airbag inflatable with inflation gas and protruding from a housing where the airbag was folded and housed. As shown in JP 9-220995 A and in JP 2001-080440 A, such an airbag is attached to the housing at a periphery of its opening for admitting inflation gas. The airbag includes an outer bag constituting an outer wall of the airbag and an inner bag disposed inside the outer bag over the inlet opening. The inner bag is provided with an outlet port for allowing the inflation gas fed from the inlet opening to flow out into the outer bag.

The outlet port of the inner bag is used to redirect the inflation gas flowing out into the outer bag in order to control an inflated contour of the outer bag from the initial stage until the completion of inflation. For example, the outlet port is used to control the contour of the outer bag such that the deployment of the outer bag to an abdomen of a driver is promoted. That is, the inner bag of the airbag helps redirect the inflation gas flowing out into the outer bag.

However, there has been a room for improvement in conventional airbag apparatuses in inflating the outer bag without allowing a region of the outer bag deployed proximate the housing to float from members disposed around the housing during the course of inflation.

The floating of the outer bag from the members disposed around the housing is likely to cause a swaying motion of the outer bag where the outer bag floats from the members disposed around the housing and falls back to bump against the members repeatedly during the course of inflation. In the floated state, the outer bag being inflated is not supported by the members disposed around the housing, which makes it difficult for the outer bag to secure an enough reaction force for exerting cushioning property for receiving an occupant. On the other hand, if the outer bag engages the occupant in a thickening phase during the swaying motion, the bag may press the occupant unduly.

SUMMARY OF THE INVENTION

The object of the present invention is to provide an airbag apparatus in which an outer bag inflates while suppressing the floating motion of a region of the outer bag deployed proximate the housing from members disposed around the housing during the course of inflation.

The airbag apparatus of the present invention includes an airbag inflatable with inflation gas and a housing for housing the airbag in a folded state. The airbag is attached to the housing at a periphery of its inlet opening for admitting inflation gas, and protrudes from the housing when fed with inflation gas. The airbag includes an outer bag constituting an outer wall of the airbag and an inner bag disposed inside the outer bag for covering the inlet opening. The inner bag includes an outlet port supplying inflation gas fed from the inlet opening into the outer bag and an arm inflatable into a bag shape with inflation gas to protrude from the housing in such a manner as to extend in a direction generally orthogonal to an axial direction of the inlet opening. The arm is constructed to hold down a peripheral defected region of the outer bag, which is an area of the outer bag encompassing the inlet opening and defected from the housing, onto members disposed around the housing by a leading end region of the arm facing away from the inlet opening all the while that the inner bag remains completely inflated at the operation of the airbag apparatus.

When inflation gas flows into the airbag of the invention via the inlet opening at the operation of the airbag apparatus, the inner bag completes inflation prior to the outer bag. The outer bag then inflates by being pushed by the inflating inner bag or by inflation gas emitted out of the outlet ports of the inner bag, thereby projecting from the housing together with the inner bag.

When the outer bag inflates, while the inner bag having inflated in advance of the outer bag remains completely inflated, the leading end portion of the arm of the inner bag facing away from the inlet opening holds down the peripheral defected region of the airbag which encompasses the inlet opening and defected from the housing onto members disposed around the housing, and keeps on holding the same.

Therefore, in the airbag apparatus according to the present invention, the outer bag inflates with its peripheral defected region deployed around the housing held from floating up from members disposed around the housing during a time period from the initial stage until the completion of inflation, so that the swaying motion of the outer bag is suppressed during the course of inflation of the outer bag. As a result, if the outer bag engages an occupant during inflation, the outer bag secures a reaction force quickly due to the support by the members disposed around the housing, and receives the occupant swiftly with its cushioning property arising from the reaction force. Of course, since the swaying motion of the outer bag is suppressed, the outer bag does not project toward the occupant unduly during inflation, and therefore, it protects the occupant in a stable manner in the event of engaging him during inflation.

In the above airbag apparatus, the outlet port of the inner bag is desirably disposed on the arm so that the inflation of the inner bag is promoted. If, in comparison, the outlet port is disposed proximate the inlet opening, for example, in such a manner as to oppose the inlet opening, inflation gas easily flows out of the outlet port, which will delay the inflation of the inner bag and thereby delaying the timing to hold down the peripheral defected region of the outer bag.

In the above instance, it is desired that the outlet port of the inner bag is disposed so that an outflow direction of inflation gas flowing out of the outlet port at the complete inflation of the inner bag falls within a range of angle from a direction generally orthogonal to the holding direction of the leading end portion of the inner bag toward the members disposed around the housing to a direction opposite from the holding direction, such that the arm is prevented from moving.

With this structure, although a reaction force resulting from the outflow of inflation gas from the outlet ports is applied to the inner bag, the reaction force acts in the range of angle from the direction generally orthogonal to the holding direction of the leading end portion of the inner bag toward the members disposed around the housing to the direction opposite from the holding direction. Therefore, the inflation gas is emitted to the outer bag without hindering the leading end portion of the arm from holding down toward the members around the housing. In order to keep the arm in place so that the stable holding motion of the arm is secured when inflation gas flows out of the outlet port, the outflow direction of inflation gas from the outlet port is preferably set to be the opposite direction from the holding direction of the leading end portion toward members around the airbag housing. In that instance, one or more outlet ports can be disposed at positions opposing the members disposed around the airbag housing. On the other hand, if the outflow direction is set close to the direction generally orthogonal to the holding direction of the leading end portion, more than one outlet ports can be disposed symmetrically along the circumferential direction of the arm in consideration of a balance of reaction forces caused by the outflow of inflation gas.

The arm of the inner bag is desirably separable from an inner surface of the outer bag except at least the leading end region of the arm. If the arm is separable from the inner surface of the outer bag except the leading end region for pressing the peripheral defected region of outer bag, an area of the inner bag from the periphery of the inlet opening to the leading end region moves freely without being tied down by the inner surface of the outer bag. Accordingly, if the inner bag is formed into such a contour as to hold down the peripheral defected region of the outer bag easily, the inner bag will be inflated into that contour smoothly.

The arm of the inner bag may be wholly separable from the inner surface of the outer bag so that it inflates freely without being tied down by the inner surface of the outer bag. However, if the leading end region of the arm is connected to the peripheral defected region of the outer bag, the leading end region is not displaced relative to the peripheral defected region of the outer bag. Accordingly, the position of the inner bag relative to the outer bag is stable in the folding work of the outer bag, which will facilitate the folding work.

In the airbag apparatus of the invention, it is desired that the inner bag is constructed so that the leading end portion of the arm is deployed at a position come down along the holding direction of the leading end region holding down the peripheral defected region of the outer bag relative to an opening plane of the inlet opening when the inner bag is hypothetically inflated by itself with inflation gas fed from the inlet opening in a fixed state at the periphery of the inlet opening.

With this structure, the arm of the inner bag exerts a great pressing force to hold down the peripheral defected region of the outer bag onto the members disposed around the housing. Therefore, the peripheral defected region is further suppressed from floating up from members the disposed around the housing.

It is desired that: the inner bag includes two of the arms extending along the diametral direction of the inlet opening from a bulged central area proximate the inlet opening while tapering toward respective leading ends; the outlet port of the inner bag is disposed to the inlet opening relative to the leading end region of each of the arms so that circumferential walls of the leading end regions of the arms inflate when the inner bag is hypothetically inflated by itself with inflation gas fed from the inlet opening in a fixed state at the periphery of the inlet opening; and as viewed from a direction orthogonal to an extending direction of the arms, an edge line of the inner bag between the leading end portions of the arms at a side opposing the inlet opening has a projected shape, and a length of the edge line connecting the leading end portions of the arms at the side opposing the inlet opening is longer than a length of an edge line of the inner bag between the leading end portions of the arms at a side where the inlet opening is located, when the inner bag is hypothetically inflated by itself with inflation gas fed from the inlet opening in a fixed state at the periphery of the inlet opening.

With this structure, the two arms inflate to the tapered leading end region smoothly because the outlet ports is not disposed proximate the leading end region. Moreover, with respect to powers of circumferential wall of the inner bag to expand outward along the extending direction of the arms upon inflation of the inner bag, the expanding power of a circumferential wall at the side opposing the inlet opening surpasses that of a circumferential wall at the side where the inlet opening is located by the margin of the lengths of the edge lines connecting the leading end regions of the two arms. As a result, the inner bag is formed into a contour bent from a central area where the inlet opening is located, so that the leading end portions of the arms are disposed at the positions come down along the direction of action of the pressing force pressing the peripheral defected region of the outer bag relative to the opening plane of the inlet opening. Especially, when the airbag is inflated, since an area in the central area of the inner bag around the inlet opening is secured to the housing, the area is not subjected to inflation. Accordingly, an area of the circumferential wall at the side where the inlet opening is located conducing to secure the expanding power, in other words, an area of the circumferential wall subjected to an inner pressure of the inner bag, is substantially further reduced. Consequently, the expanding power of the circumferential wall at the side opposing the inlet opening further surpasses the expanding power of the circumferential wall at the side where the inlet opening is located. Moreover, since the peripheral area of the inlet opening is fixed to the housing, the inner bag is easy to bend from the fixed area. Accordingly, the leading end portions of the arms are easily disposed downward along the application of the pressing force relative to the opening plane of the inlet opening. Therefore, the inner bag thus constructed conduces to prevent the peripheral defected region of the outer bag from floating up from members disposed around the housing all while the inner bag remains completely inflated, since the leading end portions of the arms easily and stably exert the strong pressing force.

The inner bag may be formed by joining parts of a flexible sheet member into a three-dimensional contour. However, considering the facility in manufacturing, the inner bag may be manufactured by a planar connecting work, by folding a single sheet member having flexibility into two on a crease and then joining overlapped outer edges of the sheet member.

If the inner bag is formed by the planar connecting work as above, the crease on which the sheet member is folded into two is disposed along a region of the completely inflated inner bag connecting the leading end regions of the arms at the side where the inlet opening is located, whereas a joint edge, which is formed by joining the outer edges of the sheet member, is disposed on a region of the completely inflated inner bag connecting the leading end regions of the arms at the side opposing the inlet opening. At this time, the sheet member has a flattened contour whose width in a direction orthogonal to the crease is reduced from a central region constituting the central area of the inner bag toward leading ends of regions of the sheet member constituting the arms of the inner bag.

This way the inner bag is manufactured easily by the planar connecting work. Moreover, the edge line of the inner bag connecting the leading end portions of the arms at the side opposing the inlet opening is easily formed into the projected shape, as well as the arms are tapered toward the leading ends. In addition, the edge line connecting the leading end portions of the arms at the side opposing the inlet opening is made longer than that at the side where the inlet opening is located. As a result, the inner bag is easily so manufactured as to suppress the swaying motion of the outer bag.

If the inner bag is formed by sewing up the sheet member, a seam allowance of the joint edge formed in the sewing work is desirably disposed inside the inner bag. With this structure, the seam allowance covers and protects sewing threads used to sew up the sheet member from high-temperature and high-pressure inflation gas upon airbag inflation, which prevents the sewing threads and the joint edge from being damaged.

When the inner bag is formed by joining overlapped outer edges of a sheet member folded into two, the joint edge of the inner bag is formed straight from the leading end portions of the arms to the central area. The inner bag is disposed in a flattened manner inside the outer bag when the airbag is folded up to be housed in the housing in a state where: the two arms extend along the diametral direction of the inlet opening; the inner bag is expanded toward a direction orthogonal to the joint edge while the joint edge is congruent with the diametral direction of the inlet opening and is placed over the inlet opening; and further an opposing top portion of the inner bag opposing the inlet opening and facing away from the inlet opening at the central area is folded over the inner bag on a valley crease extending orthogonal to the joint edge.

With this structure, the inner bag is flattened symmetrically about the joint edge inside the outer bag before the airbag is folded up. Accordingly and by the valley crease, when the airbag is folded up, the joint edge is not dislocated toward the direction orthogonal to the joint edge, thereby the inner bag is arranged symmetrically and well-balancedly about the inlet opening of the outer bag. As a result, the inner bag emits inflation gas into the outer bag and holds down the peripheral defected region of the outer bag in a well-balanced manner upon airbag inflation. Moreover, since the joint edge is formed straight from the leading end portions of the arms to the central area, when the inner bag is expanded in the flattened manner toward the direction orthogonal to the joint edge while the joint edge falls in with the diametral direction of the inlet opening and is placed over the inlet opening, the vicinity of the opposing top portion is easily flattened with no slack. Further, the opposing top portion is easily folded over inner bag on the valley crease. That is, with the inner bag described above, the inner bag is easily flattened and disposed inside the outer bag in a well-balanced flattened manner.

The airbag is desirably folded up through the following two steps: a first step of reducing a width of the airbag in the direction orthogonal to the joint edge of the inner bag by bringing both edges of the airbag in the direction orthogonal to the joint edge of the inner bag close to the inlet opening from a flattened state around the inlet opening with the inner bag housed inside the outer bag; and a second step of reducing a width of the airbag in an extending direction of the joint edge of the inner bag by bringing both edges of the airbag in the extending direction of the joint edge close to the inlet opening. In the first folding step, both areas of the airbag relative to the joint edge of the inner bag are folded up symmetrically relative to the joint edge. Moreover, the outlet ports are formed symmetrically relative to the straight joint edge of the inner bag on each of the two arms in a state where the inner bag is housed inside the outer bag in the flattened manner.

With this folding, upon airbag deployment, the airbag is unfolded in a generally reverse order to the folding steps. Specifically, the inner bag firstly inflates in such a manner as to extend the arms, thereby unfolding the folds formed in the second folding step, and then unfolds the folds formed in the first folding step. At this time, folded portions of the airbag in the first folding step are symmetric relative to the joint edge of the inner bag. Moreover, the outlet ports of the inner bag for feeding inflation gas to the outer bag are disposed symmetrically relative to the straight joint edge in each of the arms. With this arrangement, both areas of the outer bag in the direction orthogonal to the joint edge unfold evenly for deployment. That is, above disposition of the inner bag inside the outer bag, above disposition of the outlet ports on the inner bag, and above folding manner of the airbag conduce, in combination, to the even deployment of both sides of the airbag relative to the diametral direction of the inlet opening. That is, when the airbag inflates thickly and is developed at its outer edge widely slightly before the completion of inflation, both areas of the airbag symmetric about the inlet opening, i.e., both areas of the airbag in the direction orthogonal to the joint edge of the inner bag, are evenly developed and inflated, so that the inflating airbag receives an occupant moving toward the airbag by its predetermined area in a stable manner.

In this case, it is desirably left and right edges of the airbag according to the lateral direction of vehicle at a complete airbag inflation that are brought close to the inlet opening in the first folding step. With this arrangement, when the airbag inflates thickly and is developed at its outer edge widely slightly before the completion of inflation, the left and right side areas of the airbag are evenly developed and inflated with no partiality. Therefore, if the airbag is designed with an enough protection area in the lateral direction, it will protect the occupant in a stable manner in the event that he moves toward left or right.

In comparison, when the inner bag is disposed inside the outer bag, if the inner bag is merely flattened in the expanding manner toward the direction orthogonal to the joint edge while the two arms extend along the diametral direction of the inlet opening and the joint edge falls in with the diametral direction of the inlet opening, the joint edge is easily dislocated to the orthogonal direction to the joint edge, which makes it difficult to dispose the inner bag in a well-balanced manner against the outer bag. As another comparative example, if the side of the inner bag where the inlet opening is located is flattened in a state where the two arms extend along the diametral direction of the inlet opening and the joint edge is folded over the inner bag on a valley crease connecting the leading end portions of the arms, the inflow of inflation gas will loose a balance between both sides of the inner bag relative to the valley crease, so that the outer bag will not be inflated in a well-balanced manner. As yet another comparative example, if the joint edge is not formed straight when the two arms extend along the diametral direction of the inlet opening, the inner bag is flattened in an expanding manner toward the direction orthogonal to the joint edge while the joint edge falls in with the diametral direction of the inlet opening and is placed over the inlet opening, and the opposing top portion is folded over the inner bag on the valley crease extending orthogonal to the joint edge, problems will be caused. For example, if the joint edge has a curved shape, slacks are caused in the vicinity of the valley crease on which the opposing top portion is folded, which may dislocate the joint edge while folding the airbag and make it difficult to dispose the inner bag inside the outer bag in a stable folded-up configuration. Therefore, it is desired that the joint edge is formed straight from the leading end portions of the arms to the central area in an instance where the inner bag is formed by joining overlapped outer edges of a sheet member folded into two.

Moreover, if the inner bag is formed by folding a sheet member into two and joining outer edges of the sheet member, it is desired that the inner bag is formed by sewing up the sheet member and that the inner bag includes a joint edge formed by sewing up the outer edges of the sheet member folded into two and a height adjusting portion. The height adjusting portion is formed as follows: the inner bag having the joint edge is flattened by folding the inner bag on a valley crease extending along the diameter direction of the inlet opening and orthogonal to the joint edge so that the arms are overlapped with each other at the side where the inlet opening is located. Then the opposing top portion, which opposes the inlet opening and faces away from the inlet opening at the central area, is folded on crest creases continuing from opposite ends of the valley crease, so that the inner bag is flattened. Subsequently a straight sewing line is formed on the opposing top portion, the sewing line being offset toward the valley crease from a top of the opposing top portion and extending in parallel to the valley crease. Thus the height adjusting portion is formed. The height adjusting portion conduces to adjust the length of the edge line of the inner bag connecting the leading end portions of the arms at the side opposing the inlet opening by changing the distance from the height adjusting portion and the top of the opposing top portion. That is, the height adjusting portion helps adjust the strength of the pressing force of the leading end portions of the arms pressing the peripheral defected region of the outer bag when the inner bag is inflated. For example, if the height adjusting portion is formed with a greater distance from the top of the opposing top portion, the length of the edge line of the inner bag connecting the leading end portions of the arms at the side opposing the inlet opening is reduced. In this case, provided that the inner bag is inflated by itself, the leading end portions of the arms are less warped and a distance between the opening plane of the inlet opening and the leading end portions drawing away from the opening plane along the direction of the leading end portions holding down the peripheral defected region of the outer bag. Consequently, the pressing force of the leading end portions of the arms pressing the peripheral defected region of the outer bag at the completion of inflation of the inner bag is reduced. To the contrary, if the height adjusting portion is formed with a reduced distance from the top of the opposing top portion, the length of the edge line at the side opposing the inlet opening is elongated. Hence, provided that the inner bag is inflated by itself, the leading end portions of the arms are warped significantly and the distance between the opening plane of the inlet opening and the leading end portions drawing away from the opening plane along the direction of the leading end portions holding down the peripheral defected region of the outer bag is enlarged. Consequently, the pressing force of the leading end portions pressing the peripheral defected region of the outer bag at the completion of inflation of the inner bag is enhanced. Therefore, with the inner bag having the height adjusting portion, the pressing force exerted at the inflation of the inner bag is controlled easily by adjusting the distance between the height adjusting portion and the top of the opposing top portion while using the same sheet member.

The airbag apparatus is mountable on a steering wheel including a ring for holding at the time of steering operation, a boss area disposed at the center of the ring, and spokes interconnect the ring and the boss area. In this case, the housing of the airbag is disposed on top of the boss area of the steering wheel. It is desired in this case that the inner bag is constructed so that the leading end portion of the arm reaches a position getting on a top plane of the ring disposed around the housing when inflated at the operation of the airbag apparatus.

With this structure, the outer bag is suppressed from floating up from the ring. In the event that the inflating outer bag engages a driver moving forward, the outer bag securely receives the driver since the outer bag is supported by the ring and secures a reaction force for exerting cushioning property.

In above instance, the inner bag desirably includes two arms extending toward the front and rear from the inlet opening.

With this structure, in the initial stage of inflation of the inner bag, the inner bag projects from the airbag housing and extends the front and rear arms quickly and expands forward and rearward along a top plane the ring without projecting toward a driver thickly. Thereafter, when the inner bag completes inflation, inflation gas is fed into the outer bag from the outlet ports of the inner bag, so that the outer bag expands in the lateral direction along the top plane of the ring without projecting toward the driver thickly and without floating up from the ring. At this time, a rear lower region of the outer bag covers a rear portion of the ring in the initial stage of inflation of the inner bag, and then increases its thickness gradually. Accordingly, even if a driver is positioned proximate the ring in the initial stage of inflation of the outer bag, the rear lower region of the outer bag is deployed in a thin state between an abdomen of the driver and the rear portion of the ring, and then inflates to be thickened. Hence, the outer bag protects the abdomen of the driver positioned proximate steering wheel smoothly from the rear portion of the ring.

When the inner bag includes two arms extending toward the front and rear, it will be appreciated that the front and rear arms extend overriding top planes of a front part and a rear part of the ring at the complete inflation of the inner bag, and that the outer bag includes a stopper portion at a rear edge thereof which is deployable on top of a femoral area of a seated driver upon inflation to hold the femoral area from moving upward.

With this structure, in the event that a driver's body is going to float from the seat, the stopper portion holds the femoral area of the driver and prevents the driver's body from floating up and advancing.

Moreover, the inner bag is constructed to depress the front part and rear part of the ring downward while remaining completely inflated. Accordingly, once the inner bag completes inflation, the outer bag easily disposes the stopper portion between the rear part of the ring and driver's abdomen. Then by inflation of the outer bag itself, the stopper portion is stably deployed on top of the femoral area in an inflated state and holds the femoral area from moving upward. The way the stopper portion is deployed between the rear part of the ring and driver's abdomen is advantageous in comparison with an instance where the inner bag is so formed into a contour like a flow regulating cloth as to deploy a stopper portion on the outer bag utilizing a flow of inflation gas, in the following: according to the invention, the inner bag securely conducts deployment of the stopper portion of the outer bag by directly supporting and pushing out the stopper portion, instead of deploying the stopper portion utilizing the flow of gas. Therefore, the inner bag of the invention securely enables the stopper portion to hold the femoral area of driver from moving upward.

Furthermore, not only the rear arm but also the front arm of the inner bag depresses the top plane of the front part of the ring. Accordingly, the inner bag allows the outer bag to deploy keeping the front edge side and the rear edge side balanced while being suppressed from inflating toward the lateral direction and pressing driver's arms steering straight ahead. This way the stopper portion of the outer bag is stably deployed between the rear part of the ring and driver's abdomen.

Therefore, the airbag apparatus for a driver's seat with above structure properly prevents the forward movement of driver due to floating up of driver's body, and prevents the driver from moving toward wind shield.

In the above structure, it is desired that a rear end of the rear arm of the inner bag is extended up to an area where the rear end is capable of holding the femoral area of the driver from moving upward when inflated. With this construction, when the inner bag is inflated in the initial stage of airbag inflation, the stopper portion suppresses the upward movement of the femoral area of the driver by being pushed by the inner bag. As a result, once the inner bag completes inflation, the airbag securely suppresses the upward movement of the femoral area by the stopper portion, utilizing a rear end area of the inner bag, even before the outer bag completes inflation.

In this case, the longitudinal length of the inner bag at complete inflation may be set generally equal to the longitudinal length of the outer bag at complete inflation. With this structure, after the inner bag completes inflation, the outer bag is inflated in a well-balanced manner and with less partial protrusion toward driver by pressing of the front arm and rear arm of the inner bag against the ring.

The airbag apparatus is also mountable on an instrument panel in front of a front passenger's seat. In this case, the housing is mounted on the instrument panel. The inner bag in this case is desirably constructed so that the leading end portion of the arm is extended to a position getting on a surface side of the instrument panel disposed around the housing when inflated at the operation of the airbag apparatus.

With this structure, the outer bag inflates without floating up from the surface side of the instrument panel disposed around the airbag housing, and the outer bag is inflated toward an occupant in a widely expanded state and with less area partially projecting toward the occupant. As a result, in the event that the outer bag engages the occupant having been positioned proximate the outer bag during inflation, the outer bag receives the occupant softly with its wide plane.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
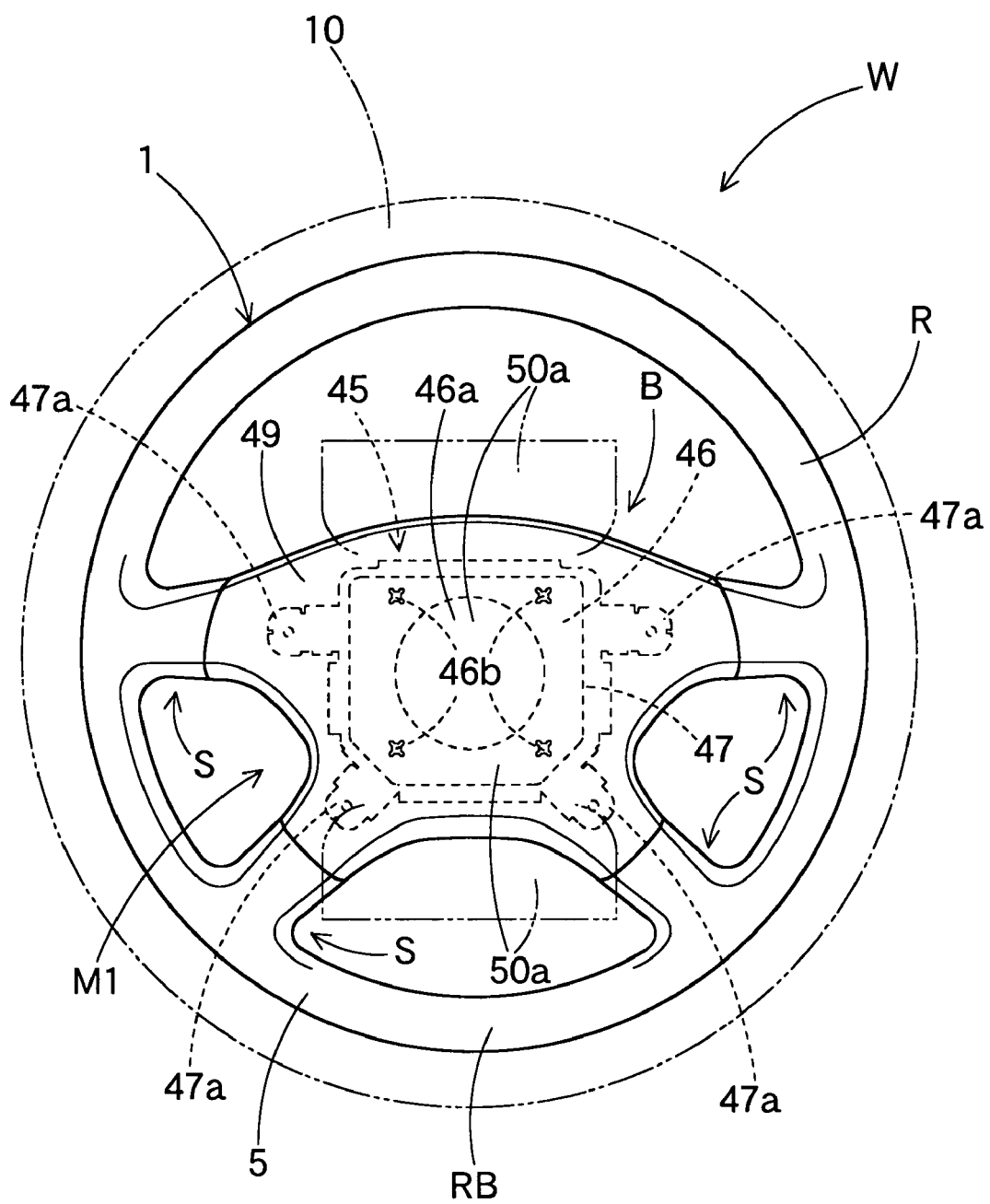
FIG. 1 is a schematic plan view of an airbag apparatus for a steering wheel according to the first embodiment of the present invention.
Figure 2:
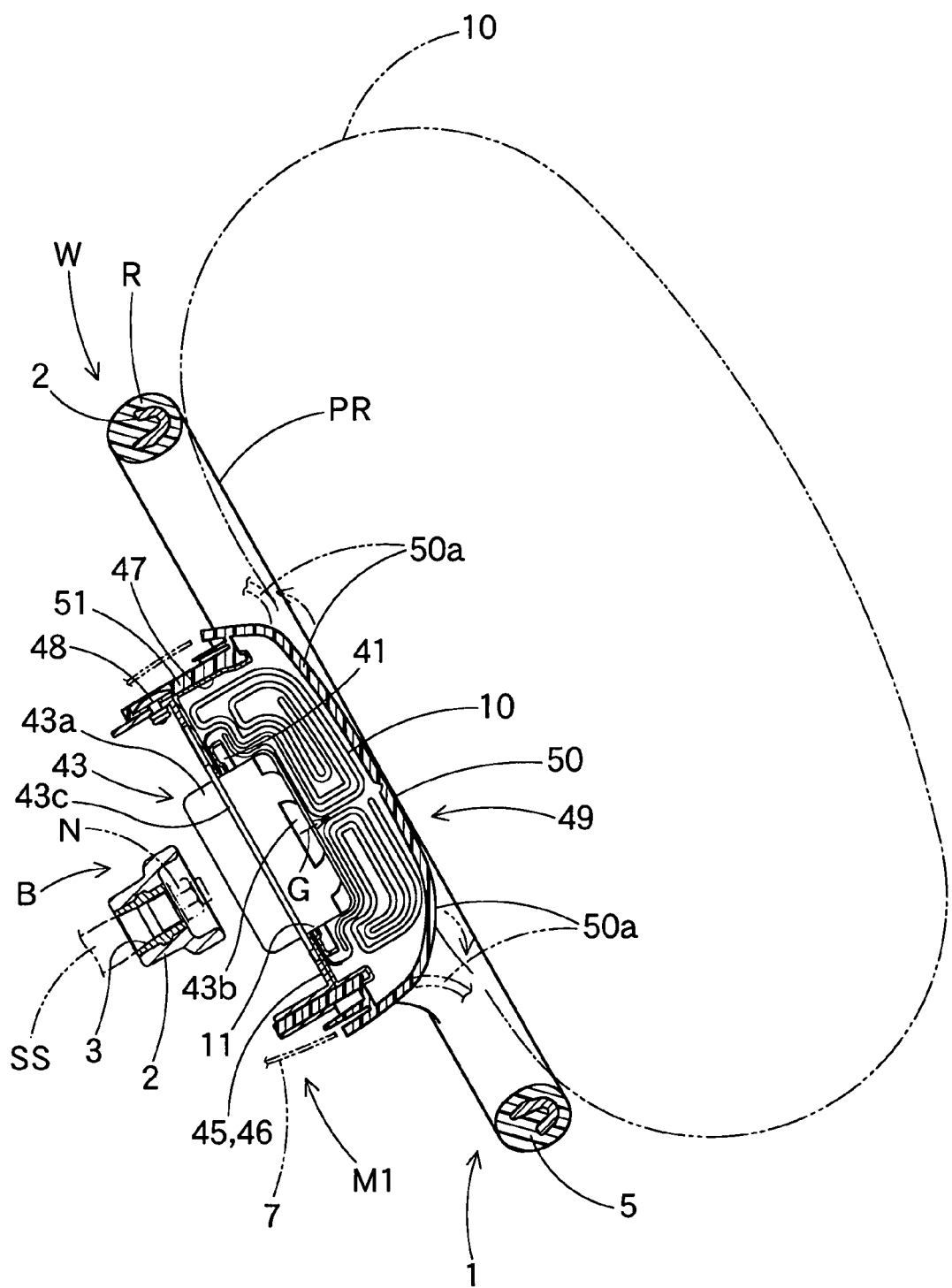
FIG. 2 is a vertical section of the airbag apparatus of FIG. 1 as is mounted on a vehicle.
Figure 9A:
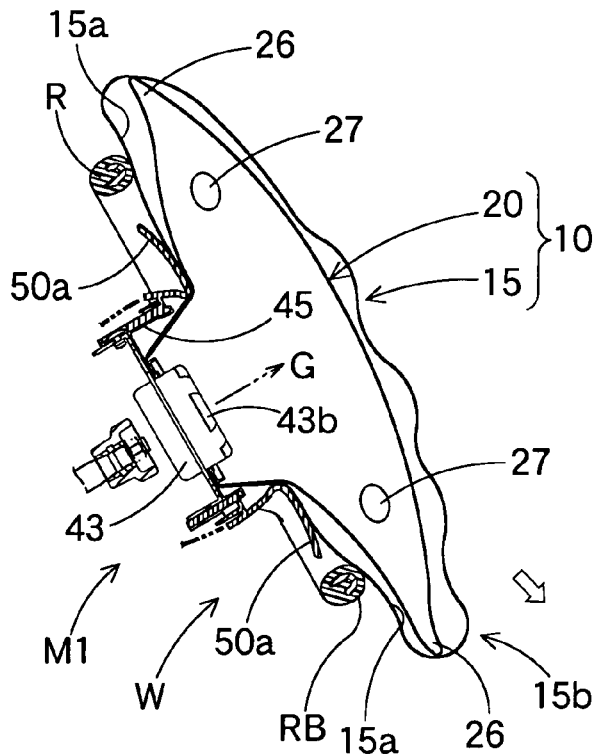
FIGS. 9A, 9B, and 9C are schematic vertical sections showing the operation of the airbag apparatus of FIG. 1 in order.
Figure 9B:
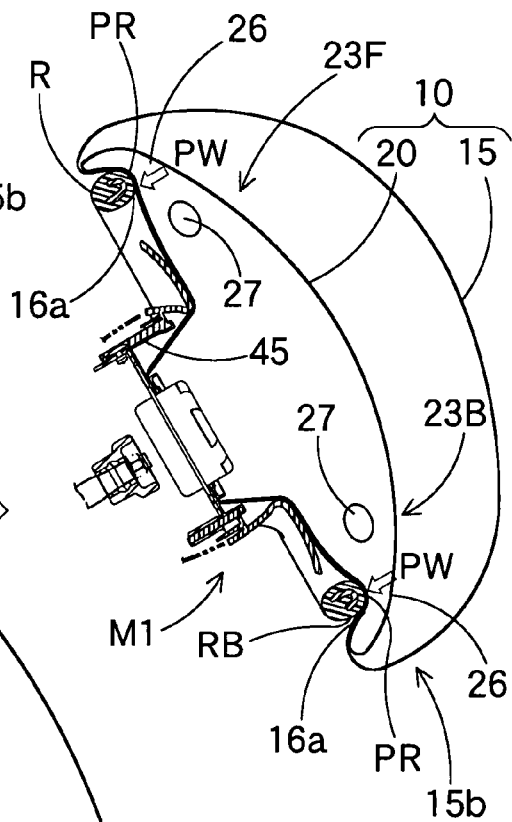
Figure 9C:
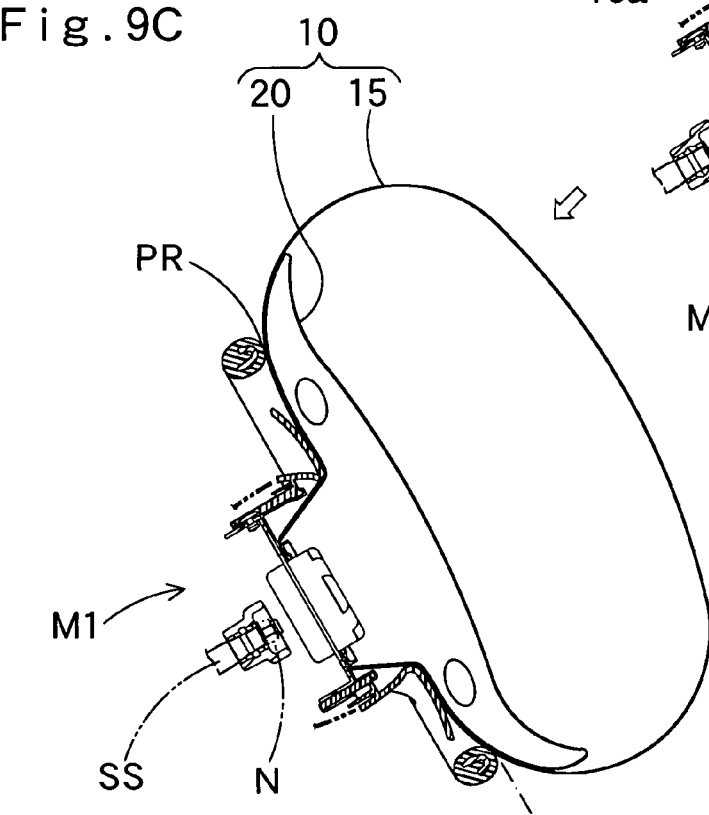

As shown in FIGS. 1 and 2, an airbag apparatus M1 according to a first embodiment of the present invention is mountable on a steering wheel W. Steering wheel W includes a wheel body 1 and airbag apparatus M1 disposed on top of a boss area B at the center of wheel body 1. Wheel body 1 includes an annular ring R, boss area B and four spokes S. Ring R is for holding at the time of steering operation. Boss area B is disposed at the center of ring R, and is joined with a steering shaft SS. Spokes S interconnect ring R and boss area B. As shown in FIGS. 9A, 9B and 9C, airbag apparatus M1 of the first embodiment has such a structure that an airbag 10 is inflatable with a minimum disengagement from a top plane PR of ring R disposed around an airbag housing during the course of inflation.

In the first embodiment of this specification, unless otherwise specified, the up-down direction corresponds to an up-down direction extending along an axial direction of steering shaft SS. The front-rear direction corresponds to a front-rear direction extending orthogonal to the axial direction of steering shaft SS of a vehicle being steered straight ahead, and the left-right direction corresponds to a left-right direction extending orthogonal to the axial direction of steering shaft SS of the vehicle being steered straight ahead.

As shown in FIG. 2, steering wheel body 1 includes a core 2 of such metal as aluminum base alloy having such a contour that ring R, boss area B and spokes S are interconnected. Core 2 has a cladding layer 5 of synthetic resin on ring R and regions of spokes S in the vicinity of ring R. At an area of core 2 corresponding to boss area B is s a steel boss 3 through which steering shaft SS is inserted and then fixed by nut N. Underneath wheel body 1 is a lower cover 7 made from synthetic resin for covering a lower side of boss area B.

As shown in FIG. 2, airbag apparatus M1 includes a folded and housed airbag 10, an inflator 43 for supplying airbag 10 with inflation gas, an airbag cover 49 covering an upper side of the folded airbag 10, a case 45 housing airbag 10 and inflator 43 and supporting airbag cover 49, and a retainer 41 for attaching airbag 10 and inflator 43 to case 45.

Figure 3:
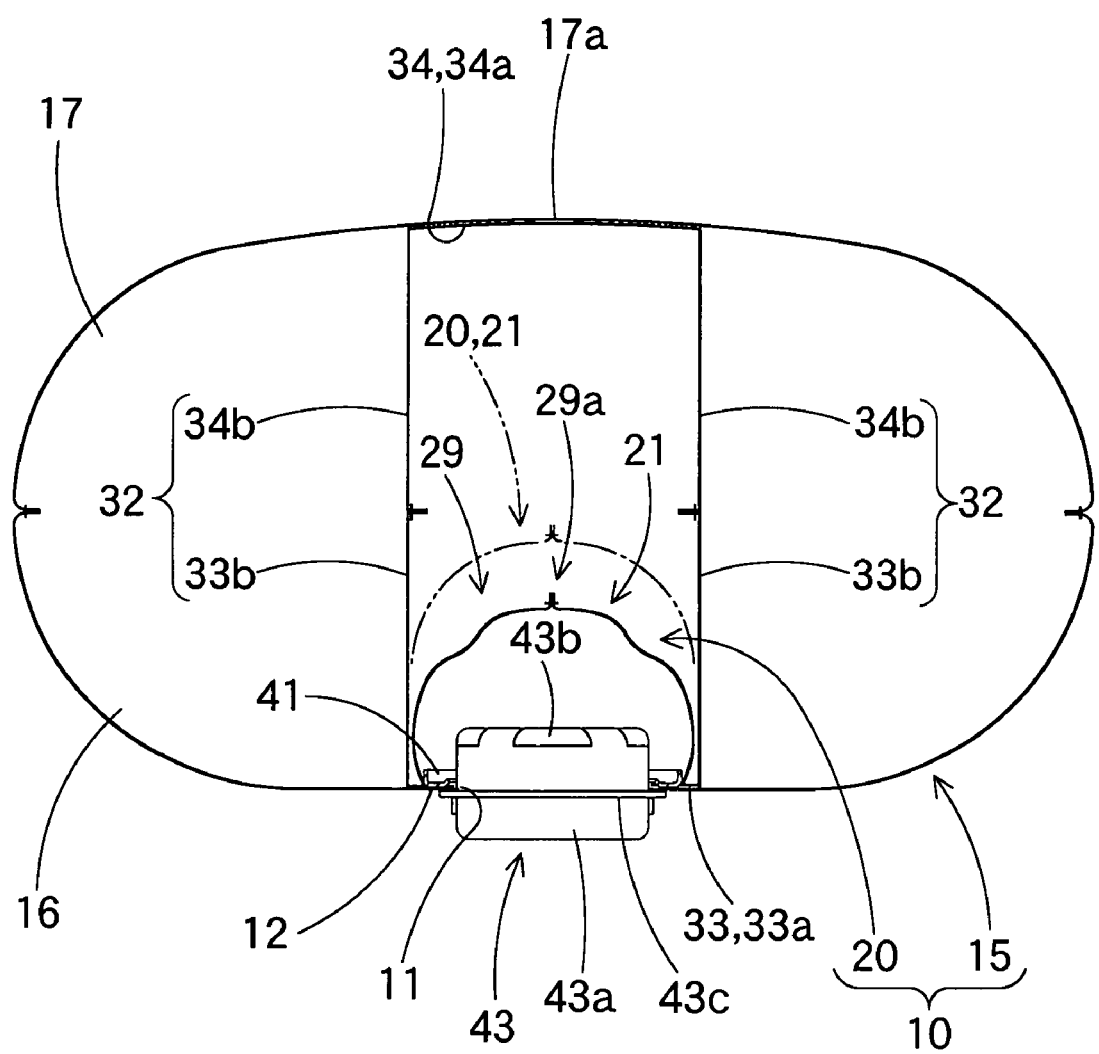
FIG. 3 is a schematic vertical section of an airbag used in the airbag apparatus of FIG. 1 taken along the lateral direction, which shows an inner bag in a deflated state while the airbag is completely inflated.
Figure 4:
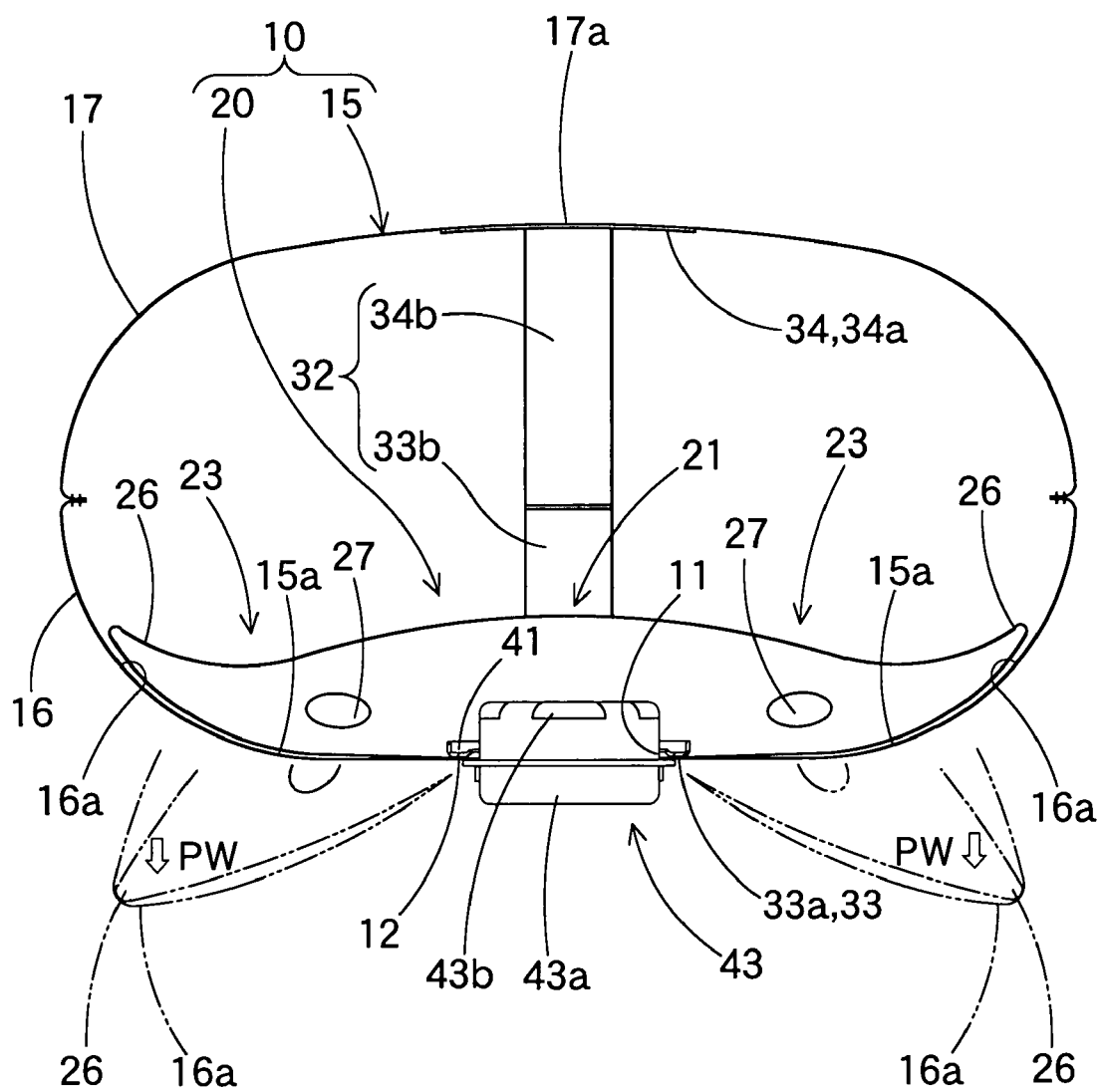
FIG. 4 is a schematic vertical section of the airbag of FIG. 3 taken along the longitudinal direction, which shows the inner bag in a deflated state and the airbag in a completely inflated state.
Figure 7:
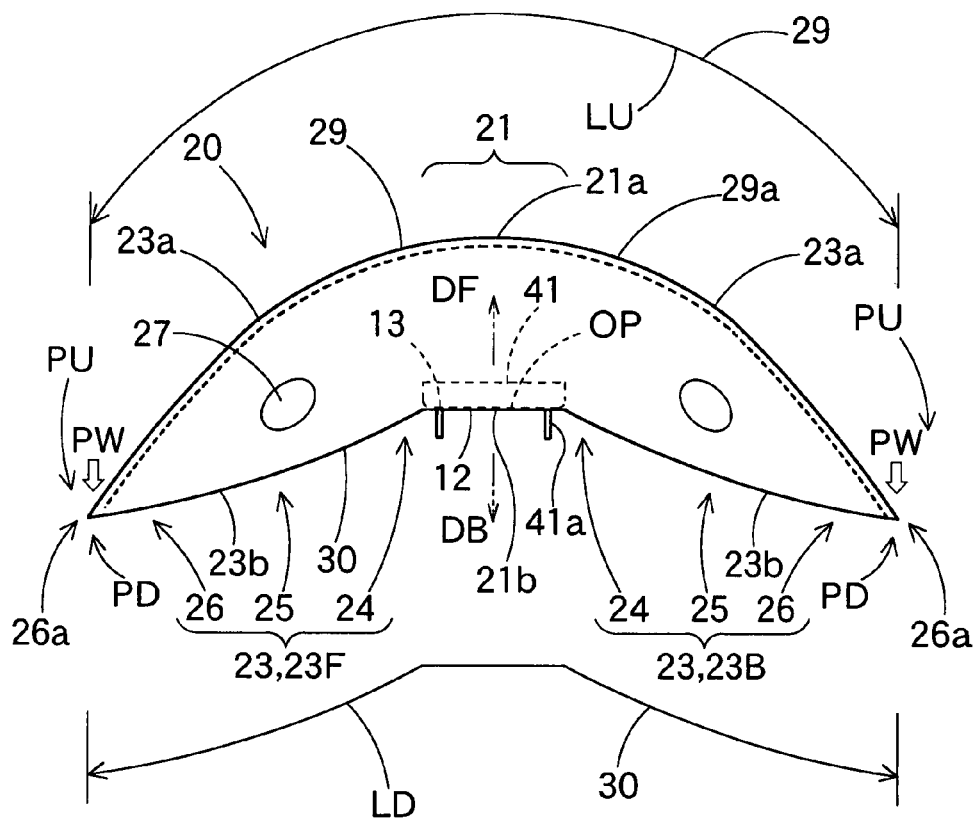
FIG. 7 is a schematic front view of the inner bag of FIG. 3 inflated by itself.
Figure 8:
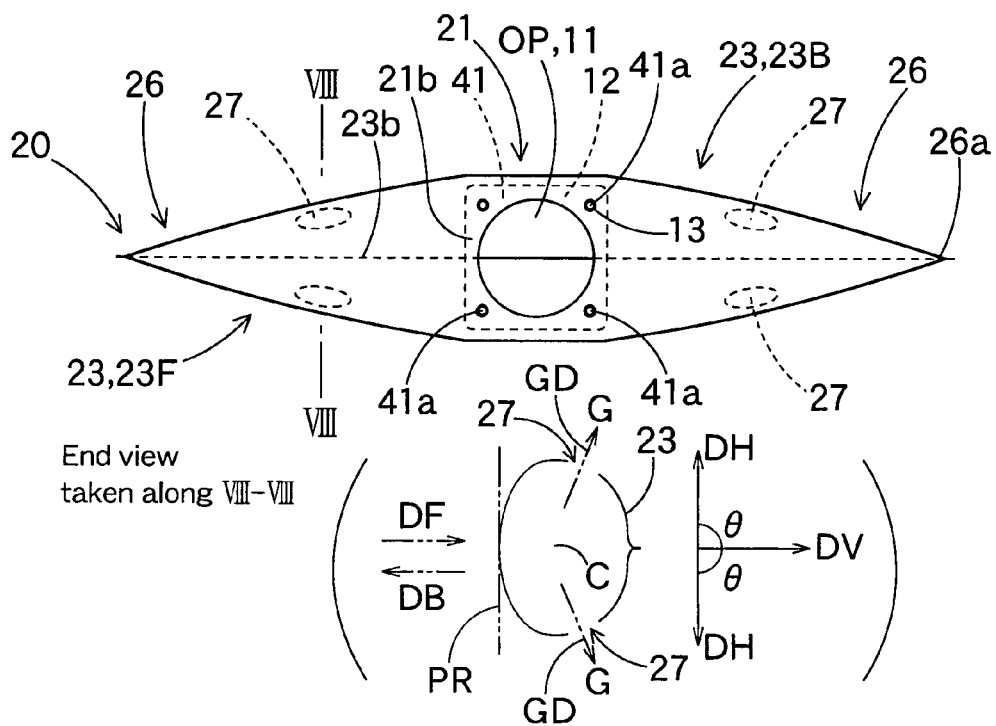
FIG. 8 is a schematic bottom view of the inner bag of FIG. 3 inflated by itself.

As shown in FIGS. 2 to 4, retainer 41 has such a square annular shape for allowing a later-described columnar body 43a of inflator 43 to be inserted from lower side. As shown in FIGS. 7 and 8, retainer 41 is provided at its four corners with bolts 41a projected downward. Retainer 41 is housed inside airbag 10 with bolts 41a projected outside, which bolts 41a are put through holes 46b shown in FIG. 1 of bottom wall 46 of case 45 and flange 43c of inflator 43 when retainer 41 is attached to case 45, and are fastened into unillustrated nuts, thereby attaching airbag 10 and inflator 43 to bottom wall 46 of case 45.

As shown in FIGS. 2 to 4, inflator 43 includes a body 43a and a flange 43c. Inflator body 43a is substantially columnar in shape, and is provided on its top with gas discharge ports 43b. Flange 43c projects from the outer circumference of body 43a and has unillustrated through holes for receiving bolts 41a of retainer 41.

As shown in FIGS. 1 and 2, case 45 is made of sheet metal and includes a bottom wall 46 having a rectangular plate shape and a side wall 47 extending vertically from an outer periphery of bottom wall 46. Case 45 is disposed above boss area B of steering wheel W, and serves as a housing of the folded airbag 10. Bottom wall 46 is provided with a circular insert hole 46a for receiving body 43a of inflator 43 from lower side. Around insert hole 46a are four through holes 46b for receiving bolts 41a of retainer 41. At the upper end of side wall 47 are mounting pieces 47a extending outwardly. Unillustrated mounting bases for horn switches are attached to mounting pieces 47a, and case 45 is secured to core 2 of steering wheel W utilizing the mounting bases. As a result, airbag apparatus M1 is mounted on top of boss area B of steering wheel body 1 attached to steering shaft SS. Moreover, later-described side wall 51 of airbag cover 49 is attached to side wall 47 of case 45 with rivets 48 or the like.

Airbag cover 49 is fabricated of synthetic resin and includes a ceiling wall 50 covering the housed airbag 10 from above, and a side wall 51 having a generally square tubular shape extending downward from the vicinity of an outer periphery of ceiling wall 50. Ceiling wall 50 includes two doors 50a which are adapted to open forward and rearward when pushed by the inflated airbag 10.

Airbag 10 is designed so that its completely inflated contour is round as viewed from above and generally oval as viewed from a side as indicated by phantom lines in FIGS. 1 and 2. As shown in FIGS. 2 to 4, airbag 10 is provided at its lower side with a round inlet opening 11 for admitting inflation gas therefrom. In a periphery of opening 11 are mounting holes 13 (FIG. 5) for receiving bolts 41a of retainer 41 for attaching airbag 10 to bottom wall 46 of case 45. That is, the peripheral area of inlet opening 11 serves as a mounting area 12 to be secured to bottom wall 46 of case 45 serving as the housing of airbag 10. Inlet opening 11, mounting holes 13 and mounting area 12 are formed on overlapping areas of each of later-described outer bag 15, inner bag 20 and tether cloth 33. Outer bag 15, tether cloth 33, and inner bag 20 overlap one another in this order from outside.

Figure 5:
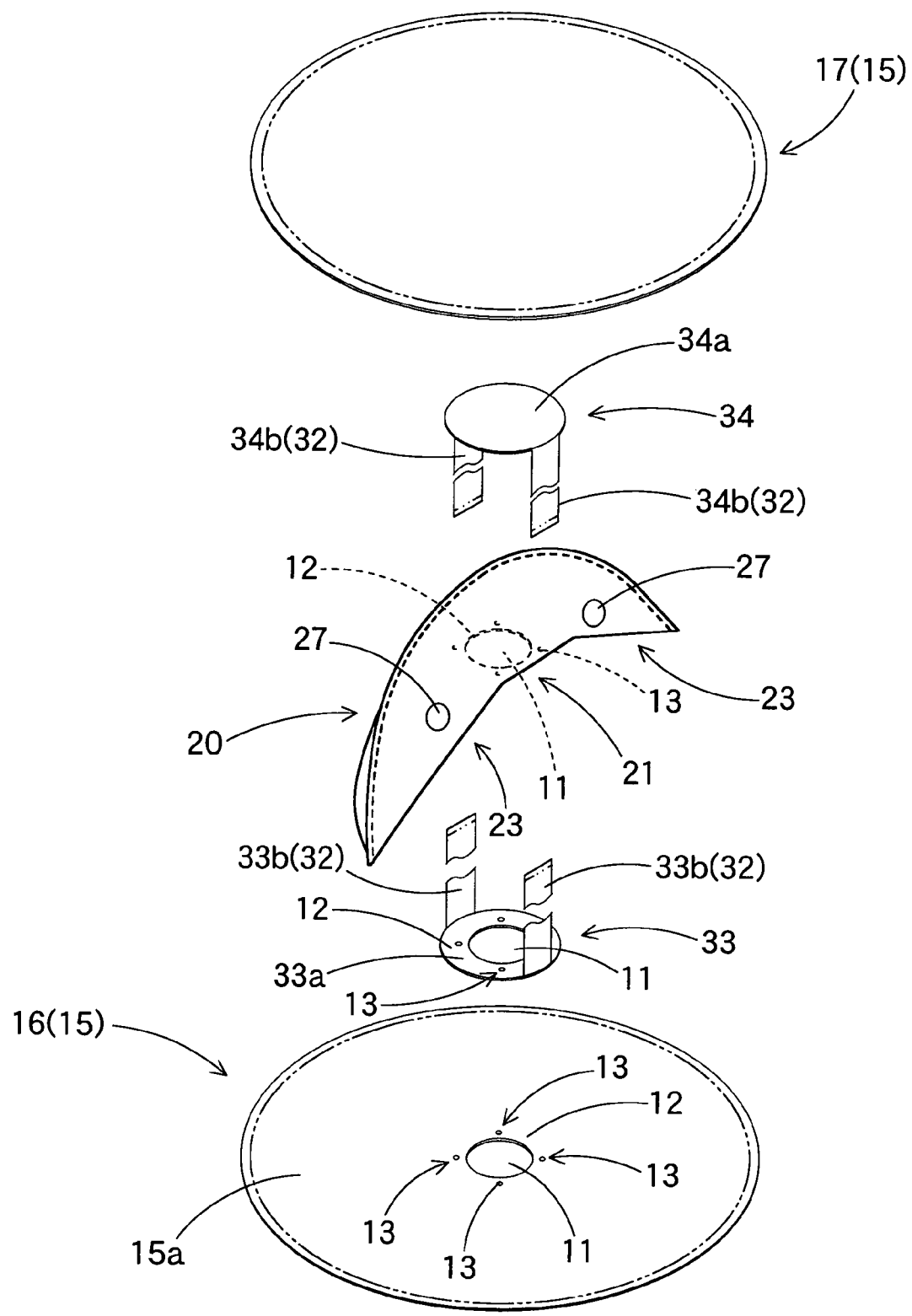
FIG. 5 is a perspective exploded view of components of the airbag of FIG. 3.

Airbag 10 is made of flexible woven fabric of polyester, polyamide or the like, and includes an outer bag 15 constituting an outer wall of airbag 10 and an inner bag 20 disposed inside outer bag 15 in such a manner as to cover inlet opening 11, as shown in FIGS. 3 to 5. Inner bag 20 includes a plurality of (four, in this embodiment) outlet ports 27 that let inflation gas G (FIG. 2) fed via inlet opening 11 out into outer bag 15 to inflate outer bag 15.

As shown in FIG. 5, outer bag 15 includes a vehicle body side wall 16 and a driver side wall 17 both of which have circular shapes when flattened. Outer bag 15 is formed by sewing up peripheral edges of walls 16 and 17 and is inflated into an elliptic spherical bag shape. Vehicle body side wall 16 is deployed toward ring R upon airbag inflation, and driver side wall 17 is deployed toward a driver upon airbag inflation. Vehicle body side wall 16 is provided in its center with inlet opening 11, around which are mounting holes 13.

Referring to FIGS. 3 and 5, two tethers 32 extend from mounting area 12 disposed in the periphery of inlet opening 11. Tethers 32 help regulate a clearance from mounting area 12 to the vicinity of the center 17a of driver side wall 17 upon airbag inflation. Each of tethers 32 is formed by joining band portions 33b and 34b of tether cloths 33 and 34. Tether cloth 33 includes an annular main body 33a joined to the periphery of inlet opening 11 of vehicle body side wall 16 by sewing or the like, and band portions 33b extending from left and right edges of main body 33a. Tether cloth 34 includes a circular main body 34a joined to the center 17a of driver side wall 17 by sewing or the like, and band portions 34b extending from left and right edges of main body 34a. Main body 33a of tether cloth 33 serves to reinforce mounting area 12, too.

Upon inflation, outer bag 15 is inflated into a discoid shape having a greater outer diameter than that of ring R in such a manner as to cover ring R from above as shown in FIGS. 2 and 9C, since the clearance from mounting area 12 to the center 17a of driver side wall 17 is regulated by tethers 32.

As shown in FIGS. 5, 7 and 8, inner bag 20, described as is inflated, includes a central area 21 provided with an inlet opening 11 and four mounting holes 13 formed around inlet opening 11, and arms 23 (23F and 23B) extending forward and rearward along the diametral direction of inlet opening 11 from central area 21. In inner bag 20, a periphery of inlet opening 11 in central area 21 serves as mounting area 12 held down by retainer 41 and secured to bottom wall 46 of case 45 together with outer bag 15. On the other hand, each of arms 23 is free to move separated from an inner surface 15a of outer bag 15 except in mounting area 12. Each of arms 23 has a tapered tubular shape tapering from its root portion 24 proximate central area 21 toward a top 26a of its leading end portion 26.

Outlet ports 27 are disposed to inlet opening 11 relative to leading end portion 26 in inner bag 20 so that the whole circumferential wall of inner bag 20, from central area 21 to tops 26a of leading ends 26 of arms 23, is inflated when fed with inflation gas G from inlet opening 11. To the same end, each of outlet ports 27 is designed not to be too large. In the specific embodiment, each of outlet ports 27 is formed on a side of an intermediate area 25, which area extends along the longitudinal direction between root portion 24 and leading end portion 26 of each of arms 23. Each of arms 23 has two outlet ports 27, and therefore, inner bag 20 has four outlet ports 27 in total. Each of outlet ports 27 has a round shape. As indicated in parentheses in FIG. 8, axial directions GD of a pair of outlet ports 27 formed in each arm 23 are oriented about 30 degrees upward relative to top plane PR of ring R from an axial center C of arms 23 so that arm 23 may not be separated from top plane PR. Inflation gas G is emitted from outlet ports 27 along this axial directions GD.

FIGS. 7 and 8 illustrate inner bag 20 in a hypothetical situation where it is hypothetically inflated by itself in a fixed state at its mounting area 12 in the periphery of inlet opening 11 using retainer 41 disposed inside inner bag 20 with bolts 41a projected from mounting holes 13. In this state, tops 26a of leading end portions 26 of front and rear arms 23F and 23B are disposed at positions come down to a direction DB opposite from a flow-in direction DF of inflation gas G relative to an opening plane OP of inlet opening 11 as viewed from a lateral direction which is orthogonal to the longitudinal direction along which arms extend (FIG. 7). In other words, the shape of inner bag 20 inflated by itself is designed so that tops 26a of leading end portions 26 of arms 23 are located at positions come down along a direction of application of a pressing force PW (FIG. 9B) of inner bag 20 holding down a peripheral defected region 16a, which is an area of outer bag 15 encompassing inlet opening 11 and defected from case 45, toward members disposed around case 45, relative to opening plane OP.

Moreover, when inner bag 20 is inflated, an edge line 29a of an upper wall 29 of inner bag 20 disposed at the side opposing inlet opening 11, which line 29a runs between leading ends 26 of arms 23F and 23B, has a projected shape, and a length (upper edge length) LU of the edge line of upper wall 29 between leading ends 26 of arms 23F and 23B is designed to be longer than a length (lower edge length) LD of an edge line at the side of a lower wall 30 of inner bag 20 between leading ends 26 of arms 23F and 23B. Upper wall 29 refers to an area from top 26a of arm 23F to top 26a of arm 23B via an upper side 23a of arm 23F, an upper side 21a of central area 21, and an upper side 23a of arm 23B. Lower wall 30 refers to an area from top 26a of arm 23F to top 26a of arm 23B via a lower side 23b of arm 23F, a lower side 21b of central area 21 (this area serves as mounting area 12 held down by retainer 41), and a lower side 23b of arm 23B.

Figure 6A:
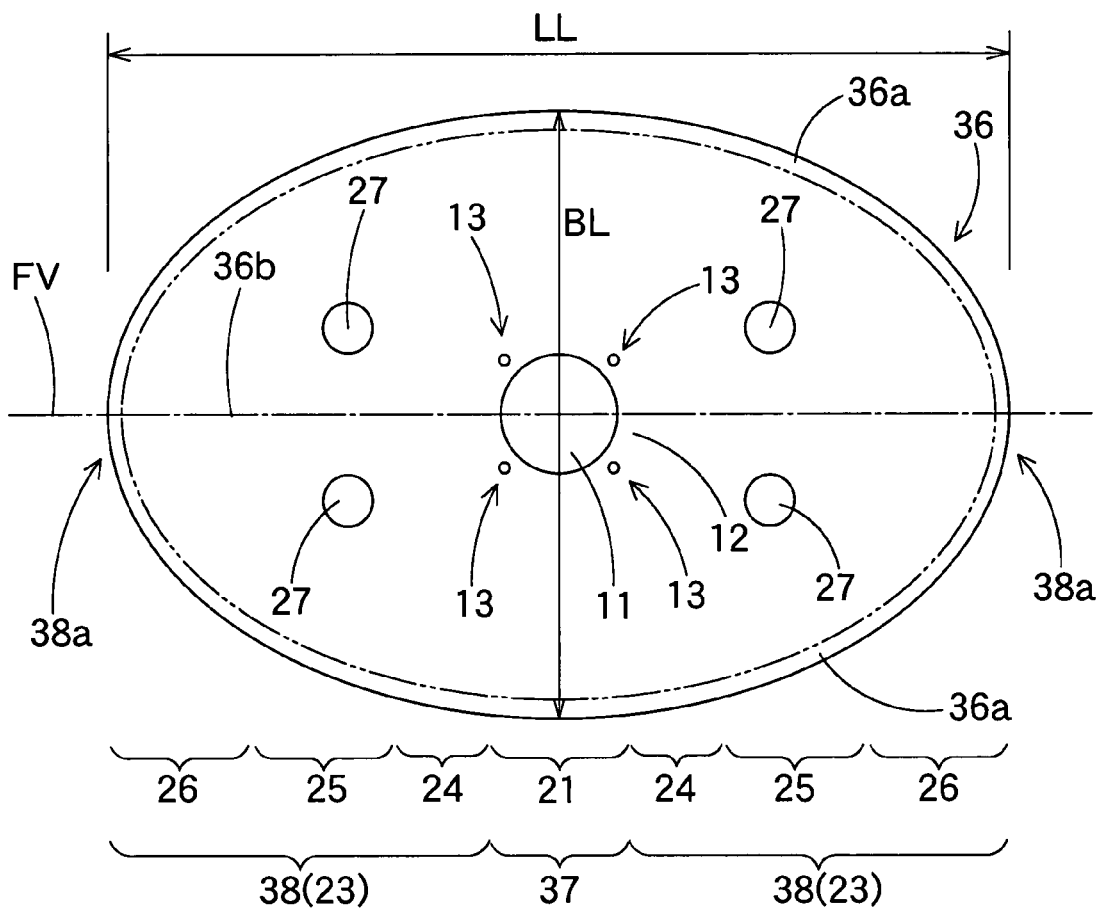
FIGS. 6A and 6B show a manufacturing process of the inner bag of FIG. 3 in order.
Figure 6B:
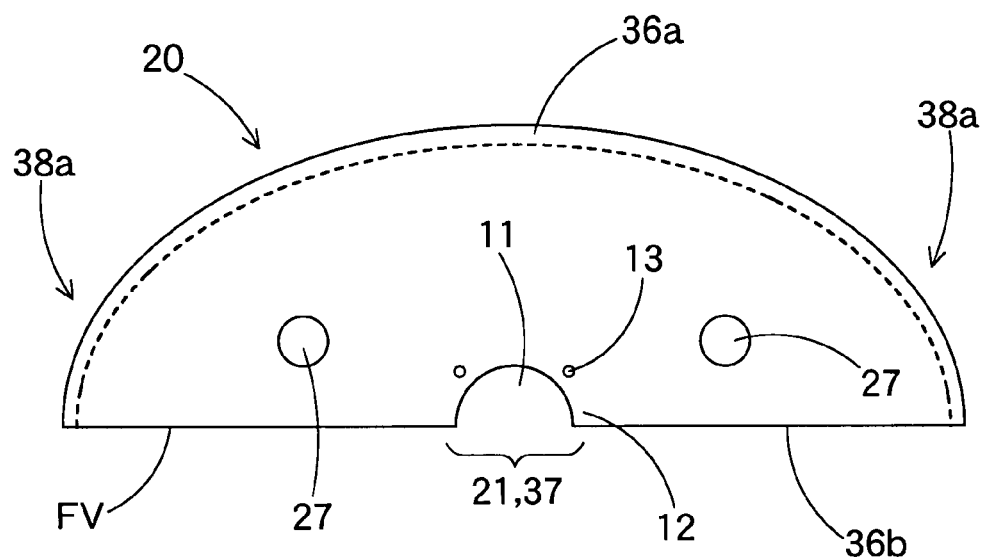

Inner bag 20 is made of a sheet member 36 having an oval plate shape shown in FIG. 6A. Specifically, sheet member 36 is folded into two from a flattened state, and then overlapped outer edges 36a are joined together by sewing or the like as shown in FIG. 6B, thereby forming inner bag 20. Sheet member 36, above-described tether cloths 33, 34, and vehicle body side wall 16 and driver side wall 17 to be formed into outer bag 15 are all made of flexible woven fabric of polyester, polyamide or the like. Sheet member 36 has a coating layer of silicone rubber or the like on a side to be the inner surface of inner bag 20 for improving heat resistance.

Referring to FIGS. 6A and 6B, when flattened, sheet member 36 has a central region 37 with an inlet opening 11 and mounting holes 13 to serve as central area of inner bag 20, and two wing portions 38, which are to serve as arms 23, extending to both sides from central region 37 along the diameter direction of inlet opening 11. A crease FV on which sheet member 36 is folded into two extends along a longer axis of the oval of the flattened sheet member 36. As described above, inner bag 20 has tapered tubular contours from central area 21 toward leading end portions 26 of arms 23F and 23B. Thus, a width BL of flattened sheet member 36 in a direction orthogonal to crease FV is gradually reduced from central region 37 to leading ends 38a of wing portions 38.

Inner bag 20 is formed by folding sheet member 36 into two on crease FV and sewing up the overlapped outer edges 36a. Outer edges 36a of sheet member 36 joined together provide edge line 29a of upper wall 29 of the inflated inner bag 20. On the other hand, an area 36b around crease FV becomes lower wall 30 of inflated inner bag 20.

Figure 11:
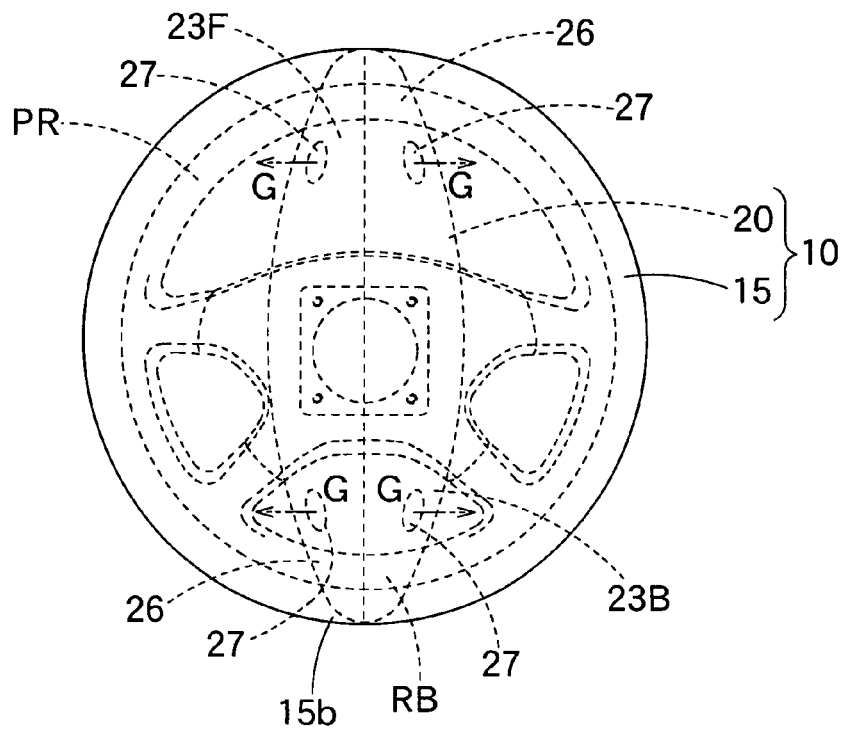
FIG. 11 is a plan view of the inner bag of FIG. 3 in a completely inflated state at the operation of the airbag apparatus.

A length between leading end portions 26 of arms 23F and 23B of sheet member 36, that is, a length LL (FIG. 6A) of the area 36b around crease FV, is predetermined so that leading end portions 26 get on top of the members disposed around an upper part of boss area B or case 45, i.e., the housing of airbag 10, that is, in the foregoing embodiment, so that leading end portions 26 get on top plane PR of ring R, when inner bag 20 is completely inflated at the operation of airbag apparatus M1, as shown in FIGS. 9B and 11.

To manufacture outer bag 15, firstly main body 33a of tether cloth 33 is secured to vehicle body side wall 16, while main body 34a of tether cloth 34 is secured to driver side wall 17. Then vehicle body side wall 16 and driver side wall 17 are overlaid one above the other so that respective outer sides contact each other, and outer edges of walls 16 and 17 are joined together. Thereafter, bag 15 is reversed inside out utilizing inlet opening 11 so that a joint allowance or seam allowance may not be exposed outside. If then corresponding band portions 33b and 34b of tether cloths 33 and 34 are connected, outer bag 15 is completed.

To assemble airbag apparatus M1 and mount it on a vehicle, firstly, retainer 41 is set inside inner bag 20 so that bolts 41a project from mounting holes 13. Then inner bag 20 is set inside outer bag 15 so that bolts 41a project from mounting holes 13 of outer bag 15. Thus airbag 10 is completed. Subsequently, airbag 10 is folded up and wrapped up with a predetermined wrapping member for keeping airbag 10 in a folded-up configuration. Then airbag 10 is placed on bottom wall 46 of case 45 so that bolts 41a project from through holes 46b, and body 43a of inflator 43 is put into insert hole 46a of bottom wall 46 from lower side while making bolts 41a put through flange 43c. Then if unillustrated nuts are fastened on bolts 41a, airbag 10 and inflator 43 are housed inside case 45 as the housing, and are also attached to case 45 utilizing retainer 41. Furthermore, airbag cover 49 is attached to case 45 by placing airbag cover 49 over case 45 and joining side walls 47 and 51 together with rivets 48 or the like. By then mounting unillustrated horn switch mechanisms on mounting pieces 47a of case 45, airbag apparatus M1 is completed.

Airbag apparatus M1 thus assembled is mounted on steering wheel body 1, which has been preliminarily secured to steering shaft SS, utilizing unillustrated mounting bases of horn switch mechanisms.

When airbag apparatus M1 for a steering wheel W is activated, inflation gas G flows into airbag 10 via inlet opening 11 as shown in FIG. 2, and airbag 10 inflates and opens doors 50a of airbag cover 49. Then as indicated by phantom lines in FIG. 2, airbag 10 projects from case 45 and completes inflation in such a manner as to cover top plane PR of ring R. At that time, in the initial stage of airbag inflation, inner bag 20 completes inflation prior to outer bag 15 as shown in FIGS. 9A, 9B, 10 and 11. Outer bag 15 then inflates by being pushed by the inflating inner bag 20 or by inflation gas G emitted out of outlet ports 27 of inner bag 20, thereby projecting from case 45 together with inner bag 20.

When outer bag 15 inflates, while inner bag 20 having inflated in advance of outer bag 15 remains completely inflated, leading end portions 26 of arms 23F and 23B of inner bag 20 facing away from inlet opening 11 hold down peripheral defected region 16a, which is an area of vehicle body side wall 16 encompassing inlet opening 11 and defected from case 45, onto top plane PR of ring R which is a member disposed around case 45, and keep on holding the same. In the first embodiment, after completion of airbag inflation, i.e., after outer bag 15 completes inflation by inflation gas G fed via outlet ports 27 of inner bag 20, if inflator 43 stops supplying inflation gas G, inner bag 20 deflates from the completely inflated state as shown in FIGS. 9B and 9C, and no more pressing force PW is exerted.

Therefore, in airbag apparatus M1 for a steering wheel W according to the first embodiment, outer bag 15 inflates with its peripheral defected region 16a deployed around case 45 held from floating up from top plane PR of ring R as shown in FIG. 9B during a period from the initial stage of inflation until the stop of delivery of inflation gas G, so that the swaying motion of outer bag 15 (a motion of outer bag 15 swaying up and down to separate from ring R and abut against ring R) is suppressed during the course of inflation of outer bag 15. As a result, if outer bag 15 engages an occupant or a driver during inflation, outer bag 15 secures a reaction force quickly since it is supported by top plane PR of ring R, and receives the driver swiftly with its cushioning property arising from the reaction force. Of course, since the swaying motion of outer bag 15 is suppressed, outer bag 15 does not project toward the driver unduly during inflation, and therefore, it protects the driver in a stable manner in the event that a driver moving forward engages outer bag 15 during inflation.

Moreover, as described above, in airbag apparatus M1, inner bag 20 is designed such that, when it is hypothetically inflated by itself in a fixed state at its mounting area 12 using retainer 41 as shown in FIGS. 7 and 8, leading end portions 26 of arms 23F and 23B are disposed at positions come down along the direction of action of pressing force PW pressing peripheral defected region 16a of outer bag 15 relative to opening plane OP of inlet opening 11.

This construction conduces to secure great pressing force PW of arms 23F and 23B of inflated inner bag 20 pressing peripheral defected region 16a of vehicle body side wall 16 of outer bag 15 onto top plane PR of ring R, which further prevents the whole vehicle body side wall 16 or the area of outer bag 15 deployed proximate case 45 from floating up from top plane PR of ring R. Especially in the first embodiment, top plane PR of ring R is positioned at higher level than opening plane OP of inlet opening 11 when airbag apparatus M1 is mounted on vehicle. Therefore, further greater pressing force PW is secured.

Further, inner bag 20 includes two arms 23F and 23B each of which extending along the diametral direction of inlet opening 11 from bulged central area 21 while tapering toward respective leading ends when inflated. Moreover, when inner bag 20 is inflated by itself with inflation gas G fed from inlet opening 11 in a fixed state at the periphery of inlet opening 11, each of outlet ports 27 is disposed to inlet opening 11 relative to leading end portion 26 of arm 23F or 23B so that circumferential walls of the arms 23F and 23B inflate wholly to tops 26a of leading end portions 26 as shown in FIGS. 7 and 8. Further, likewise when inner bag 20 is inflated by itself, as viewed from a direction orthogonal to an extending direction of arms 23F and 23B, edge line 29a of upper wall 29 of inner bag 20 opposing inlet opening 11 has a projected shape, and upper edge length LU of the edge line of upper wall 29 between leading ends 26 of arms 23F and 23B is longer than lower edge length LD of the edge line of lower wall 30 between leading ends 26 of arms 23F and 23B.

With this structure, since outlet ports 27 of inner bag 20 are not disposed proximate leading end portions 26, two arms 23F and 23B are smoothly inflated to tapered leading end portions 26. Since edge line 29a of upper wall 29 of inner bag 20 has a projected shape and upper edge length LU of upper wall 29 is longer than lower edge length LD of lower wall 30 in inner bag 20 inflated by itself, with respect to powers of upper wall 29 and lower wall 30 expanding outward along the extending direction of arms 23F and 23B upon inflation of inner bag 20, the expanding power PU of upper wall 29 surpasses the expanding power PD of lower wall 30 as shown in FIG. 7. As a result, inner bag 20 is formed into a contour bent from central area 21 where inlet opening 11 is located, so that leading end portions 26 of arms 23F and 23B are disposed at positions come down along the direction of action of pressing force PW pressing peripheral defected region 16a of outer bag 15 relative to opening plane OP of inlet opening 11. Especially, when airbag 10 is inflated, since a generally square peripheral area around inlet opening 11 in central area 21 of inner bag 20 is secured to bottom wall 46 of case 45 as mounting area 12, the area is not subjected to inflation. Accordingly, an area of lower wall 30 conducing to secure the expanding power PD, in other words, an area of lower wall 30 subjected to an inner pressure of inner bag 20, is substantially further reduced. Consequently, the expanding power PU of upper wall 29 further surpasses the expanding power PD of lower wall 30. Moreover, since the peripheral area of inlet opening 11 is fixed in a planar manner by rigid retainer 41 made of sheet metal, inner bag 20 is easy to bend from the fixed area (FIG. 7). Accordingly, leading end portions 26 of arms 23F and 23B are easily disposed at the positions come down along the application of pressing force PW relative to opening plane OP of inlet opening 11. Therefore, inner bag 20 thus constructed conduces to prevent vehicle body side wall 16 deployed proximate case 45 from floating up from top plane PR of ring R all while inner bag 20 remains completely inflated, since leading end portions 26 of arms 23F and 23B easily and stably exert a strong pressing force PW.

Furthermore, inner bag 20 capable of exerting such a powerful pressing force PW is easily manufactured by a planar connecting work of the overlapped outer edges 36a of a predetermined shaped sheet member 36 folded into two on crease FV. Width BL of this sheet member 36 in the direction orthogonal to crease FV is reduced from central region 37 constituting central area 21 toward leading ends 38a of wing portions 38 constituting arms 23F and 23B.

Figure 12:
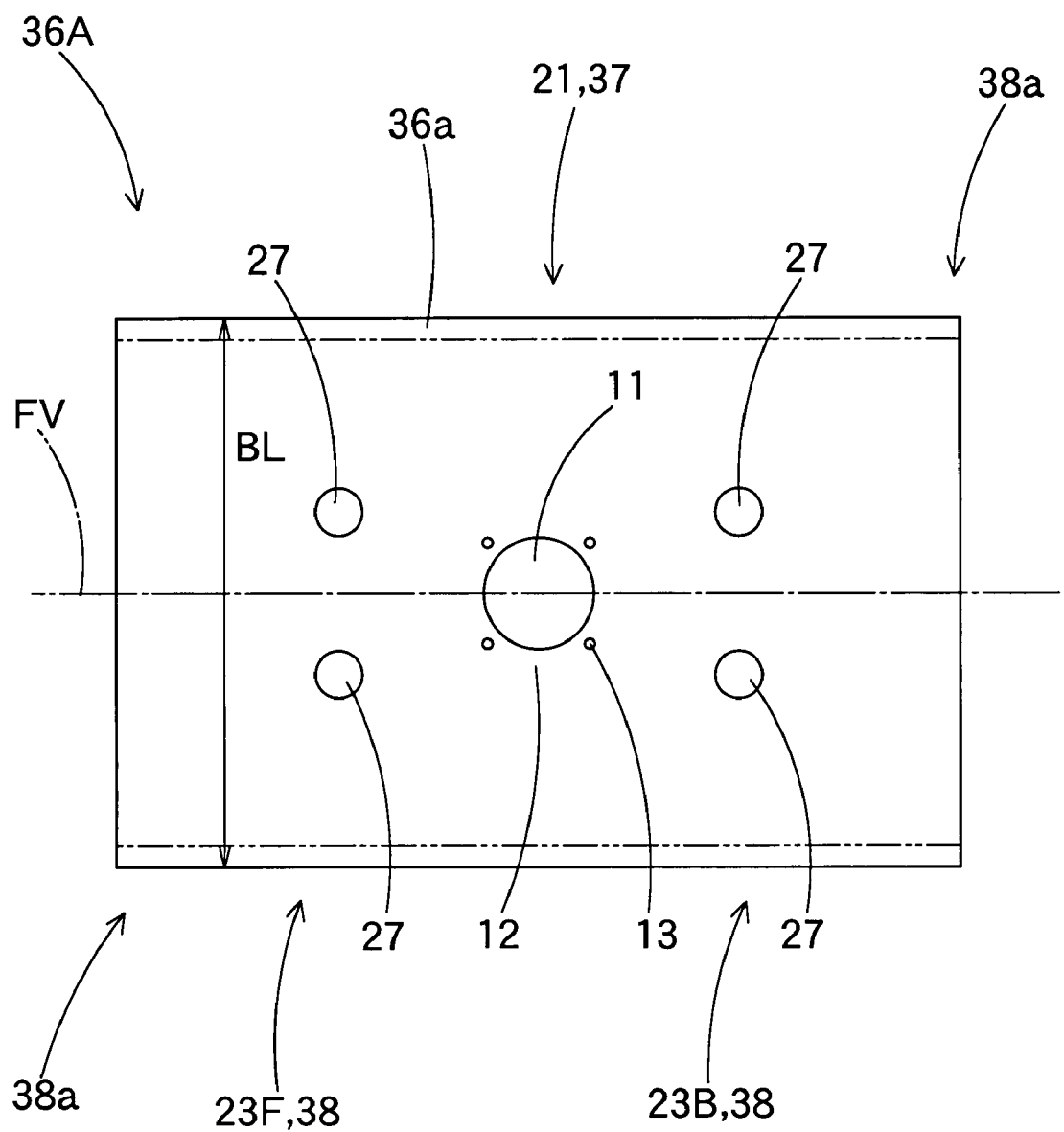
FIG. 12 is a development of a sheet member shown as a comparative example to the inner bag of FIG. 3.
Figure 13:
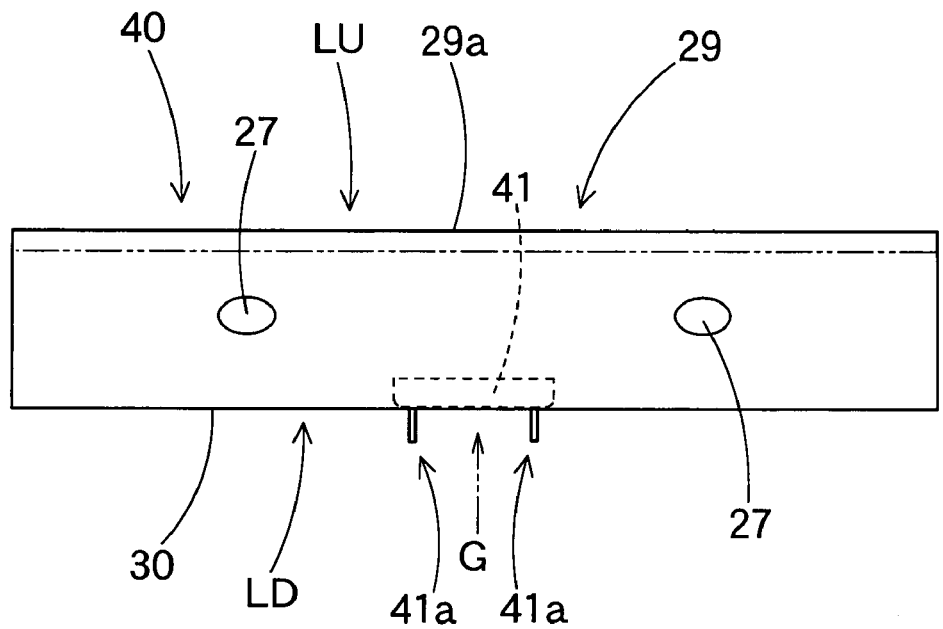
FIG. 13 is a front view of a flow regulating cloth made of the sheet member of FIG. 12.
Figure 14:
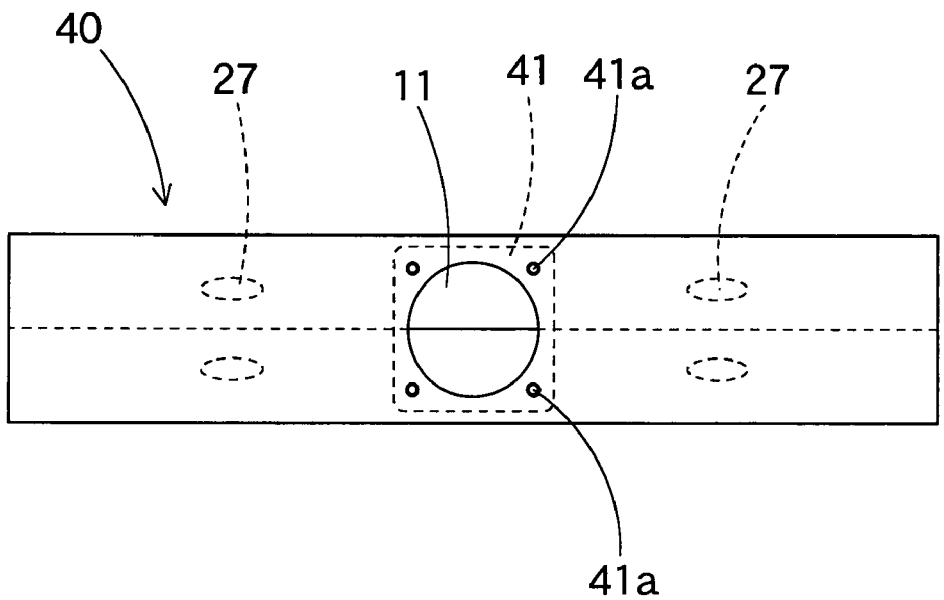
FIG. 14 is a bottom view of the flow regulating cloth of FIG. 13.

FIGS. 12 to 14 illustrate a sheet member 36A contrasted with sheet member 36 of the first embodiment. This sheet member 36A will not form an inner bag capable of exerting the pressing force. Specifically, sheet member 36A has a uniform width BL in the direction orthogonal to crease FV from central region 37 constituting central area 21 toward leading ends 38a of wing portions 38 constituting arms 23F and 23B. If sheet member 36A is folded into to two on crease FV and joined at outer edges 36a, it will only make a generally tubular flow regulating member 40 opened at front and rear ends for allowing inflation gas to flow out of both of the ends. If a retainer 41 is attached to this flow regulating cloth 40 to fix a peripheral area of inlet opening 11 to a case and inflation gas G is fed via inlet opening 11 to inflate flow regulating member 40, an edge line 29a of an upper wall 29 of member 40 opposing inlet opening 11 is not formed into a projected shape, and arms 23F and 23B are not formed into tapered shapes toward leading end portions 26, as shown in FIGS. 13 and 14. Moreover, an upper edge length LU of upper wall 29 in member 40 is not longer than a lower edge length LD of lower wall 30, but is rather equal to the lower edge length LD. Therefore, pressing force PW is not exerted.

Figure 15:
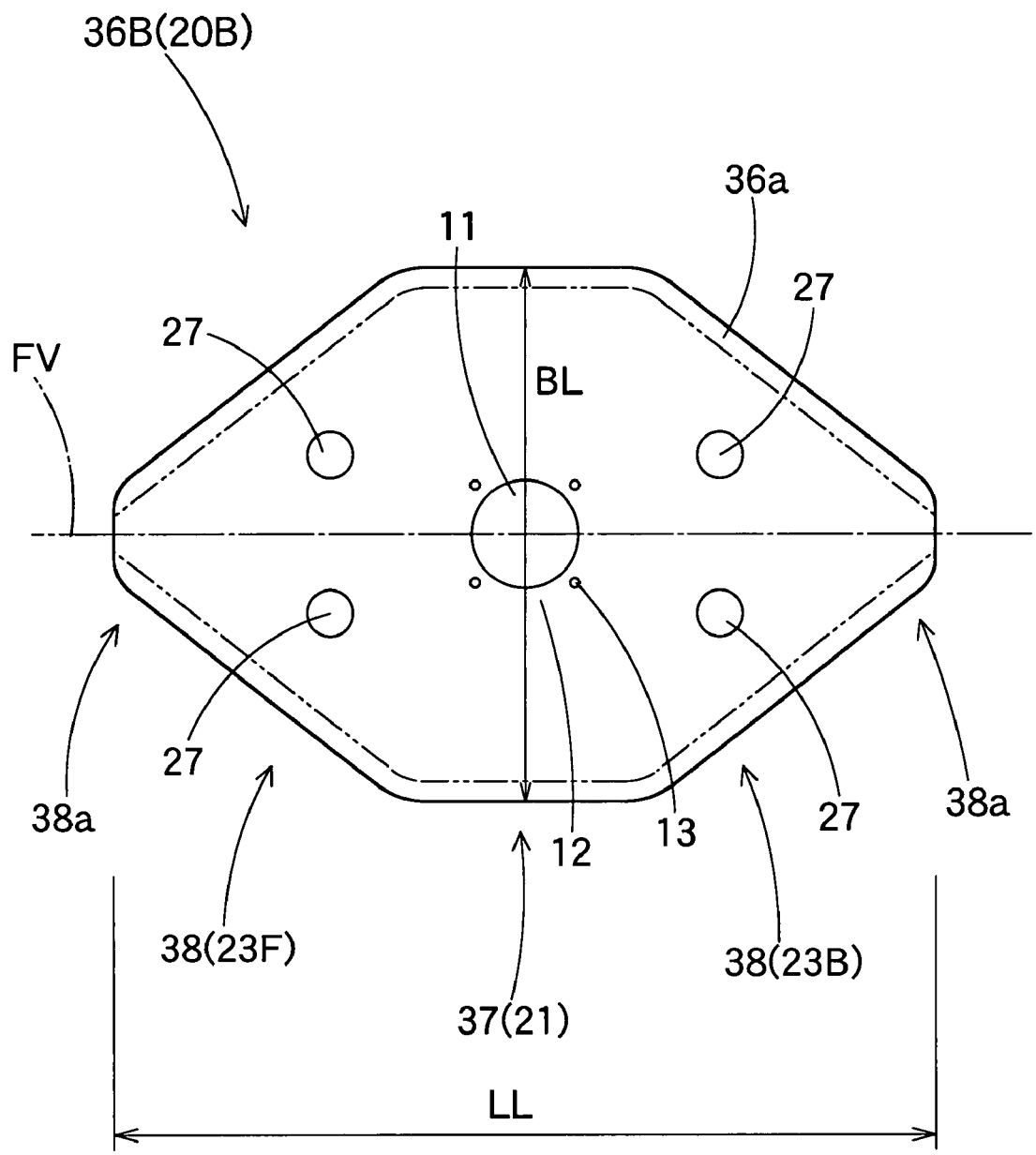
FIG. 15 is a development of a sheet member for manufacturing a modification of the inner bag of the first embodiment.
Figure 16:
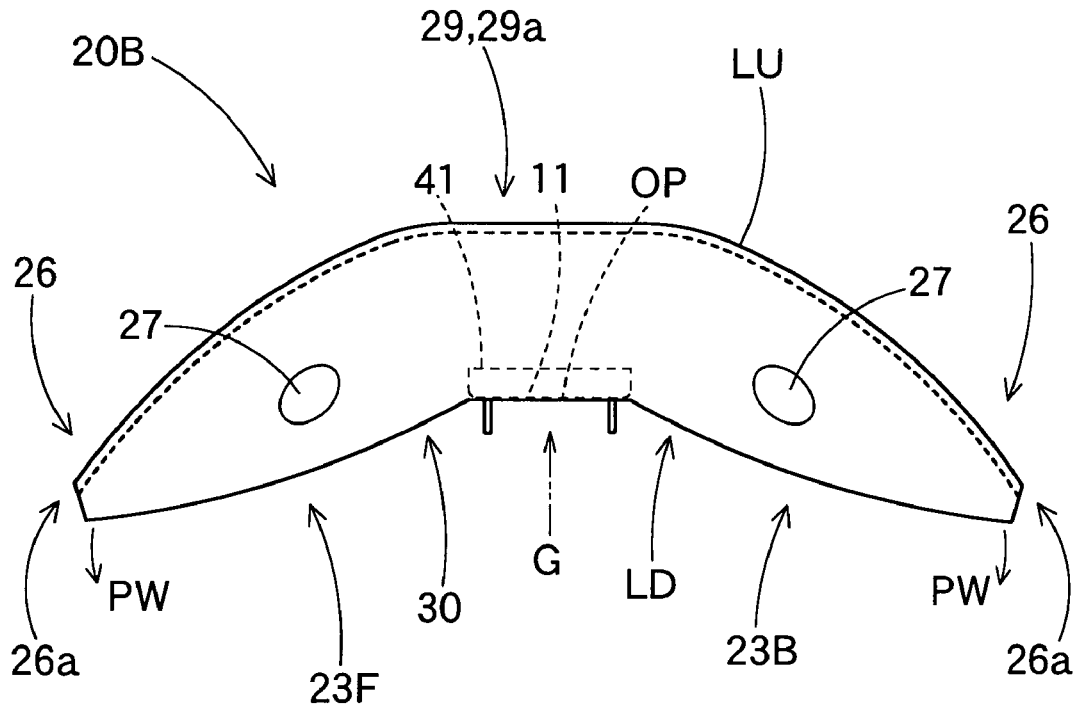
FIG. 16 is a schematic front view of an inner bag made of the sheet member of FIG. 15 inflated by itself.
Figure 17:
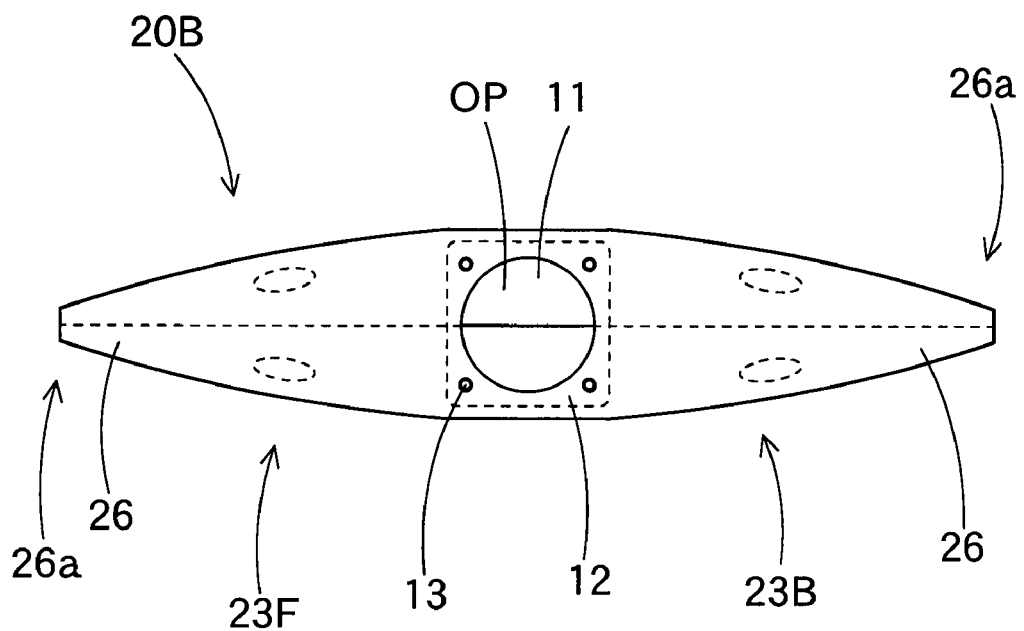
FIG. 17 is a schematic bottom view of the inner bag of FIG. 16.

The inner bag may have opened leading end tops 26a as in an inner bag 20B shown in FIGS. 15 to 17, provided that an opening at top 26a has a smaller opening area than outlet port 27 for supplying inflation gas to outer bag 15 and that the circumferential walls of arms 23 are so inflatable to a leading end of a leading end portion 26 as to generate a tension force so that the pressing force is exerted at the leading end. Inner bag 20B is made out of a sheet member 36B whose width BL in the direction orthogonal to crease FV is reduced from central region 37 constituting central area 21 toward leading ends 38a of wing portions 38 constituting arms 23F and 23B. Inner bag 20B is formed by folding sheet member 36B into two on crease FV and joining or sewing up overlapped outer edges 36a except the vicinity of leading ends 38a. If a retainer 41 is attached to this inner bag 20B to fix a peripheral area of inlet opening 11 and inflation gas G is fed via inlet opening 11 to inflate inner bag 20B, it smoothly inflates to the vicinity of tops 26a of arms 23F and 23B, as shown in FIGS. 16 and 17. Moreover, in inner bag 20B, an edge line 29a of an upper wall 29 opposing inlet opening 11 is formed into a projected shape, and its arms 23F and 23B are formed into tapered shapes toward leading end portions 26. In addition, an upper edge length LU of upper wall 29 in inner bag 20B is longer than a lower edge length LD of lower wall 30. Therefore, pressing force PW is secured.

Figure 18:
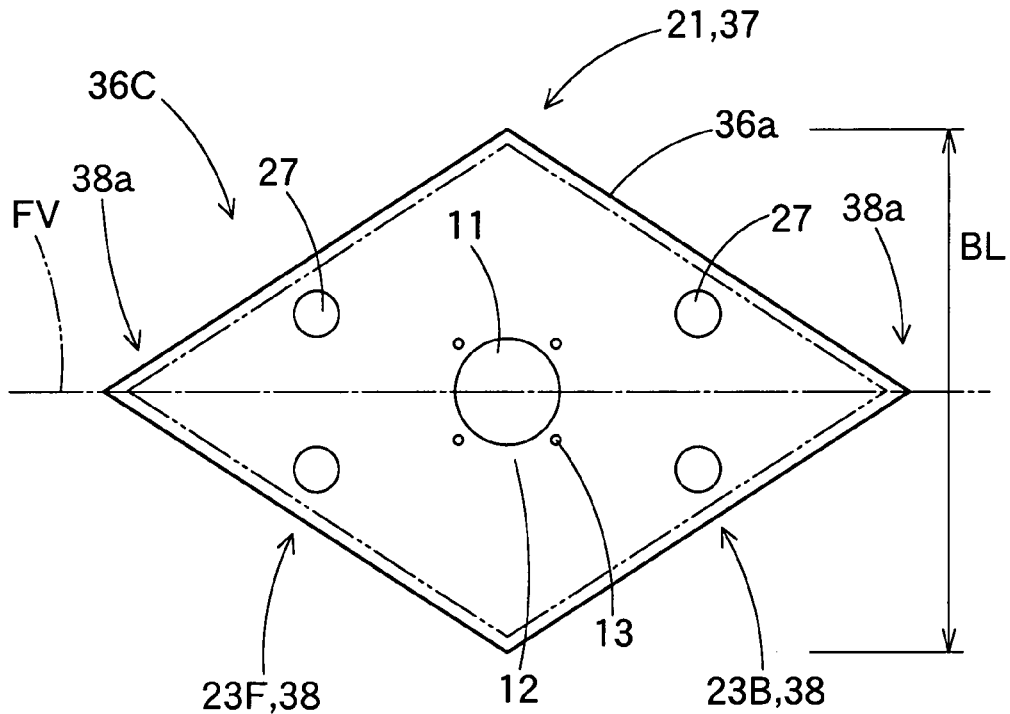
FIG. 18 is a development of a sheet member for manufacturing another modification of the inner bag of the first embodiment.
Figure 19:
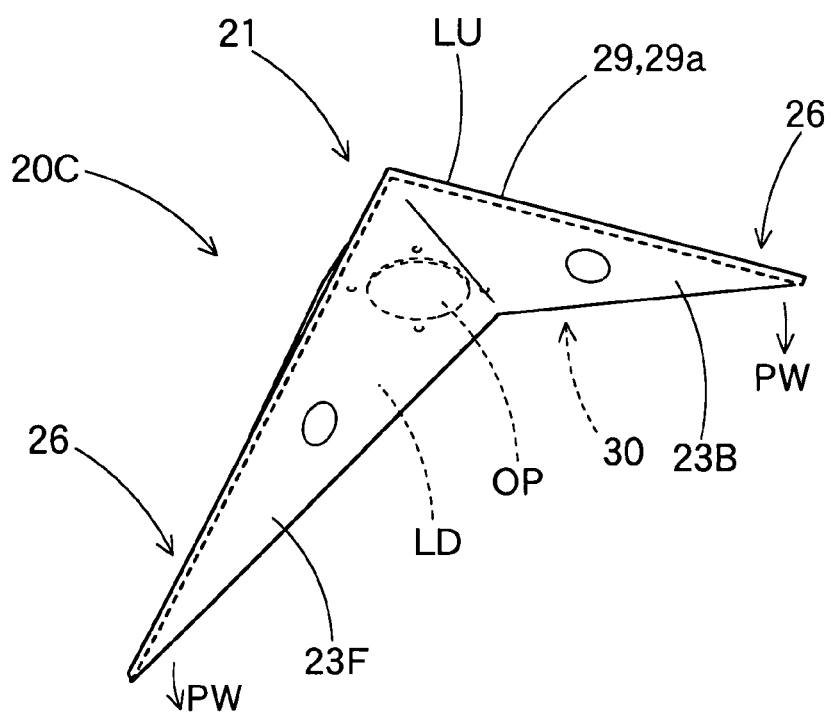
FIG. 19 is a perspective view of an inner bag made of the sheet member of FIG. 18.

An outer contour of the sheet member may be a rhombic shape whose width BL in the direction orthogonal to crease FV is reduced from central region 37 toward leading ends 38a of wing portions 38 like a sheet member 36C shown in FIGS. 18 and 19. The strong pressing force PW is secured with an inner bag 20C made out of sheet member 36C, too, since leading end portions 26 of arms 23F and 23B are disposed below opening plane OP of inlet opening 11 at the complete inflation of inner bag 20C.

Figure 20:
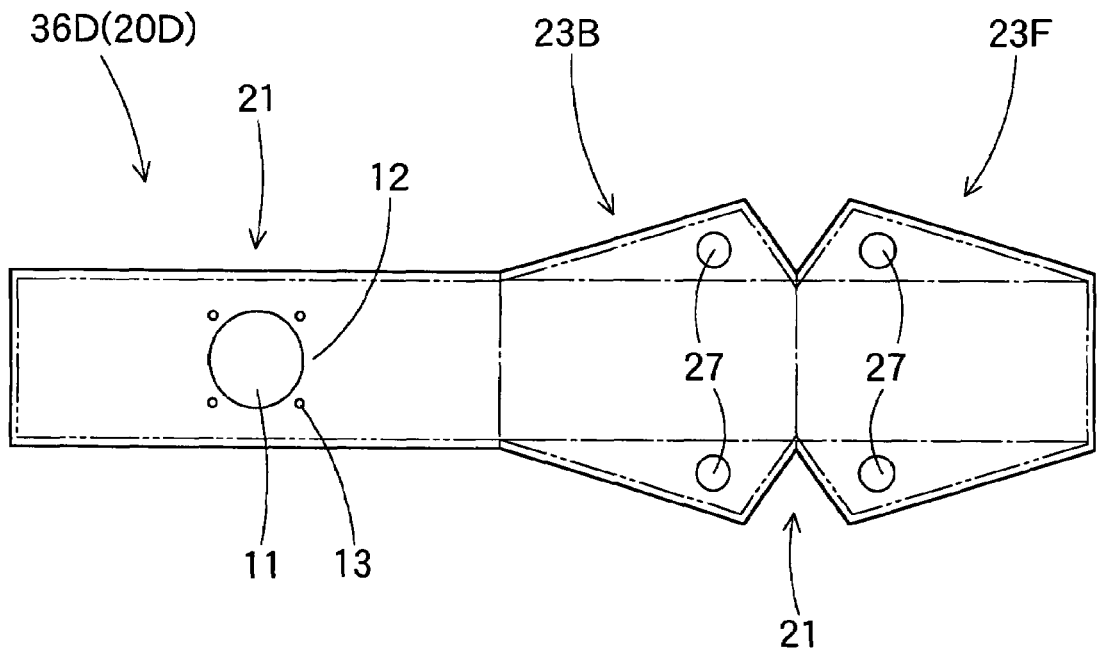
FIG. 20 is a development of a sheet member for manufacturing yet another modification of the inner bag of the first embodiment.
Figure 21:
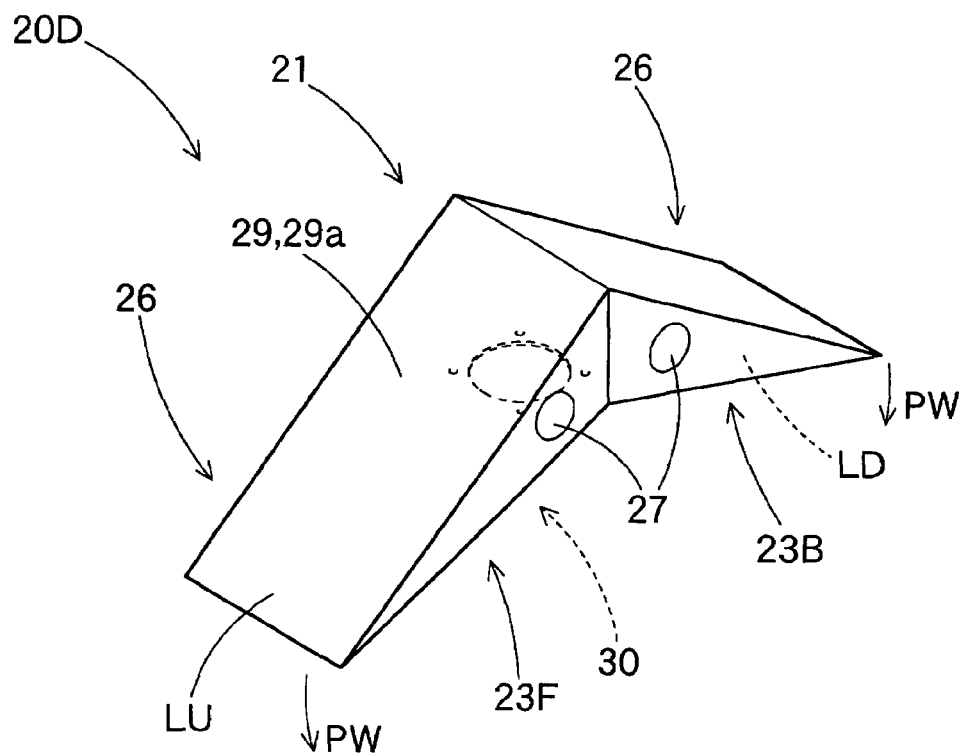
FIG. 21 is a perspective view of an inner bag made of the sheet member of FIG. 20.

The inner bag may be formed by joining parts of a flexible sheet member into a three-dimensional contour provided that its arm is constructed to hold down the peripheral defected region which is an area of the outer bag encompassing the inlet opening and defected from the housing onto members disposed around the housing by a leading end portion of the arm facing away from the inlet opening all the while that the inner bag remains completely inflated at the operation of the airbag apparatus. FIGS. 20 and 21 illustrate an inner bag 20D formed by joining peripheral edges of a single flexible sheet member 36D fabricated of polyester or the like and cut into a predetermined shape into a three-dimensional contour. Inner bag 20D includes, when inflated, two arms 23F and 23B each of which extending along the diametral direction of inlet opening 11 from a bulged central area 21 where inlet opening 11 is located while tapering toward respective leading ends. Moreover, when inner bag 20D is inflated by itself with inflation gas fed from inlet opening 11 in a fixed state at the peripheral region of inlet opening 11, each of outlet ports 27 is disposed to inlet opening 11 relative to leading end portion 26 of arm 23F or 23B so that circumferential walls of arms 23F and 23B inflate wholly to tops 26a of leading end portions 26. Further, when inner bag 20D is inflated by itself, as viewed from a direction orthogonal to an extending direction of arms 23F and 23B, an edge line 29a of upper wall 29 of inner bag 20D opposing inlet opening 11 has a projected shape, and an upper edge length LU of the edge line of upper wall 29 is longer than a lower edge length LD of the edge line of lower wall 30 on which inlet opening 11 is disposed. Accordingly, leading end portions 26 of arms 23F and 23B of inner bag 20D, too, secure an accurate downward pressing force PW.

In the first embodiment, as indicated in the parentheses in FIG. 8, axial directions GD of outlet ports 27 of the completely inflated inner bag 20 are oriented about 30 degrees upward relative to top plane PR of ring R from axial center C of arms 23 so that inflation gas G is emitted from outlet ports 27 along this axial direction GD. With this structure, inflation gas G is fed into outer bag 15 via outlet ports 27 without hindering leading end portions 26 of arms 23F and 23B from pressing toward top plane PR of ring R.

It is desired that an outflow direction GD of inflation gas flowing out of outlet port 27, i.e., axial direction GD of the outlet port 27 falls within a range of angle θ from a direction DH running generally orthogonal to the pressing direction of leading end portions 26 toward top plane PR of ring R to a direction DV opposite from the pressing direction so that arms 23 are prevented from moving. Specifically, if, for example, outflow direction GD of inflation gas G from an outlet port 27, or axial direction GD of outlet port 27 is set to be the direction DV opposite from the pressing direction of leading end portions 26 toward members around the airbag housing, one or more outlet ports 27 can be disposed at positions opposing top plane PR of ring R disposed around the airbag housing. This arrangement will keep arms 23 in place and enable arms 23 to keep holding down when inflation gas G is emitted out of outlet ports 27. On the other hand, if outflow direction or axial direction GD is set close to the direction DH generally orthogonal to the pressing direction of leading end portions 26, more than one outlet ports 27 can be disposed symmetrically along the circumferential direction of arm 23 in consideration of a balance of reaction forces caused by the outflow of inflation gas G. In the first embodiment, each of two pairs of outlet pots 27 is disposed symmetrically along the circumferential direction of each of arms 23. Accordingly, leading end portions 26 of arms 23F and 23B are allowed to exert the pressing force in a stable manner when inflation gas G is emitted out of outlet ports 27.

However, the outlet ports may be so disposed on the arm as to be oriented obliquely downward, or may be disposed at the center of inner bag as long as the inner bag secures a quick inflation and the leading end portions of the arms are capable of holding down the peripheral defected region of the outer bag.

Figure 10:
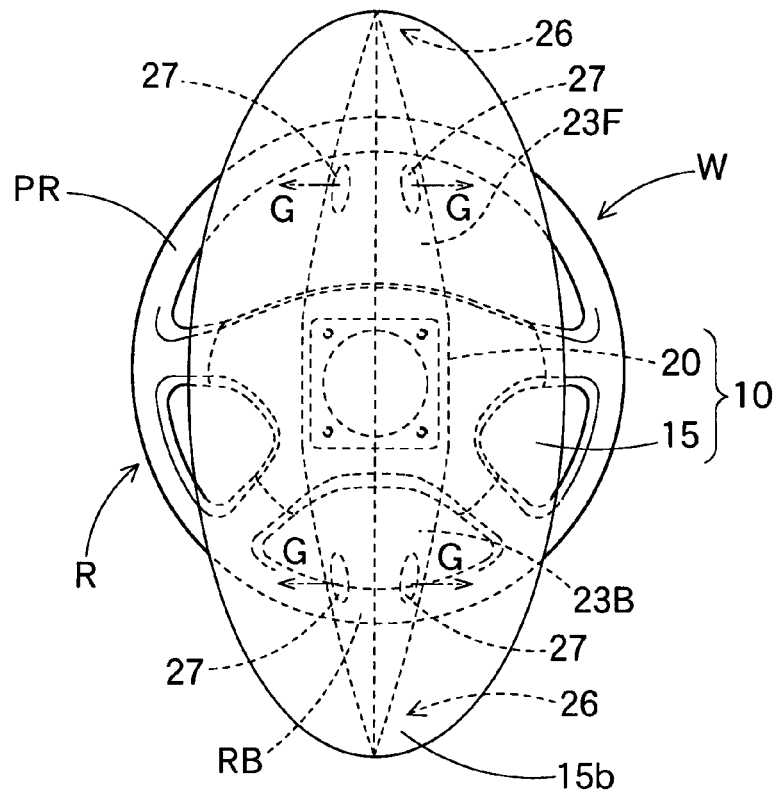
FIG. 10 is a plan view of the inner bag of FIG. 3 in an initial stage of inflation at the operation of the airbag apparatus.

Moreover, in the initial stage of inflation of inner bag 20 at the operation of airbag apparatus M1, inner bag 20 projects from case 45 or the airbag housing disposed on top of boss area B, and extends arms 23F and 23B quickly and expands forward and rearward along top plane PR of ring R without projecting toward a driver thickly as shown in FIGS. 9A and 10. Thereafter, when inner bag 20 completes inflation as shown in FIGS. 9B and 11, inflation gas G is fed into outer bag 15 from outlet ports 27 of arms 23F and 23B, so that outer bag 15 expands in the lateral direction along top plane PR of ring R without projecting toward a driver thickly. At this time, a rear lower region 15b of outer bag 15 deployed on a rear portion RB of ring R increases its thickness gradually while covering rear portion RB. Accordingly, even if a driver is positioned proximate ring R in the initial stage of inflation of outer bag 15, rear lower region 15b is deployed in a thin state between an abdomen of the driver and rear portion RB of ring R, and then inflates to be thickened. Hence, outer bag 15 protects the abdomen positioned proximate steering wheel W smoothly from rear portion RB of ring R.

If this advantage does not have to be considered, two arms 23 of inner bag 20 may be disposed to extend to both sides of the lateral direction from central area 21.

Figure 22:
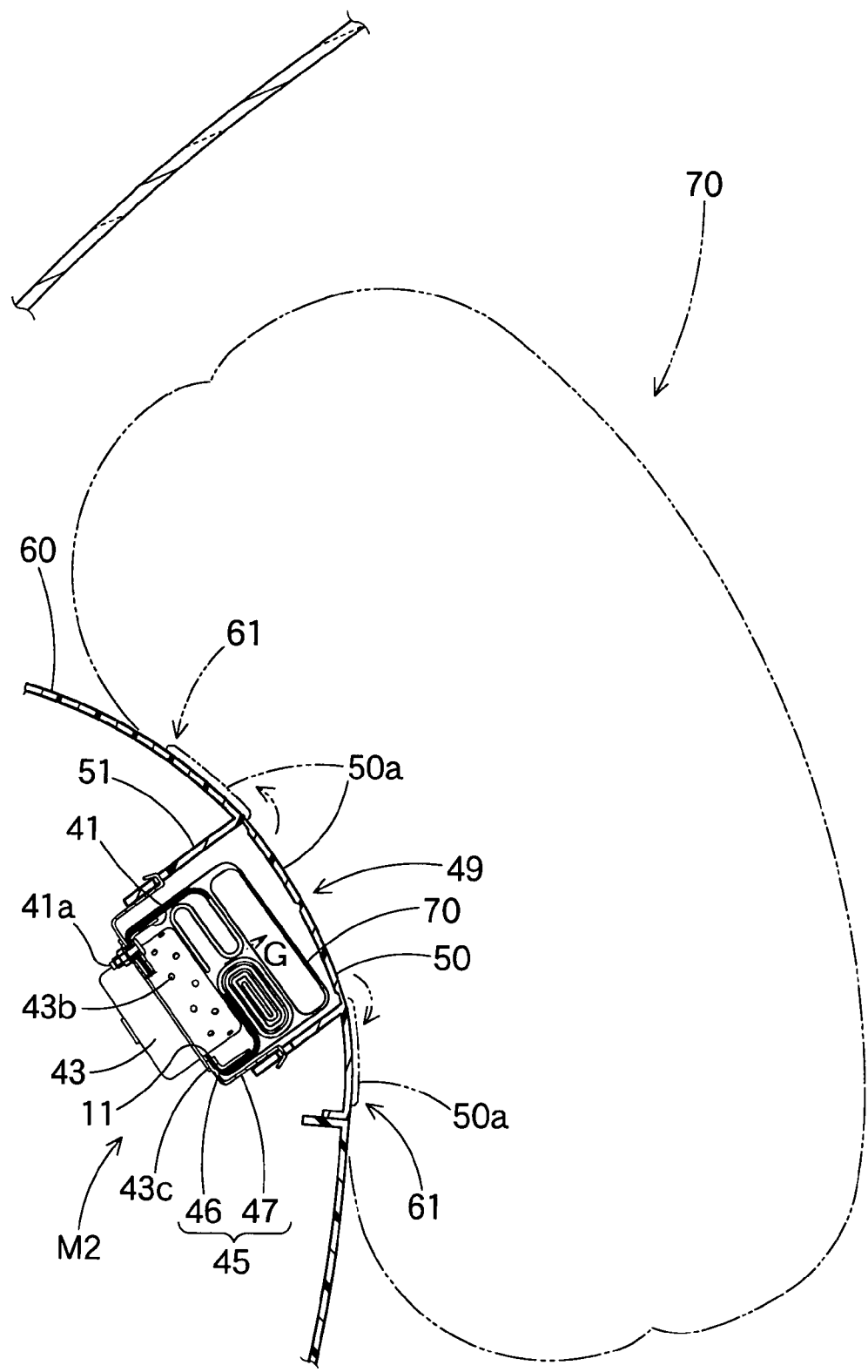
FIG. 22 is a vertical section of an airbag apparatus for a front passenger's seat according to the second embodiment of the invention which is mounted on a vehicle.
Figure 23:
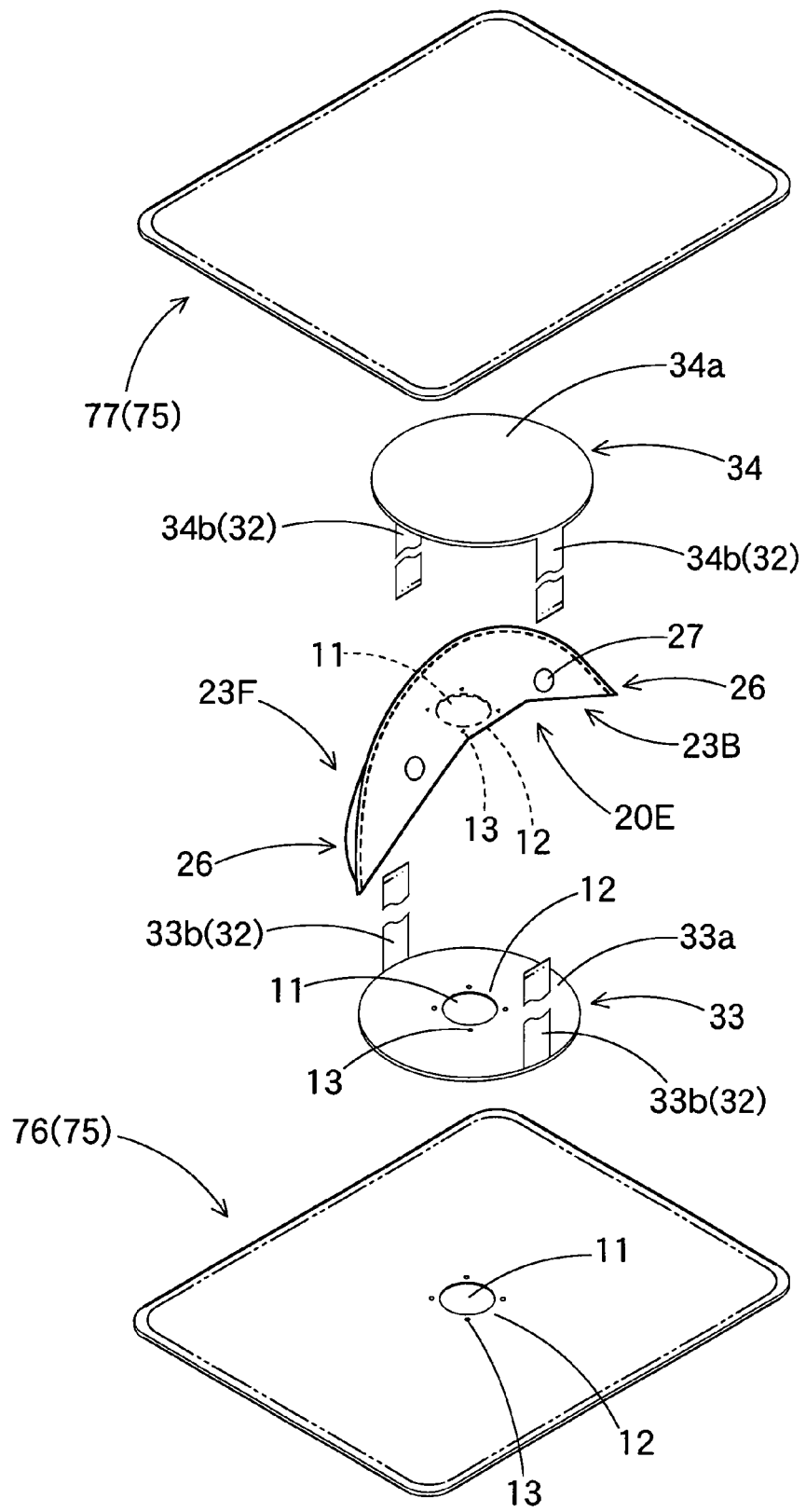
FIG. 23 is a perspective exploded view of components of an airbag used in the airbag apparatus of FIG. 22.

Although airbag apparatus M1 of the first embodiment has been described as applied to steering wheel W, the present invention may be applied to an airbag apparatus for a front passenger's seat. FIGS. 22 to 24 illustrate an airbag apparatus M2 for a front passenger's seat according to the second embodiment of the present invention. Airbag apparatus M2 includes a housing or case 45 for housing a folded airbag 70, and housing 45 is located on an instrument panel or dashboard 60. An inner bag 20E of apparatus M2 is designed so that leading end portions 26 of its arms 23F and 23B get on a surface side area 61 of dashboard 60 upon a complete inflation of inner bag 20E at the operation of airbag apparatus M2. In this embodiment, surface side area 61 refers to an area of dashboard 60 located around the housing, which includes back sides of opened doors 50a of airbag cover 49 and a surface region of dashboard 60 encompassing the opening provided by the opening of doors 50a.

Airbag 70 considerably differs from above-described airbag 10 in that a vehicle body side wall 76 and an occupant side wall 77 forming an outer bag 75 each have a rectangular plate shape. Case 45 is directly secured to the vehicle body unlike case 45 of the first embodiment which is secured to the vehicle body with a horn switch mechanism disposed therebetween. Moreover, airbag cover 49 is integral with dashboard 60. Other than those above, airbag apparatus M2 differs from apparatus M1 only in that respective members and parts are larger in size in accordance with that airbag 70 is designed to have a greater volume for a front passenger's seat. Accordingly, common members and parts are assigned common reference numerals. To mount airbag apparatus M2 on the vehicle, folded airbag 70 and inflator 43 are housed in case 45 utilizing a retainer 41. Subsequently, a side wall 47 of case 45 is coupled with a side wall 51 of airbag cover 49 as part of dashboard 60 which has been mounted on the vehicle preliminarily. Then if unillustrated mounting brackets formed on a bottom wall 46 of case 45 are attached to the vehicle body, airbag apparatus M2 is mounted on vehicle.

Figure 24A:
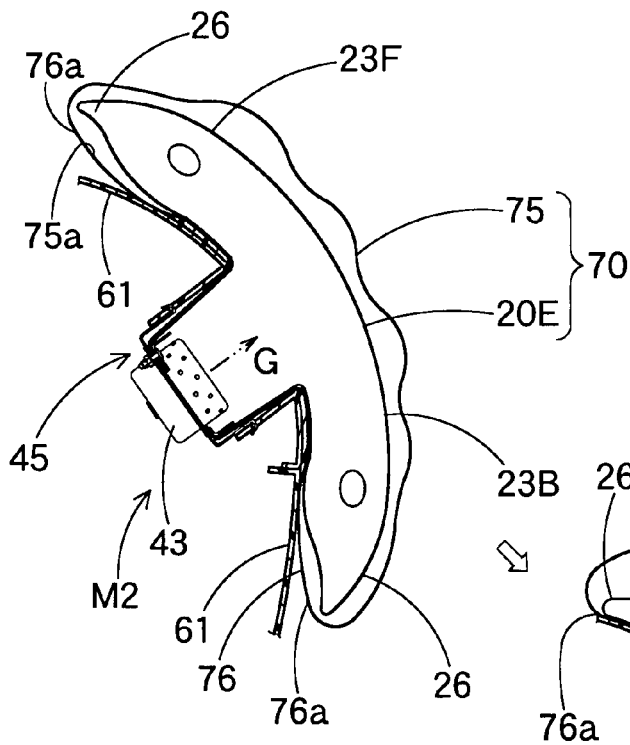
FIGS. 24A, 24B and 24C are schematic vertical sections showing the operation of the airbag apparatus of FIG. 22 in order.
Figure 24B:
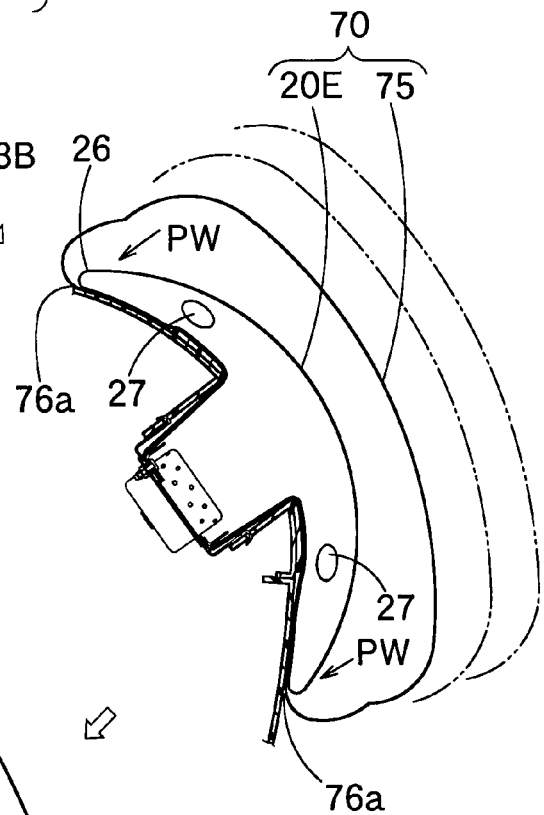

When airbag apparatus M2 for a front passenger's seat is activated, inflation gas G flows into airbag 70 via inlet opening 11 as shown in FIG. 22, and airbag 70 inflates and opens doors 50a of airbag cover 49. Then as indicated by phantom lines in FIG. 22, airbag 70 projects from case 45 and completes inflation in such a manner as to cover surface side area 61 of dashboard 60 disposed around case 45. At that time, in the initial stage of airbag inflation, an inner bag 20E, which is free to move separated from an inner surface 75a of an outer bag 75, completes inflation prior to outer bag 75 as shown in FIGS. 24A and 24B. Outer bag 75 then inflates by being pushed by the inflating inner bag 20E or by inflation gas G emitted out of outlet ports 27 of inner bag 20E, thereby projecting from case 45 together with inner bag 20E.

Figure 24C:
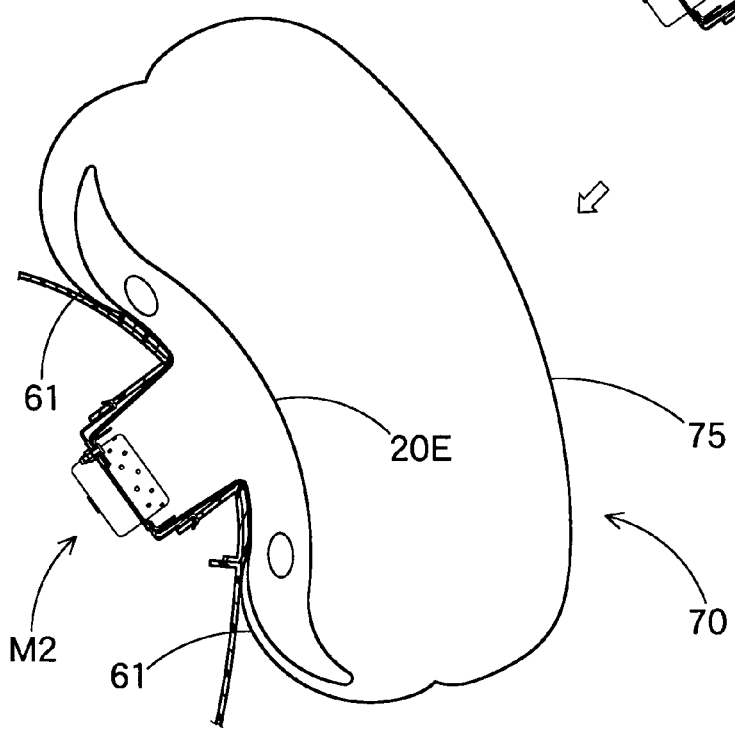

When outer bag 75 inflates, while inner bag 20E having inflated in advance of outer bag 75 remains completely inflated, leading end portions 26 of arms 23F and 23B of inner bag 20E facing away from inlet opening 11 hold down peripheral defected region 76a, which is an area of vehicle body side wall 76 encompassing inlet opening 11 and defected from case 45, onto surface side area 61 positioned around case 45, and keep on holding the same. In the second embodiment, too, after airbag 70 or outer bag 75 completes inflation, if the supply of inflation gas G is stopped, inner bag 20E deflates from the inflated state as shown in FIGS. 24B and 24C, and no more pressing force PW is exerted.

Therefore, in airbag apparatus M2 for a front passenger's seat W according to the second embodiment, outer bag 75 inflates without floating up from surface side area 61 of dashboard 60 during a time period from the initial stage of airbag inflation until the stop of delivery of inflation gas G. Accordingly, outer bag 75 inflates toward an occupant in a widely expanded state and with less area partially projecting toward the occupant. As a result, if outer bag 75 engages the occupant having been positioned proximate outer bag 75 during inflation, outer bag 75 receives the occupant softly with its wide plane.

Although arms 23F and 23B of inner bag 20E in the second embodiment extend toward the front and rear from central area 21, arms 23 may extend toward both sides of the lateral direction from central area 21.

In the first and second embodiments, arms 23F and 23B of inner bag 20/20E are wholly separable from outer bag 15/75 so that the arms are allowed to inflate freely without being tied down by inner surfaces 15a/75a of outer bag 15/75. This structure enables arms 23F and 23B to move freely relative to inner surfaces 15a/75a of outer bag 15/75. Accordingly, if inner bag 20/20E is formed into such a contour as to hold down peripheral defected region 16a/76a of outer bag 15/75 easily, inner bag 20/20E will be inflated into that contour smoothly.

Figure 25:
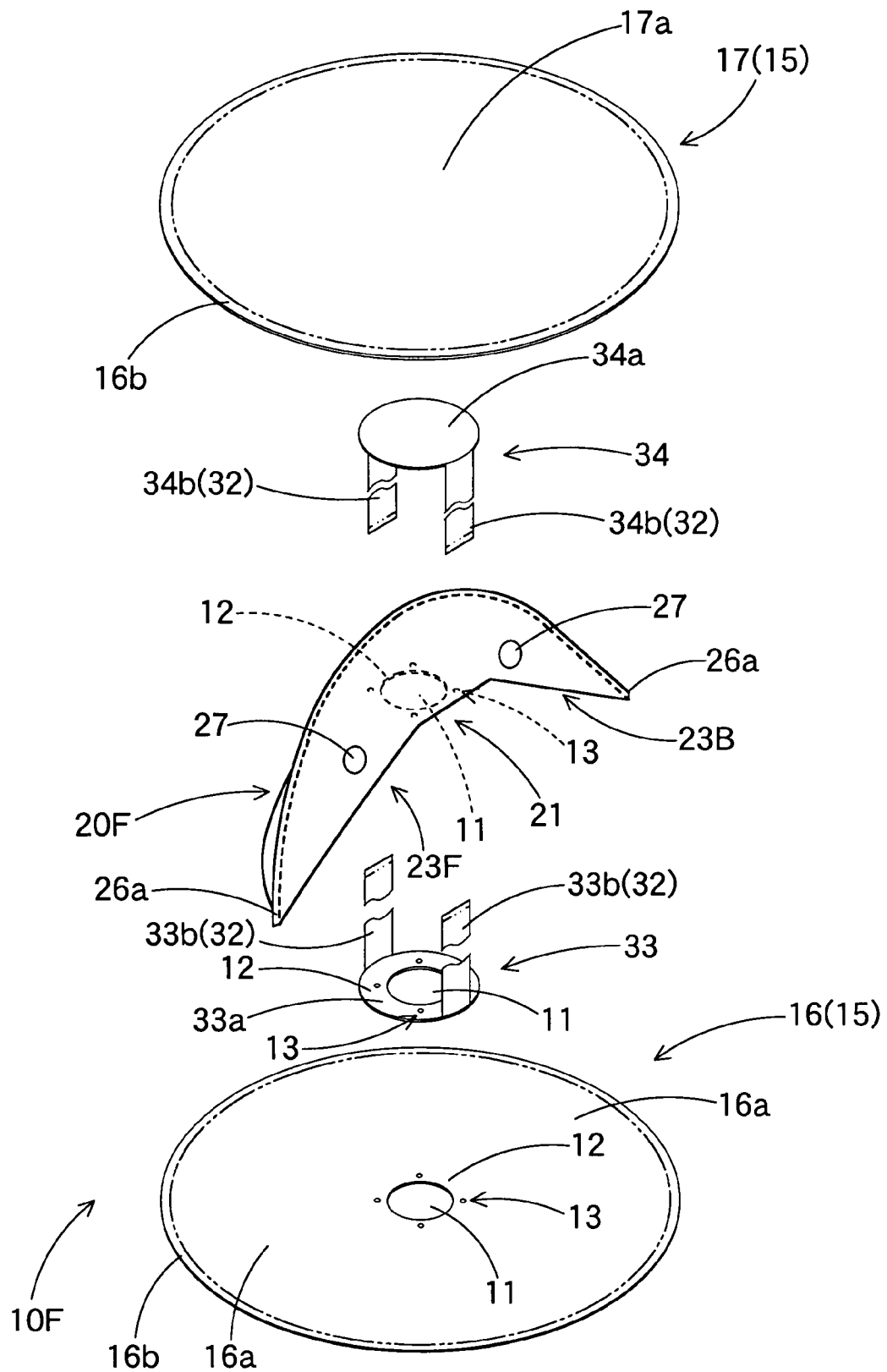
FIG. 25 is a perspective exploded view of components of an airbag used in an airbag apparatus of the third embodiment.
Figure 26:
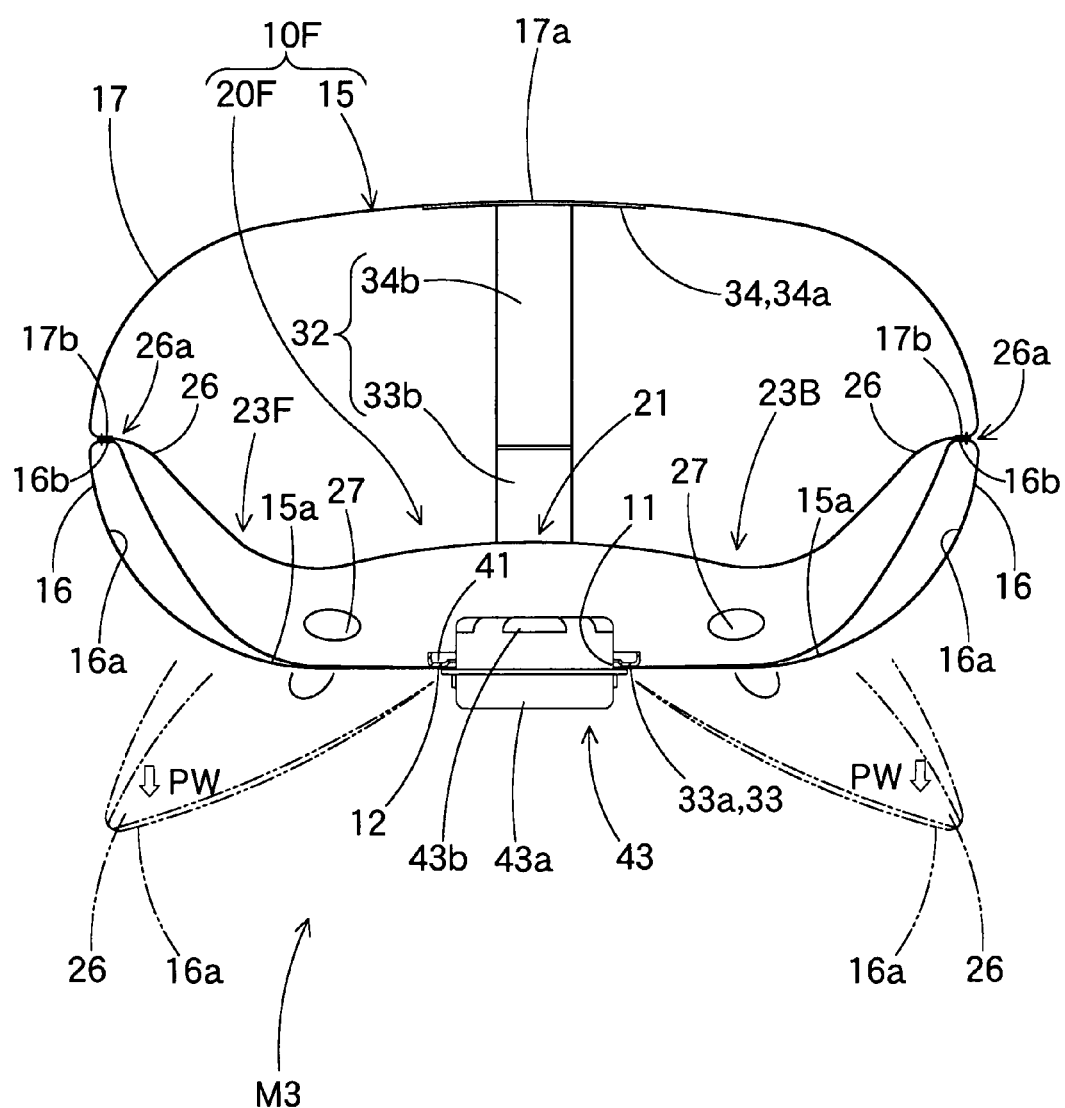
FIG. 26 is a schematic vertical section of the airbag used in the third embodiment taken along the longitudinal direction, which shows an inner bag in a deflated state while the airbag is completely inflated.

However, it will also be appreciated that at least leading end portions 26 of the inner bag are joined to peripheral defected region 16a of outer bag 15 by sewing or the like as in an airbag 10F used in an airbag apparatus M3 according to the third embodiment of the invention and shown in FIGS. 25 to 27. In the third embodiment, the length of inner bag 20F is designed to be more elongate than that of inner bag 20 of the first embodiment. Specifically, when being flattened and overlaid on a vehicle body side wall 16, the length of inner bag 20F is equal to the diameter of vehicle body side wall 16. Inner bag 20F is sewn up to outer bag 15 at tops 26a of its leading end portions 26 when outer edges 16b and 17b of vehicle body side wall 16 and driver side wall 17 are sewn together. The third embodiment has a similar structure to the first except this point, and therefore, descriptions of common members and parts will be omitted while assigning common reference numerals to those members and parts.

Figure 27A:
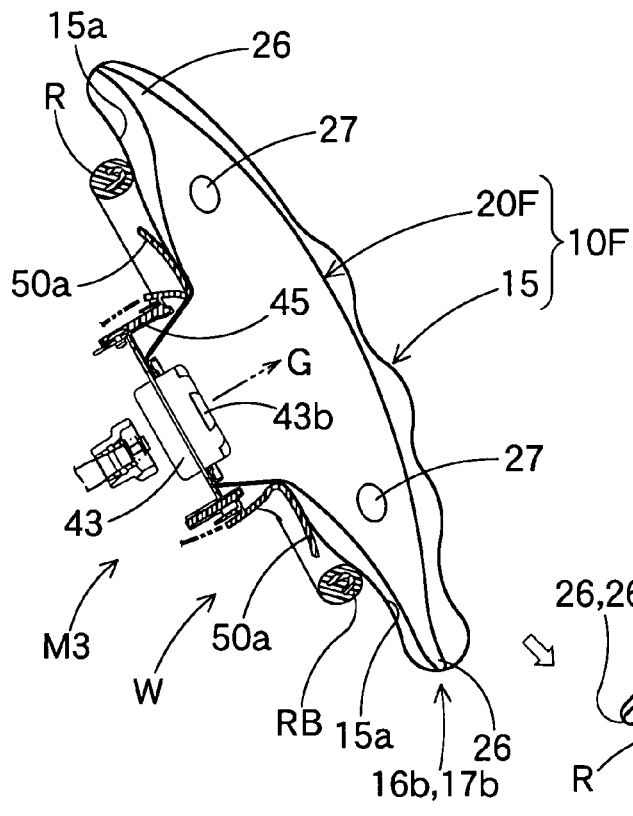
FIGS. 27A, 27B and 27C are schematic vertical sections showing the operation of the airbag apparatus of the third embodiment in order.
Figure 27B:
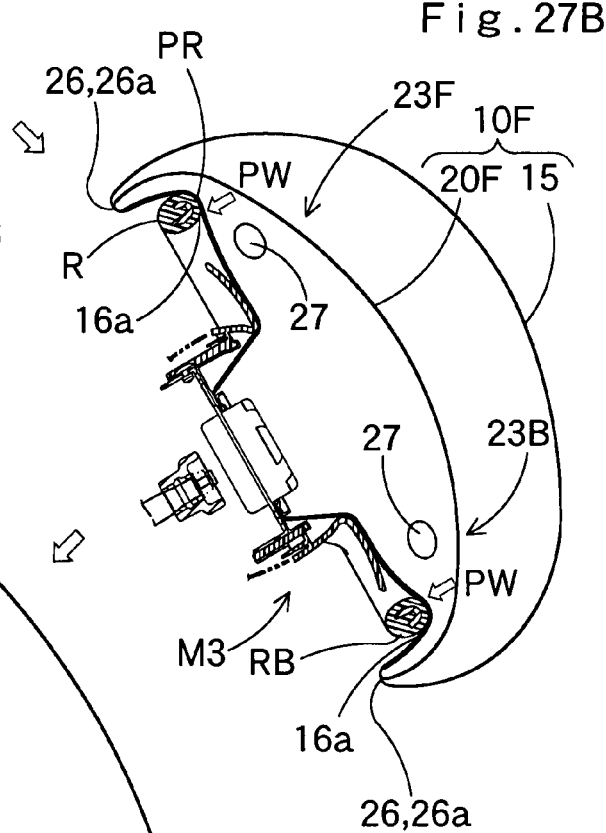

In the third embodiment, too, if inflation gas G flows into airbag 10F via inlet opening 11 at the operation of airbag apparatus M3, airbag 10F opens doors 50a of airbag cover 49, projects from case 45 and completes inflation in such a manner as to cover top plane PR of ring R. At that time, in the initial stage of airbag inflation, inner bag 20F completes inflation prior to outer bag 15, and then outer bag 15 starts to inflate as shown in FIGS. 27A and 27B. When outer bag 15 inflates, inner bag 20F, which has inflated in advance of outer bag 15, hold down a peripheral defected region 16a, which is an area of vehicle body side wall 16 encompassing inlet opening 11 and defected from case 45, onto top plane PR of ring R disposed around case 45 by leading end portions 26 of arms 23F and 23B facing away from inlet opening 11, all while inner bag 20F remains completely inflated. Since arms 23F and 23B except tops 26a are free to move relative to inner surface 15a of outer bag 15, inner bag 20F is smoothly inflated into a predetermined contour designed to hold down peripheral defected region 16a of outer bag 15 easily.

Figure 27C:
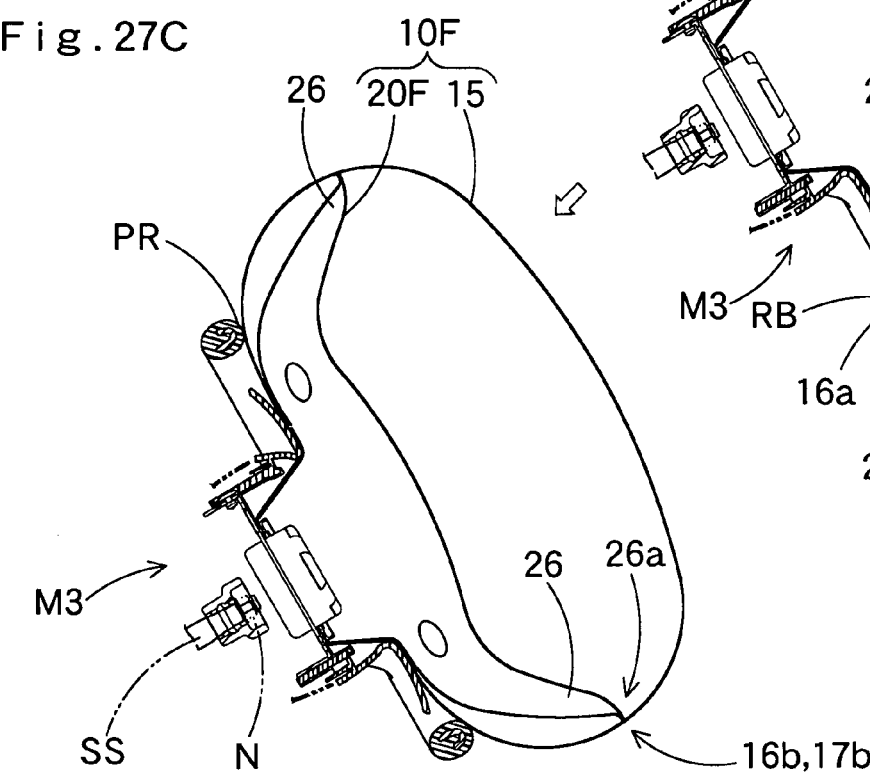

In the third embodiment, too, after completion of airbag inflation, i.e., after outer bag 15 completes inflation by inflation gas G fed via outlet ports 27 of inner bag 20F, if inflator 43 stops supplying inflation gas G, inner bag 20F deflates from the completely inflated contour as shown in FIGS. 27B and 27C.

In airbag apparatus M3 for a steering wheel W according to the third embodiment, too, as in the first embodiment, outer bag 15 inflates with its peripheral defected region 16a deployed in the area around case 45 held from floating up from top plane PR or ring R as shown in FIG. 27B during a time period from the initial stage of inflation until the stop of delivery of inflation gas G, so that the swaying motion of outer bag 15 is suppressed during the course of inflation of outer bag 15. As a result, if outer bag 15 engages a driver during inflation, outer bag 15 secures a cushioning property and receives the driver swiftly.

In the third embodiment, moreover, since tops 26a of inner bag 20F are joined to outer bag 15, leading end portions 26 of inner bag 20F are not displaced relative to peripheral defected region 16a of outer bag 15. Accordingly, the position of inner bag 20F relative to outer bag 15 is stable in the folding work of outer bag 15, which will facilitate the folding work.

Figure 29A:
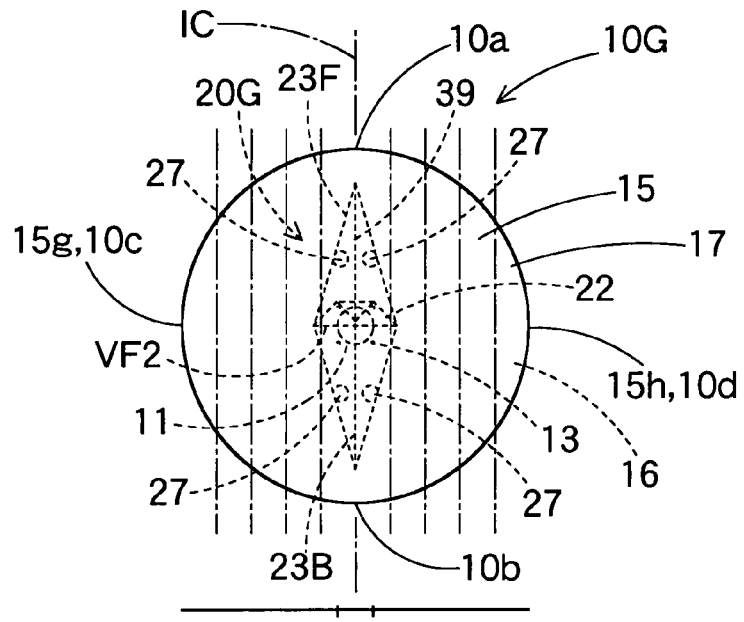
FIGS. 29A, 29B and 29C illustrate a folding process of an airbag of the fourth embodiment in order.
Figure 29B:
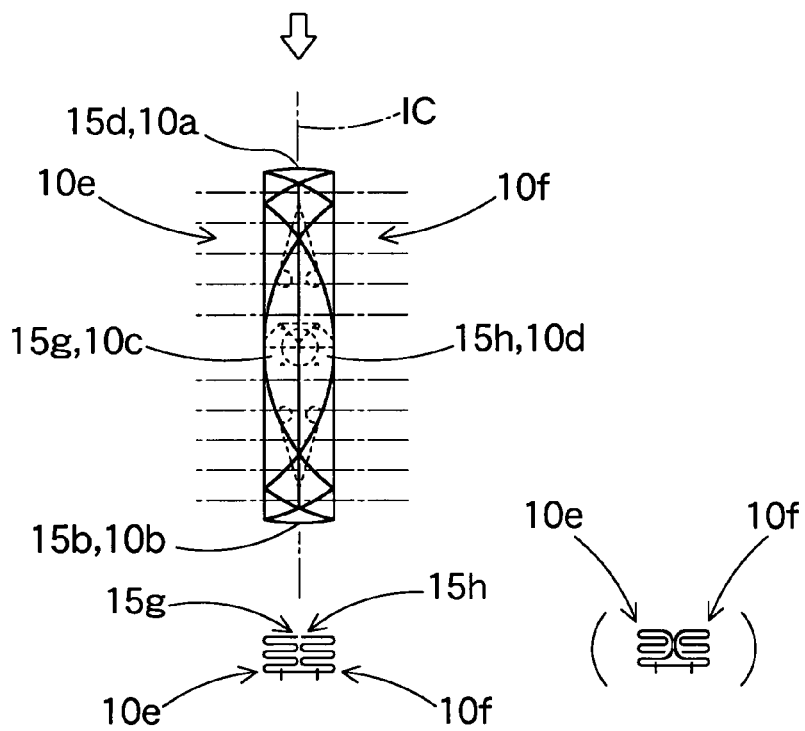
Figure 29C:
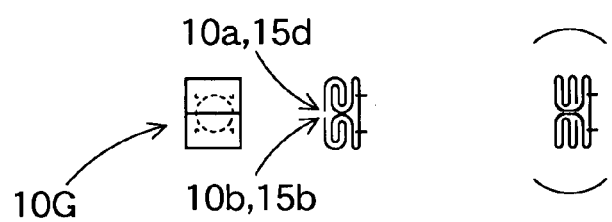
Figure 30:
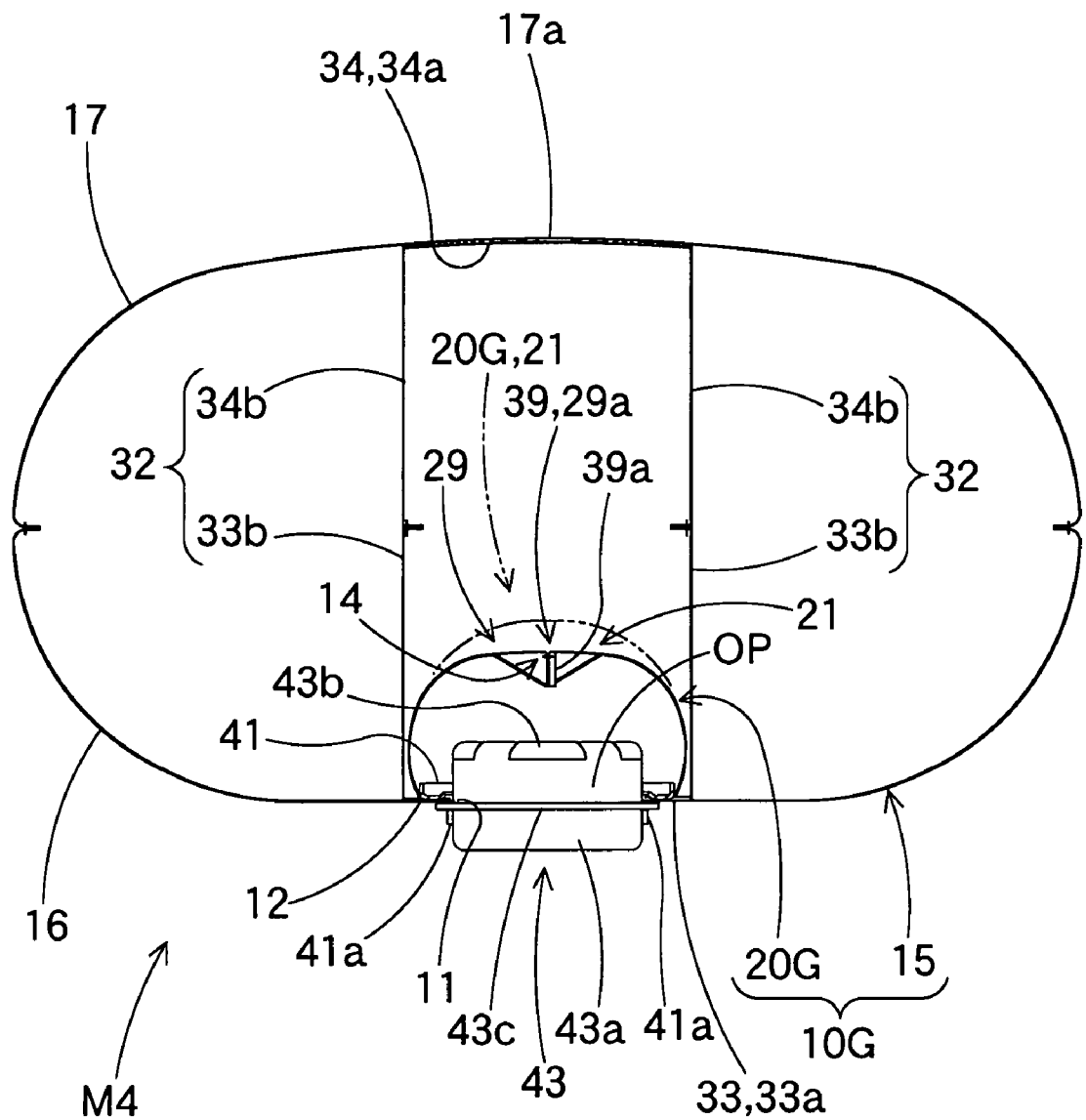
FIG. 30 is a schematic vertical section of the airbag of FIG. 29A taken along the lateral direction, which shows the inner bag in a deflated state while the airbag is completely inflated.
Figure 31:
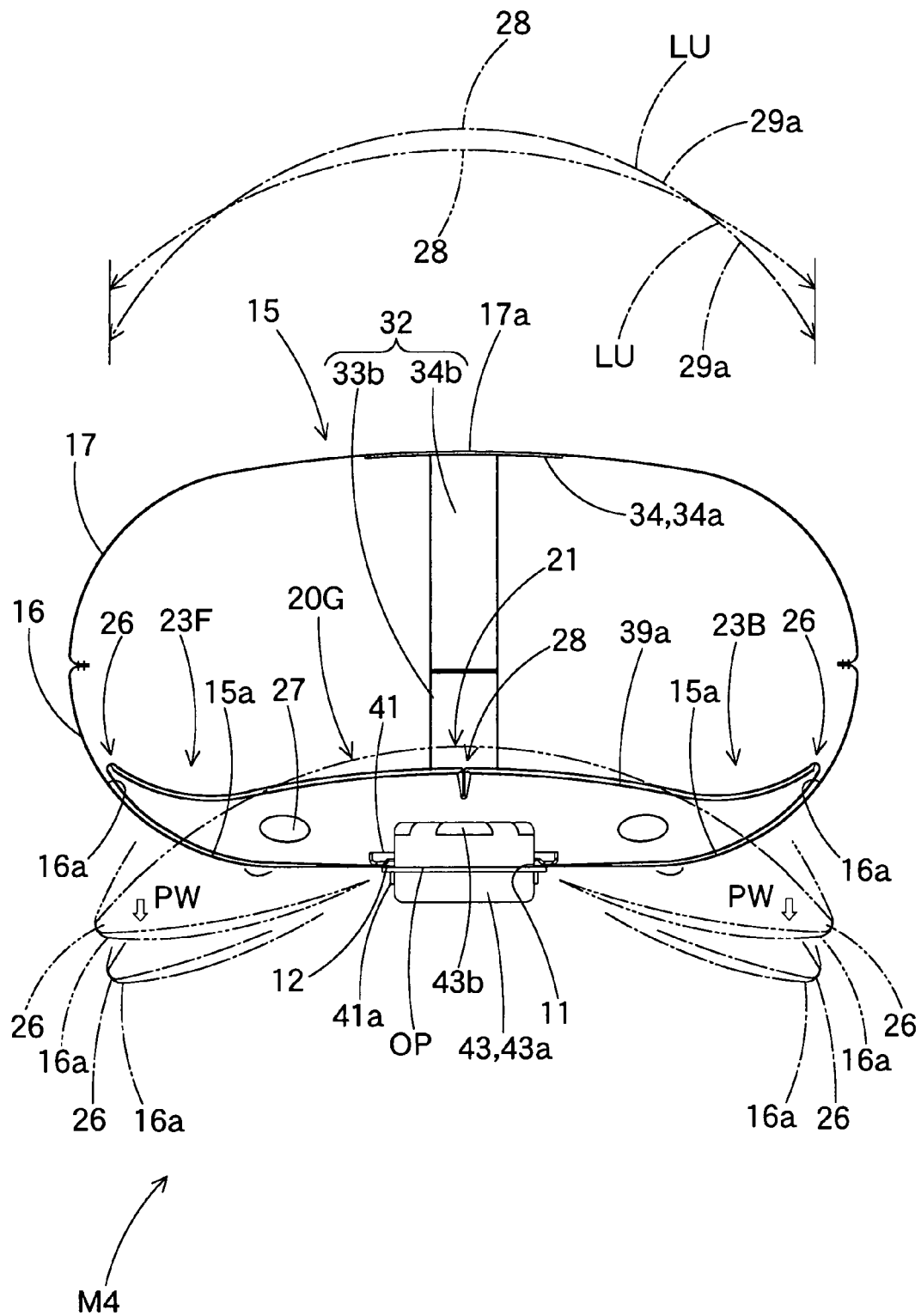
FIG. 31 is a schematic vertical section of the airbag of FIG. 29A taken along the longitudinal direction, which shows the inner bag in a deflated state while the airbag is completely inflated.

FIGS. 28 to 31 illustrate an airbag apparatus M4 according to the fourth embodiment of the invention. In an inner bag 20G of airbag 10G used in apparatus M4, the length LU of an upper edge line of inner bag 20G connecting leading end portions 26 of arms 23F and 23B at a side opposing inlet opening 11 is adjusted when inner bag 20G is made out of a sheet member 36G. As shown in FIG. 28C, in the fourth embodiment, the length LU of the upper edge line of inner bag 20G is adjusted by changing a sewing position (height adjusting portion) 28 (FIG. 28C) by changing a distance OL from a top 22a of an opposing top portion 22 opposing inlet opening 11 and facing away from opening 11 to height adjusting portion 28. By adjusting the upper edge length LU, the pressing force PW of leading end portions 26 of arms 23F and 23B holding down peripheral defected region 16a of outer bag 15 upon inflation of inner bag 20G is adjusted (FIG. 31). Sheet member 36G used to form inner bag 20G has a rhombic contour like sheet member 36C shown in FIG. 18.

Figure 28A:
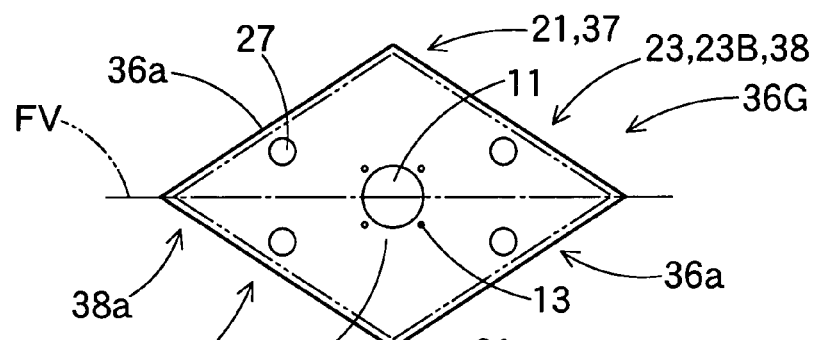
FIGS. 28A, 28B, 28C, 28D and 28E illustrate a manufacturing process of an inner bag used in an airbag apparatus of the fourth embodiment and the way the inner bag is housed inside an outer bag in order.
Figure 28B:
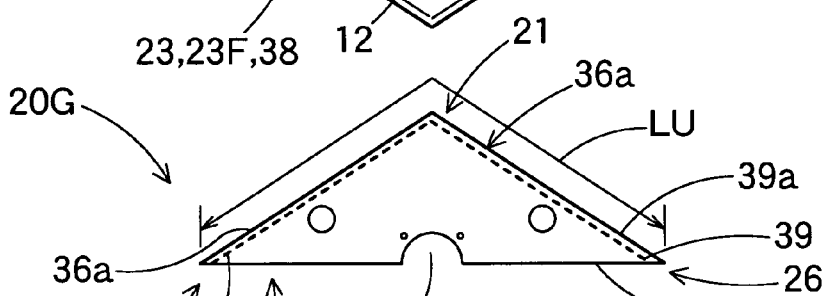
Figure 28C:
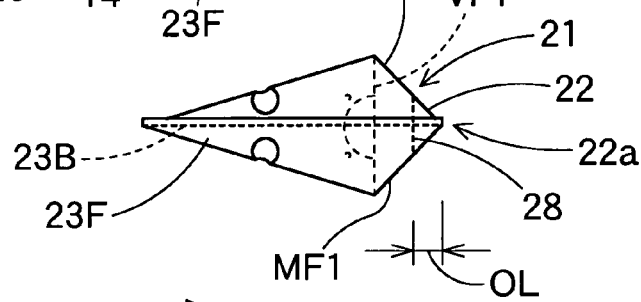
Figure 28D:
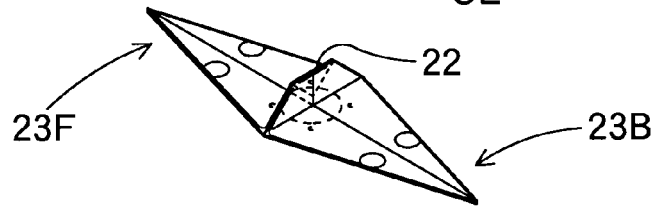
Figure 28E:
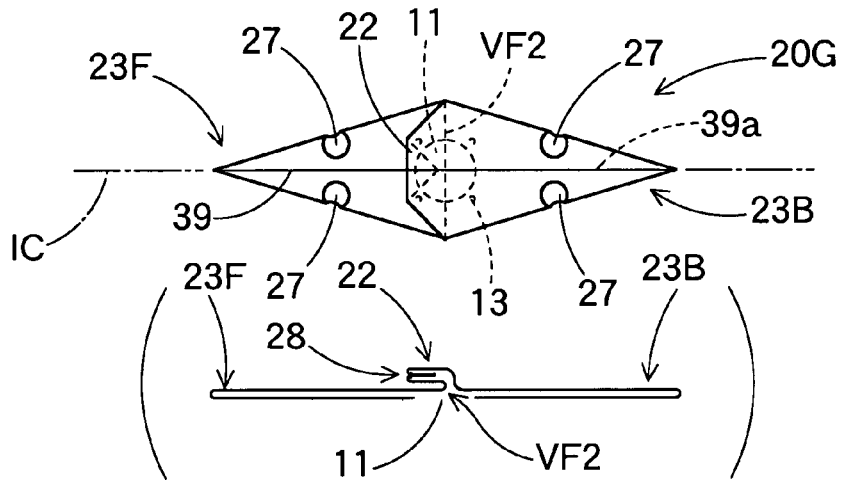

In the fourth embodiment, inner bag 20G is formed by folding sheet member 36G into two and joining overlapped outer edges 36a of member 36G by sewing, thereby forming a joint edge or sewn edge 39 as shown in FIGS. 28A and 28B. Then as shown in FIGS. 28B and 28C, inner bag 20G is folded on a valley crease VF1 extending along the diameter direction of inlet opening 11 and orthogonal to joint edge 39 so that arms 23F and 23B are overlapped with each other at the side where inlet opening 11 is located. At this time, opposing top portion 22, which opposes inlet opening 11 facing away from inlet opening 11 at central area 21, is folded on crest creases MF1 and MF2 continuing from opposite ends of valley crease VF1 so that inner bag 20G is flattened. Subsequently, overlapped portion at opposing top portion 22 is sewn up straightly in parallel to valley crease VF1 at a position offset to valley crease VF1 from a top 22a of opposing top portion 22, which provides height adjusting portion 28. Then as shown in FIGS. 28C and 28D, inner bag 20G is reversed inside out utilizing inlet opening 11 so that a seam allowance 39a of joint edge 39 may be disposed inside inner bag 20G. Thereafter, as shown in FIG. 29A, inner bag 20G is put inside outer bag 15. At this time, a periphery of inlet opening 11 of inner bag 20G is laid over a periphery of inlet opening 11 of outer bag 15 so that two arms 23F and 23B extend along the diametral direction of inlet opening 11. As shown in FIG. 28D, inner bag 20G is flattened in an expanded manner toward a direction orthogonal to joint edge 39 so that joint edge 39 falls in with the diametral direction of inlet opening 11 and is placed over inlet opening 11. Further as shown in FIG. 28E, opposing top portion 22 is folded over inner bag 20G on a valley crease VF2 extending orthogonal to joint edge 39 which is congruent with the diametral direction of inlet opening 11. Inner bag 20G is housed inside outer bag 15 in the above manner.

Outlet openings 27 formed on inner bag 20G are disposed symmetrically relative to a straight center line IC, which coincides with joint edge 39, on two arms 23F and 23B in a state where inner bag 20G is housed inside outer bag 15 in a flattened manner. In the fourth embodiment, inner bag 20G includes four outlet openings 27 all having the same round contours. These openings 27 are disposed symmetrically relative to center line IC or joint edge 39 in each of arms 23F and 23B as shown in FIGS. 28E and 29A.

When inner bag 20G is housed inside outer bag 15, a retainer 41 is put inside inner bag 20G in advance so that bolts 41a project from mounting holes 13, and then bolts 41a come to project from mounting holes 13 of outer bag 15 (FIGS. 30 and 31).

Thereafter, airbag 10G is folded up as shown in FIGS. 29A, 29B and 29C. In the fourth embodiment, it is folded up through following first and second folding steps.

In the first folding step, preliminarily, inner bag 20G is housed inside outer bag 15 in a state where opposing top portion 22 is folded over inner bag 20G on crease VF2. Meanwhile, airbag 10G is flattened in such a manner that driver side wall 17 of outer bag 15 is laid over vehicle body side wall 16 and inlet opening 11 is located at the center of airbag 10G. Then as shown in FIGS. 29A and 29B, airbag 10G is folded so that both edges 10c and 10d of airbag 10G in a direction orthogonal to joint edge 39 of inner bag 20G are brought close to inlet opening 11, so that the width of airbag 10G in the direction orthogonal to joint edge 39 is reduced. In the fourth embodiment, joint edge 39 extends along center line IC which runs along the front-rear direction of inlet opening 11. That is, in the first folding step, airbag 10G is folded so that a left edge 10c and a right edge 10d of airbag 10G, i.e. a left edge 15g and right edge 15h of outer bag 15 are brought close to inlet opening 11. At this time, in the fourth embodiment, airbag 10G is folded in a bellows fashion to provide left and right folded portions 10e and 10f on both sides of center line IC, and folded portions 10e and 10f are placed on driver side wall 17. Especially, it is essential that folded portions 10e and 10f are folded symmetrically relative to center line IC. Of course, since flattened outer bag 15 before being folded up has a contour in which its left and right semicircular areas are symmetric about center line IC, folded portions 10e and 10f are easily formed symmetrically.

In the second folding step, airbag 10G is folded so that both edges of airbag 10G in an extending direction of joint edge 39 of inner bag 20G are brought close to inlet opening 11, and the width of airbag 10G in the extending direction of joint edge 39 is reduced. In the fourth embodiment, airbag 10G is folded so that a front edge 10a and a rear edge 10b of airbag 10G, i.e. a front edge 15d and rear edge 15b of outer bag 15 are brought close to inlet opening 11. In the second folding step, too, front and rear areas are folded up symmetrically. More specifically, the front and rear intermediate areas from inlet opening 11 to front edge 10a and rear edge 10b are rolled up and then front edge 10a and rear edge 10b are located on top of inlet opening 11 so that front edge 10a and rear edge 10b confront each other as shown in FIG. 29C. Thus airbag 10G is folded up and mounted on a steering wheel as in the first embodiment.

When airbag 10G is inflated at the operation of airbag apparatus M4, inner bag 20G inflates in such a manner as indicated by phantom lines in FIGS. 30 and 31, and then deflates as indicated by solid lines. At this time, if height adjusting portion 28 is formed with a greater distance OL from top 22a of opposing top portion 22, the upper edge length LU, which is the length of the upper edge line of inner bag 20G connecting leading end portions 26 of arms 23F and 23B at the side opposing inlet opening 11, is reduced. Accordingly, provided that inner bag 20G is inflated by itself, leading end portions 26 of arms 23F and 23B are less warped and a distance between opening plane OP of inlet opening 11 and leading end portions 26 drawing away from opening plane OP along the direction of leading end portions 26 holding down peripheral defected region 16a of the outer bag. Consequently, the pressing force PW of leading end portions 26 of arms 23F and 23B pressing peripheral defected region 16a of the outer bag 15 at the completion of inflation of inner bag 20G is reduced as indicated by the phantom lines in FIG. 31. To the contrary, if height adjusting portion 28 is formed with a reduced distance OL from top 22a of opposing top portion 22, the upper edge length LU is elongated. Hence, provided that inner bag 20G is inflated by itself, leading end portions 26 of arms 23F and 23B are warped significantly and the distance between opening plane OP of inlet opening 11 and leading end portions 26 drawing away from opening plane OP along the direction of leading end portions 26 holding down peripheral defected region 16a of the outer bag is enlarged. Consequently, the pressing force PW of leading end portions 26 of arms 23F and 23B pressing peripheral defected region 16a of the outer bag 15 at the completion of inflation of inner bag 20G is enhanced as indicated by projected lines in FIG. 31.

Therefore, in airbag apparatus M4, the pressing force PW exerted at the inflation of inner bag 20G is controlled easily by adjusting the distance OL between height adjusting portion 28 and top 22a of opposing top portion 22 while using the same sheet member 36G.

In the fourth embodiment, moreover, seam allowance 39a of joint edge or sewn edge 39 is located inside inner bag 20G. With this structure, seam allowance 39a covers and protects sewing threads 14 (FIGS. 28B and 30) used to sew up sheet member 36G from high-temperature and high-pressure inflation gas upon airbag inflation, which prevents sewing threads 14 and joint edge 39 from being damaged.

The structural arrangements described above, such as the preventing the joint edge from breaking by reversing the inner bag and/or the formation of the height adjusting portion, may be applied to the airbags of the first to third embodiments.

Further in the fourth embodiment, joint edge 39 is formed straight from leading end portions 26 of arms 23F and 23B to central area 21 as shown in FIGS. 28A and 28B. In addition, inner bag 20G is housed inside outer bag 15 in a following folded manner at the folding of airbag 10G: the periphery of inlet opening 11 of inner bag 20G is laid over the periphery of inlet opening 11 of outer bag 15, and two arms 23F and 23B extend along the diametral direction of inlet opening 11. Inner bag 20G is flattened in an expanding manner toward the direction orthogonal to joint edge 39 while joint edge 39 falls in with the diametral direction of inlet opening 11 and is placed over inlet opening 11. Further, opposing top portion 22 is folded over inner bag 20G on valley crease VF2 extending orthogonal to joint edge 39 (FIGS. 28E and 29A).

With this structure, inner bag 20G is flattened symmetrically about joint edge 39 or center line IC inside outer bag 15 before airbag 10G is folded up. Accordingly and by valley crease VF2, when airbag 10G is folded up, joint edge 39 is not dislocated toward a direction orthogonal to joint edge 39, thereby inner bag 20G is arranged symmetrically and well-balancedly about inlet opening 11 of outer bag 15. As a result, inner bag 20G emits inflation gas G into outer bag 15 and holds down peripheral defected region 16a of outer bag 15 in a well-balanced manner upon airbag inflation. Moreover, since joint edge 39 is formed straight from leading end portions 26 of arms 23F and 23B to central area 21, when inner bag 20G is flattened in the expanding manner toward the direction orthogonal to joint edge 39 while joint edge 39 falls in with the diametral direction of inlet opening 11 and is placed over inlet opening 11 with the periphery of inlet opening 11 of inner bag 20G laid over the periphery of inlet opening 11 of outer bag 15, the vicinity of opposing top portion 22 is easily flattened with no slack (FIGS. 28D and 28E). Further, opposing top portion 22 is easily folded over inner bag 20G on valley crease VF2. That is, with inner bag 20G of the fourth embodiment, inner bag 20G is easily disposed inside outer bag 15 in a well-balanced flattened manner.

Figure 32:
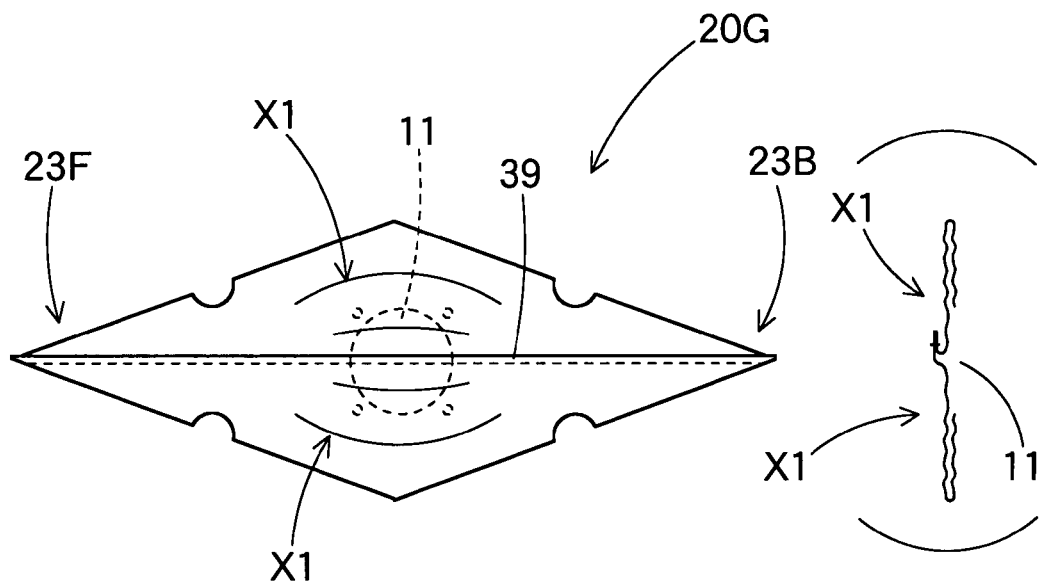
FIG. 32 is a plan view of an inner bag raised as a comparative example to the inner bag of the fourth embodiment, as is housed inside an outer bag.
Figure 33:
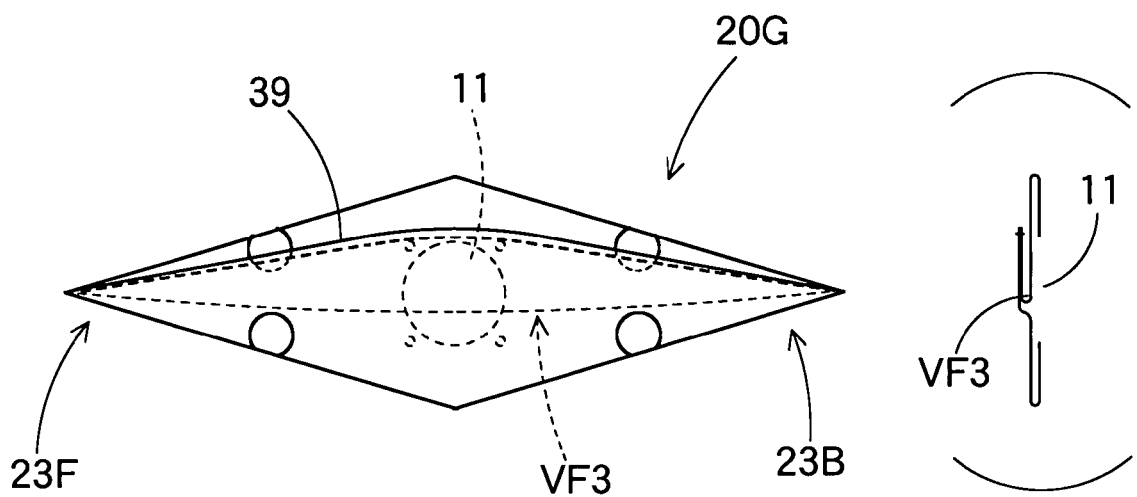
FIG. 33 is a plan view of an inner bag raised as another comparative example to the inner bag of the fourth embodiment, as is housed inside an outer bag.

In comparison, when inner bag 20G is disposed inside outer bag 15, if inner bag 20G is merely flattened in the expanding manner toward the direction orthogonal to joint edge 39 while two arms 23F and 23B extend along the diametral direction of inlet opening 11 and joint edge 39 falls in with the diametral direction of inlet opening 11 as shown in FIG. 32, it is difficult to dispose inner bag 20G in a well-balanced manner against outer bag 15. In this case, slacks or wrinkles X1 around joint edge 39 are likely to cause a slip of joint edge 39 toward the direction orthogonal to joint edge 39 during the folding work of the airbag, and therefore, inner bag 20G cannot be easily disposed inside the outer bag in a well-balanced manner. On the other hand, if, as shown in FIG. 33, a side of the inner bag where inlet opening 11 is located is flattened in a state where two arms 23F and 23B extend along the diametral direction of inlet opening 11 and joint edge 39 is folded over inner bag 20G on a valley crease VF3 connecting leading end portions 26 of arms 23F and 23B, the outer bag will not be inflated in a desired manner. In this case, the inflow of inflation gas will loose a balance between both sides of the inner bag relative to valley crease VF3, so that the outer bag will not be inflated in a well-balanced manner.

Furthermore, if joint edge 39 is formed straight when two arms 23F and 23B extend along the diametral direction of inlet opening 11, inner bag 20G is flattened in an expanding manner toward the direction orthogonal to joint edge 39 while joint edge 39 falls in with the diametral direction of inlet opening 11, and is placed over inlet opening 11, and opposing top portion 22 is folded over inner bag 20G on valley crease VF2 extending orthogonal to joint edge 39, inner bag 20G is disposed inside the outer bag in a stable manner. If, in contrast, joint edge 39 extends in a curved manner as in sheet member 36 shown in FIG. 6B, slacks X2 are caused in the vicinity of valley crease VF2 when opposing top portion 22 is folded on crease VF2 as shown in parenthesis of FIG. 34C, which may dislocate joint edge 39 while folding the airbag and make it difficult to dispose inner bag 20 inside the outer bag in a stable folded-up configuration. Therefore, it is desired that joint edge 39 is formed straight from leading end portions 26 of two arms 23F and 23B to central area 21 in an instance where inner bag 20G is formed by joining overlapped outer edges 36a of sheet member 36G folded into two as in the fourth embodiment.

In the fourth embodiment, airbag 10G is folded up through two steps described above as shown in FIGS. 29A, 29B and 29C. With this folding, upon airbag deployment, airbag 10G is unfolded in a generally reverse order to the folding steps. Specifically, inner bag 20G firstly inflates in such a manner as to extend arms 23F and 23B, i.e., in such a manner as to unfold the folds formed in the second folding step, and then unfolds the folds formed in the first folding step. At this time, folded portions 10e and 10f of airbag 10G are folded symmetrically relative to joint edge 39 of inner bag 20G or center line IC in the first folding step. Moreover, outlet ports 27 of inner bag 20G for feeding inflation gas to outer bag 15 are disposed symmetrically relative to straight joint edge 39 or center line IC in each of arms 23F and 23B. With this arrangement, left and right side areas 15g and 15h of outer bag 15, i.e. both areas of outer bag 15 in the direction orthogonal to joint edge 39 unfold evenly for deployment. That is, above disposition of inner bag 20G inside outer bag 15, above disposition of outlet ports 27 on inner bag 20G, and above folding manner of airbag 10G conduces, in combination, to the even deployment of both sides, i.e., the left and right sides in the fourth embodiment, of airbag 10G relative to the diametral direction of inlet opening 11. That is, when airbag 10G inflates thickly and is developed at its outer edge widely slightly before the completion of inflation, both areas 10c and 10d of airbag 10G symmetric about inlet opening 11, i.e., both areas 10c and 10d of airbag 10G in the direction orthogonal to joint edge 39 of inner bag 20G, are evenly developed and inflated, so that the inflating airbag 10G receives a driver moving toward airbag 10G by its predetermined area in a stable manner.

Especially in the fourth embodiment, it is left and right edges 10c and 10d according to the lateral direction of vehicle at the complete airbag inflation that are brought close to inlet opening 11 in the first folding step. Accordingly, when airbag 10G inflates thickly and is developed at its outer edge widely slightly before the completion of inflation, left and right side areas 10c and 10d of airbag 10G are evenly developed and inflated with no partiality. With this arrangement, if airbag 10G is designed with an enough protection area in the lateral direction, it will protect a driver in a stable manner in the event that the driver moves toward left or right.

In the fourth embodiment, both sides 10c and 10d of airbag 10G in the direction orthogonal to joint edge 39 have been described as are folded in a bellows fashion. However, other folding methods such as a rolling where both sides are rolled from edges 10c and 10d or an irregular rolling illustrated in parenthesis of FIG. 29B, which is a combination of rolling and bellows-folding, can be adopted provided that folded portions 10e and 10f on both sides 10c and 10d are symmetric about joint edge 39 or center line IC.

In addition, various folding methods such as the irregular rolling (refer to parenthesis in FIG. 29C) can be adopted in the second folding step, too.

Figure 34A:
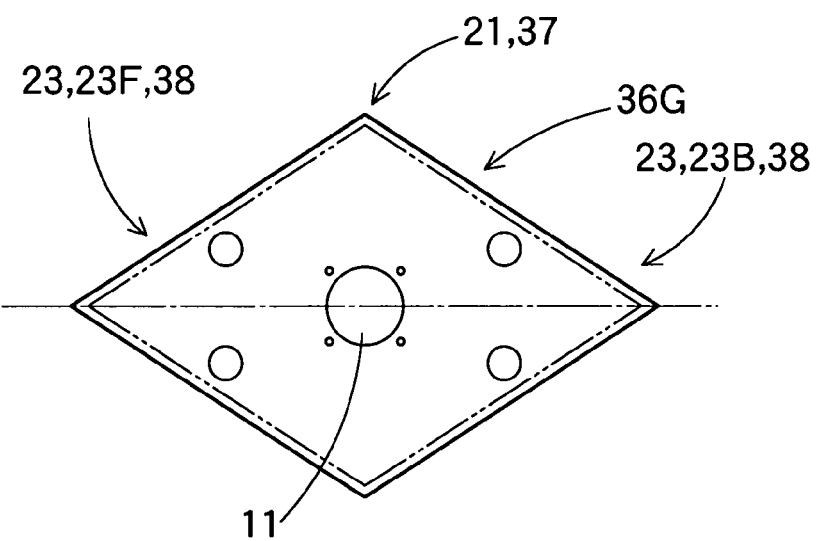
FIGS. 34A, 34B and 34C illustrate a manufacturing process of a modification of the inner bag of the fourth embodiment and the way the inner bag is housed inside an outer bag in order.
Figure 34B:
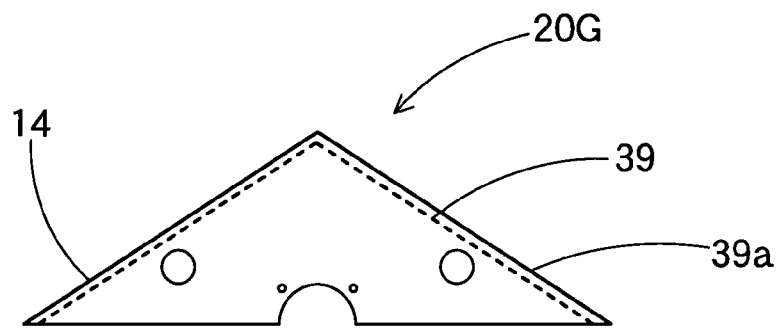
Figure 34C:
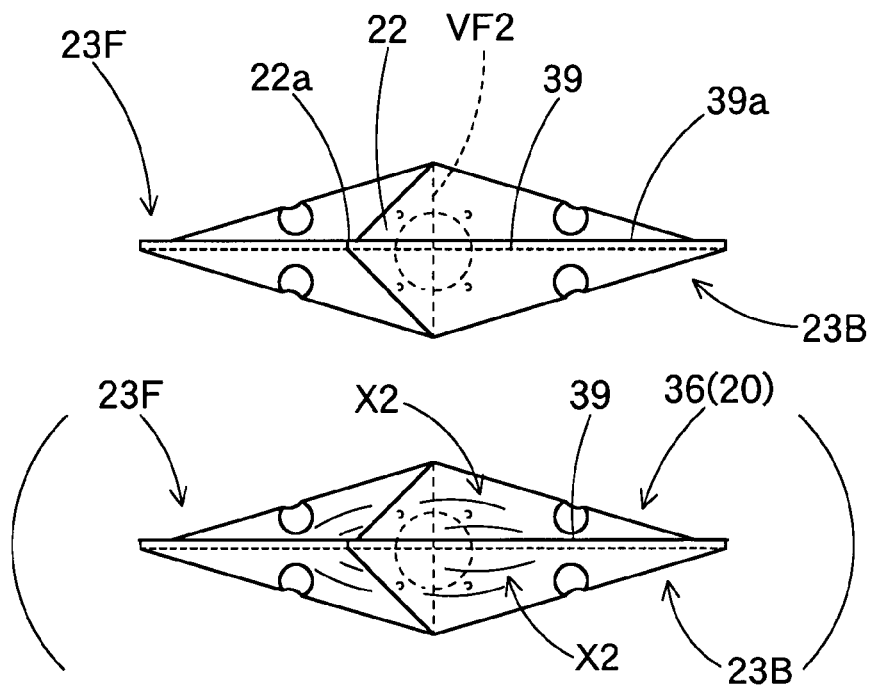

Inner bag 20G of the fourth embodiment is reversed after sheet member 36G is folded into two and sewn up at overlapped outer edges 36a, and has height adjusting portion 28, as shown in FIGS. 28C and 28D. However, the inner bag 20G may be housed inside the outer bag without being reversed or without a height adjusting portion 28, merely such that two arms 23F and 23B extend along the diametral direction of inlet opening 11, inner bag 20G is flattened in such a manner as to expand toward the direction orthogonal to joint edge 39 with joint edge 39 congruous with the diametral direction of inlet opening 11 and placed over inlet opening 11, and that opposing top portion 22 is folded over inner bag 20G on valley crease VF2 extending orthogonal to joint edge 39 (FIGS. 34A to 34C).

Furthermore, the folding method used in the fourth embodiment for airbag 10G and inner bag 20G may be applied not only to airbag apparatus M4 for a steering wheel, but also to airbag apparatus M2 for a front passenger's seat in the second embodiment, the third embodiment in which tops 26a of leading end portions 26 of inner bag 20F are connected to outer bag 15, and a later-described fifth embodiment.

FIGS. 35A to 37B illustrate an airbag apparatus M5 and an airbag 10H according to the fifth embodiment of the invention, which apparatus is adapted to be mounted on a steering wheel. An inner bag 20H of airbag 10H includes two arms 23 extending toward the front and rear upon inflation: a front arm 23F and a rear arm 23B. Front arm 23F and rear arm 23B are designed to extend toward the front and rear overriding top planes PR of a front part RF and rear part RB of ring R at the complete inflation of inner bag 20H. Outer bag 15H is designed to be deployed on top of a femoral area DT of a driver D seated in a driver's seat DS upon inflation, and includes a stopper portion 18 which holds femoral area DT from moving upward upon inflation at the rear edge 15b.

Outer bag 15H is greater in size than outer bag 15 of the first embodiment, and is inflated into a discoid contour having a greater outer diameter than that of ring R while covering top plane of ring R. The outer diameter of outer bag 15H is such that its rear lower side 15c contacts the top of femoral area DT of seated driver D as shown in FIG. 36B. Like above-described outer bag 15, outer bag 15H is provided internally with two unillustrated tethers for regulating the thickness of the inflated outer bag 15H.

Similarly to inner bag 20D shown in FIG. 21, inner bag 20H is formed into a three-dimensional contour (in an uninflated state) by folding a planar sheet member 36D and sewing up predetermined parts of member 36D. However, inner bag 20H is greater in size than inner bag 20D according to the dimension of outer bag 15H. The longitudinal length IL of inner bag 20H at complete inflation is generally equal to the longitudinal length OL of outer bag 15H at complete inflation (FIG. 37B). Accordingly, when inflated, tops 26a of leading end portions 26 of front arm 23F and rear arm 23B hold down front edge 15d and rear edge 15b of outer bag 15H such that peripheral defected region 16a of outer bag 15H, i.e. a front lower side 15e and rear lower side 15c contact top planes PR of front part RF and rear part RB of ring R as shown in FIGS. 35A to 36B.

Airbag apparatus M5 of the fifth embodiment is mounted on a vehicle as in the first embodiment. When apparatus M5 is activated, inflation gas G flow into airbag 10H via inlet opening 11 and inflates airbag 10H, so that airbag 10H opens doors 50a of airbag cover 49 and projects from case or housing 45 to cover top plane PR of ring R as shown in FIGS. 35A and 35B.

Figure 35A:
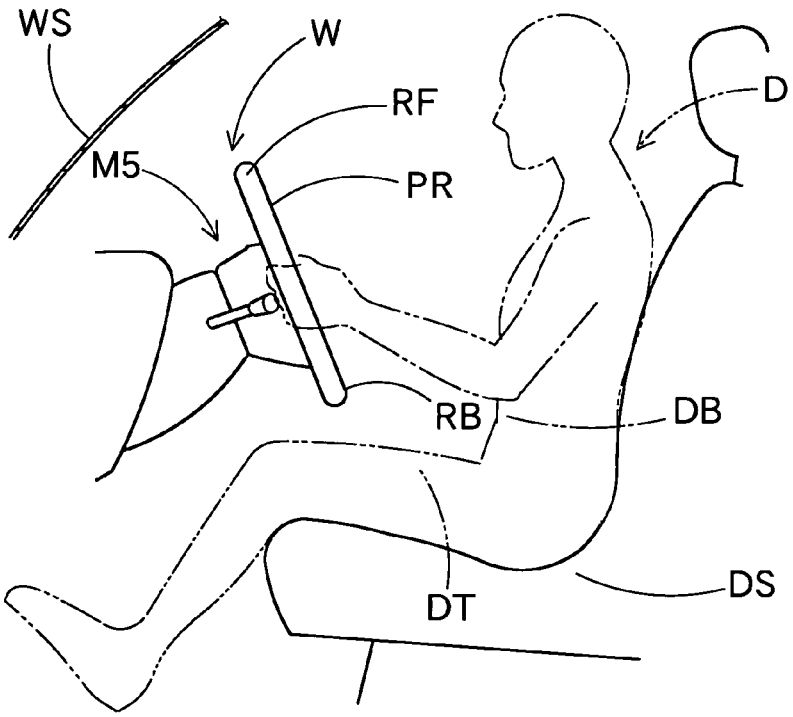
FIGS. 35A, 35B, 36A and 36B are schematic vertical sections showing the operation of an airbag apparatus for a steering wheel of the fifth embodiment in order.
Figure 35A:
Figure 35B:
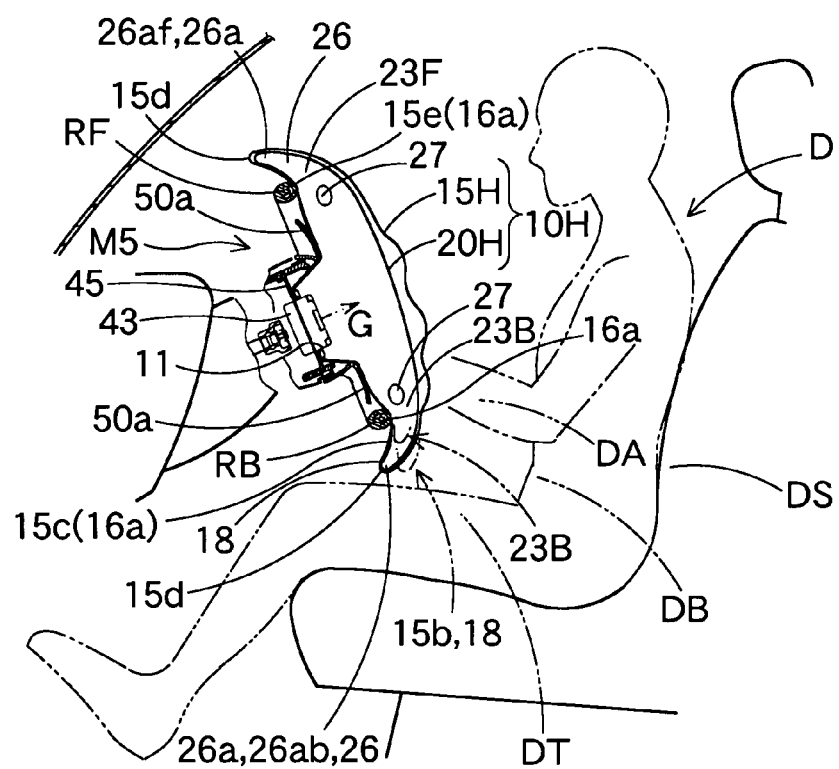
Figure 36A:
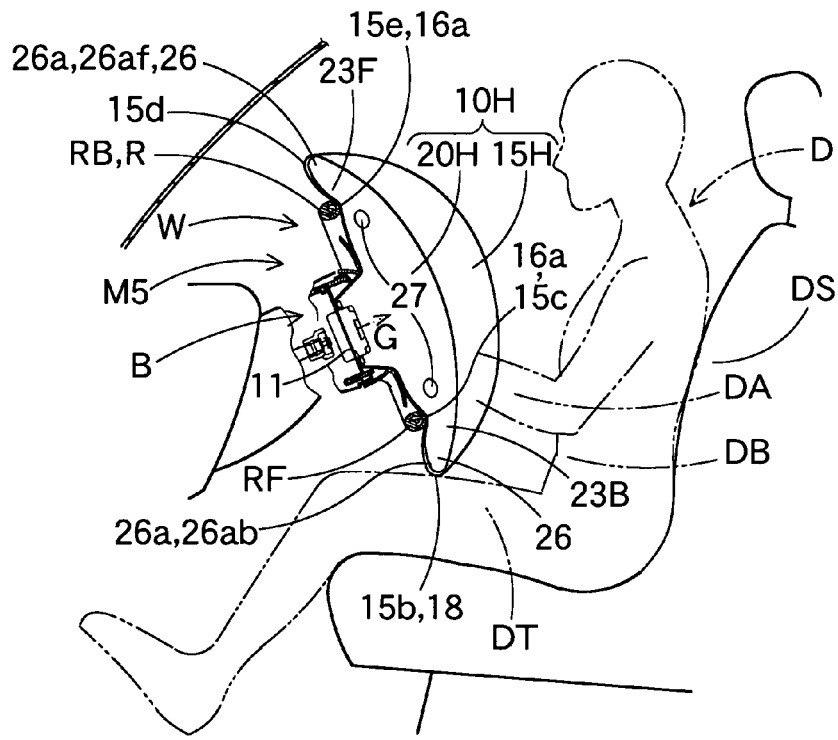
Figure 36B:
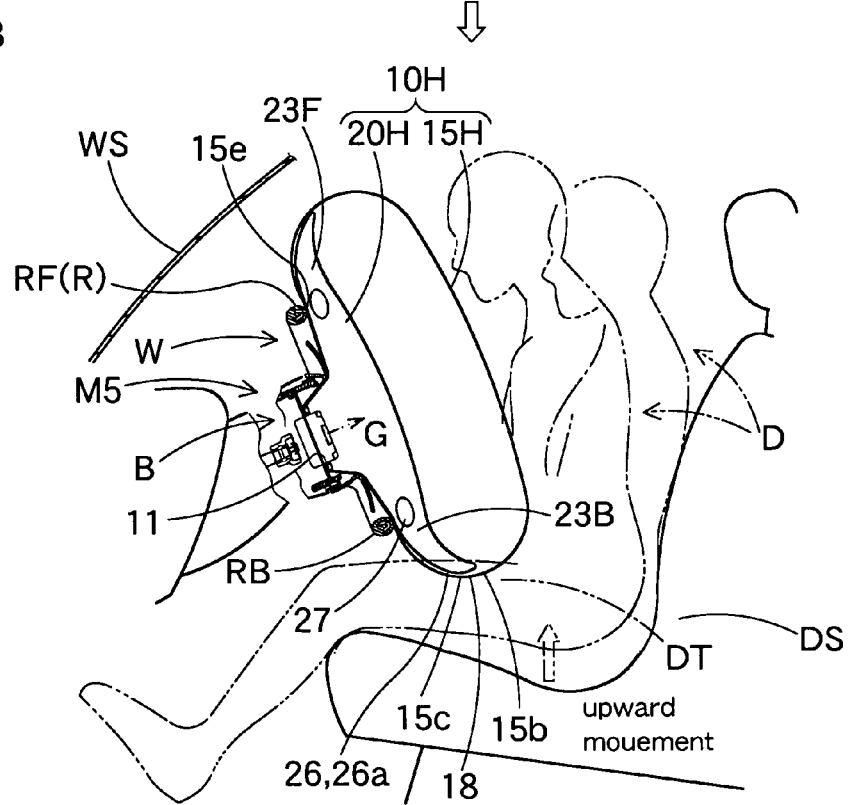
Figure 37A:
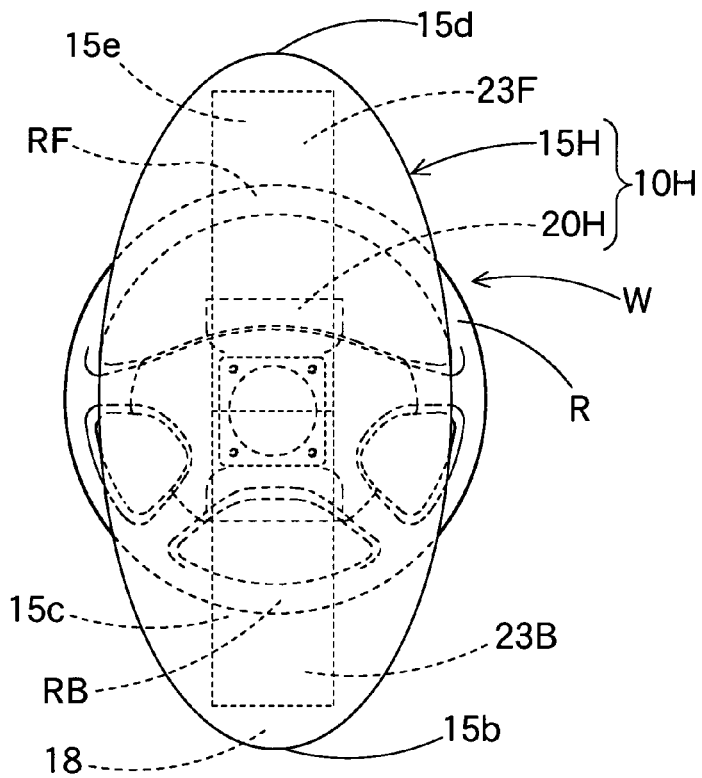
FIGS. 37A and 37B are plan views showing an outer bag used in the airbag apparatus of FIG. 35A being inflated at the operation of the apparatus in order.
Figure 37B:
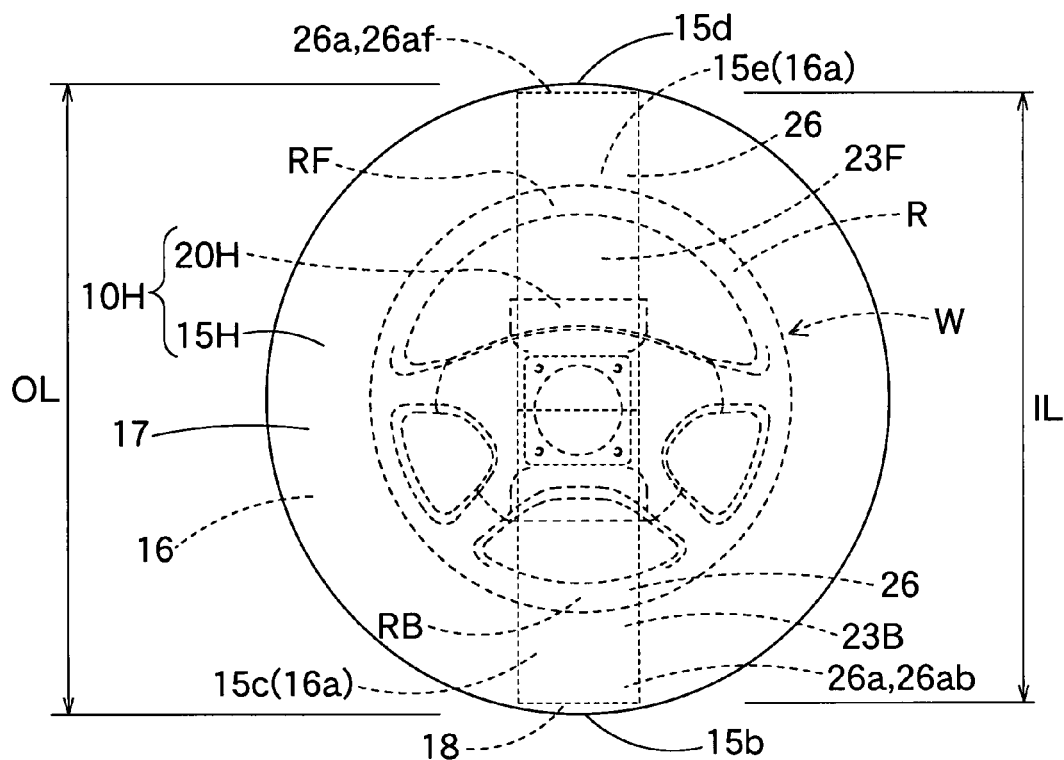

More specifically, in the initial stage of airbag inflation, inner bag 20H completes inflation firstly with inflation gas G fed from inlet opening 11 as shown in FIGS. 35A, 35B and 37A, and then outer bag 15H completes inflation with gas G emitted from outlet ports 27 of inner bag 20H, as shown in FIGS. 36A, 36B and 37B.

When airbag 10H is inflated, stopper portion 18 disposed at rear edge 15b of outer bag 15H is deployed on top of femoral area DT of seated driver D. Accordingly, in the event that the body of driver D is going to float from the seat, stopper portion 18 holds femoral area DT from moving upward and prevents driver's body from floating up and advancing.

As shown in FIGS. 35B and 36A, inner bag 20H is constructed to depress front part RF and rear part RB of ring R downward while remaining completely inflated. Accordingly, once inner bag 20H completes inflation, outer bag 15H easily disposes stopper portion 18 between rear part RB of ring R and an abdomen DB of driver D. Further by inflation of outer bag 15H itself, stopper portion 18 is stably deployed on top of femoral area DT of driver D in an inflated state and holds femoral area DT from moving upward as shown in FIGS. 36A and 36B. The way stopper portion 18 is deployed between rear part RB of ring R and abdomen DB of driver D is advantageous in comparison with an instance where the inner bag is so formed into a contour like a flow regulating cloth as to deploy a stopper portion 18 on outer bag 15H utilizing a flow of inflation gas G, in the following: according to the foregoing embodiment, inner bag 20H securely conducts deployment of stopper portion 18 of outer bag 15H by directly supporting and pushing out stopper portion 18. Then further by inflation of outer bag 15H itself, it securely allows stopper portion 18 to hold femoral area DT of driver D from moving upward.

Moreover, not only rear arm 23B but also front arm 23F of inner bag 20H depresses top plane PR of front part RF of ring R. Accordingly, outer bag 15H deploys keeping front edge 15d side and rear edge 15b side balanced while being suppressed from inflating toward the lateral direction and pressing arms DA of driver D steering straight ahead. Then stopper portion 18 of outer bag 15H is stably deployed between rear part RB of ring R and abdomen DB of driver D.

Therefore, airbag apparatus M5 of the fifth embodiment properly prevents the forward movement of driver D due to floating up of driver's body, and prevents driver D from moving toward wind shield WS.

In the fifth embodiment, inner bag 20H is constructed so that rear end 26ab of rear arm 23B is extended up to the area where it can hold femoral area DT of driver D from moving upward when inflated. When inner bag 20H is inflated in the initial stage of inflation of airbag 10H or outer bag 15H, as shown in FIGS. 35B and 36A, stopper portion 18 of outer bag 15H suppresses the upward movement of femoral area DT by being pushed by inner bag 20H. As a result, once inner bag 20H complete inflation, airbag 10H securely suppresses the upward movement of femoral area DT by stopper portion 18, utilizing rear end 26ab area of inner bag 20H, even before outer bag 15H completes inflation.

Without considering the above advantage, rear arm 23B of inner bag 20H does not have to be extended up to the area where it can suppress the upward movement of femoral area DT of driver D. Alternatively, rear arm 23B may be formed into such a length that it is capable of holding down top plane PR of rear part RB of ring R as indicated by phantom lines in FIG. 35B. With this construction, too, inner bag 20H directly supports stopper portion 18 of outer bag 15H and guides the same to a space between rear part RB of ring R and abdomen DB of driver D upon inflation.

In the fifth embodiment, the longitudinal length IL of inner bag 20H at complete inflation is generally equal to the longitudinal length OL of outer bag 15H at complete inflation. With this construction, outer bag 15H is inflated in a well-balanced manner and with less partial protrusion toward driver D while front lower side 15e of rear part 15d and rear lower side 15c of rear part 15b of outer bag 15H are kept contacted with top planes PR of front part RF and rear part RB of ring R by pressing of front arm 23F and rear arm 23B of inner bag 20H against ring R as shown in FIGS. 36A, 36B, 37A and 37B.

Of course, inner bag 20H of the fifth embodiment is also constructed so that tops 26a of leading end portions 26 of front arm 23F and rear arm 23B are disposed at positions come down from opening plane OP of inlet opening 11 when inner bag 20H is inflated by itself with inflation gas G fed from inlet opening 11 in a fixed state at a peripheral region of inlet opening 11, as in inner bag 20 of the first embodiment. Accordingly, the inflated inner bag 20H holds down front arm 23F and rear arm 23B against ring R intensely so as to deploy stopper portion 18 disposed at rear edge 15b of outer bag 15H between rear part RB of ring R and abdomen DB of driver D further swiftly and easily while in balance with deployment of front edge 15d side of outer bag 15H.

Although inner bag 20H of the fifth embodiment is formed into a three-dimensional contour in an uninflated state, it will also be appreciated to use those like inner bags 20 and 20G shown in FIGS. 7 and 28 which are formed by folding a single sheet member 36/36G having tapered opposite ends into two so that edges in the width direction overlap each other and sewing up the overlapped edges.

Figure 38:
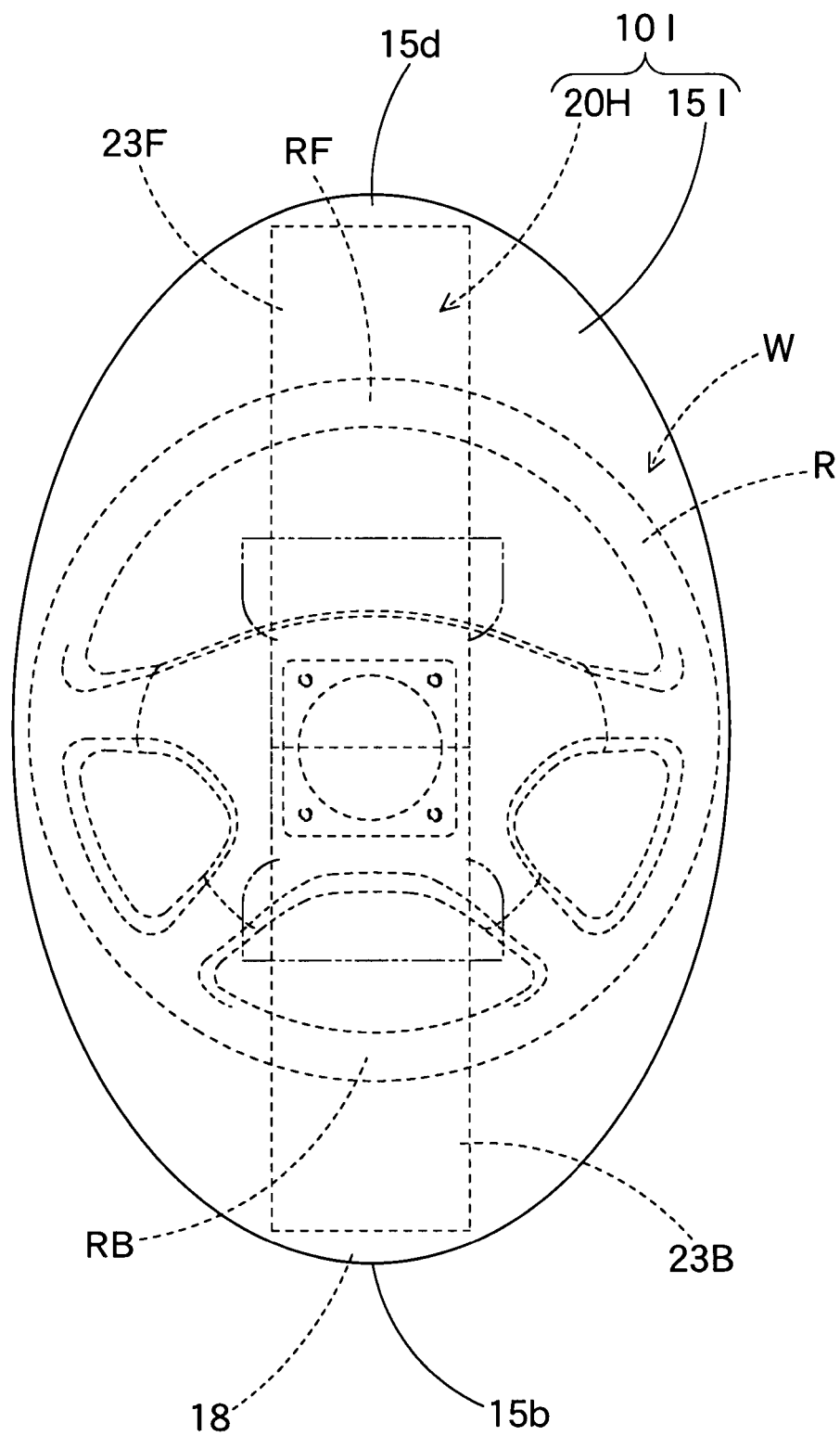
FIG. 38 is a plan view of a modification of the airbag of the fifth embodiment in an inflated state.

Although airbag 10H of the fifth embodiment has a round inflated contour as viewed from above, the airbag or outer bag may be formed into an oval shape elongate in the longitudinal direction and with a reduced lateral width like an outer bag 15I of an airbag 10I shown in FIG. 38. This outer bag 15I is also provided at rear edge 15b with a stopper portion 18 for suppressing the upward movement of femoral area DT of driver D.

Furthermore, it will also be appreciated that the vicinities of tops 26af and 26ab of front arm 23F and rear arm 23B of inner bag 20H of the fifth embodiment are sewn in when outer edges of vehicle body side wall 16 and driver side wall 17 of outer bag 15H are sewn up as in the third embodiment.

Figure 39:
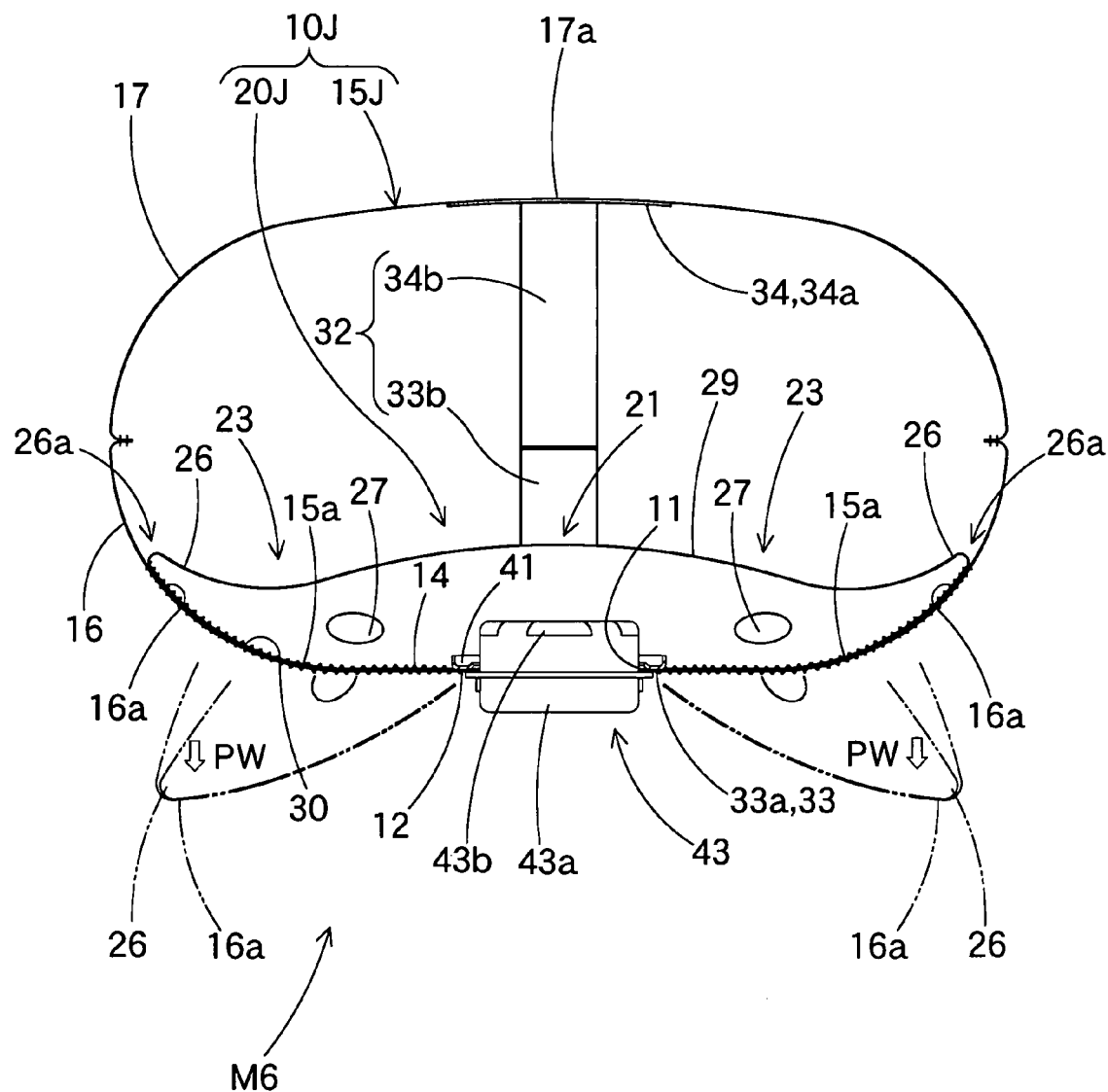
FIG. 39 is a schematic vertical section of an airbag of an airbag apparatus according to the sixth embodiment of the invention taken along the longitudinal direction, which shows an inner bag in a deflated state while the airbag is completely inflated.

As an airbag 10J used in an airbag apparatus M6 for a steering wheel according to the sixth embodiment of the invention shown in FIG. 39, it will further be appreciated that not only tops 26a of leading end portions 26 but areas of inner bag 20J from the vicinity of top 26a of each arm 23 to the vicinity of inlet opening 11 are joined to outer bag 15J by sewing or the like. This inner bag 20J of course has such a contour that arms 23 are inflatable into tapered bag shape capable of holding down a peripheral detected region 16a at full inflation. In the illustrated embodiment, inner bag 20J has the same structure as inner bag 20 of the first embodiment. Inner bag 20J is joined to outer bag 15J by a straight stitch formed on lower wall 30, where inlet opening 11 is located, by sewing yarn 14. With this structure, inner bag 20J is prevented from being dislocated relative to outer bag 15J when inflated. However, since inner bag 20J is joined to outer bag 15J by an extensive straight area between arms 23, inner bag 20J is folded up without being dislocated at all relative to outer bag 15J when folding airbag 10J.

Figure 40:
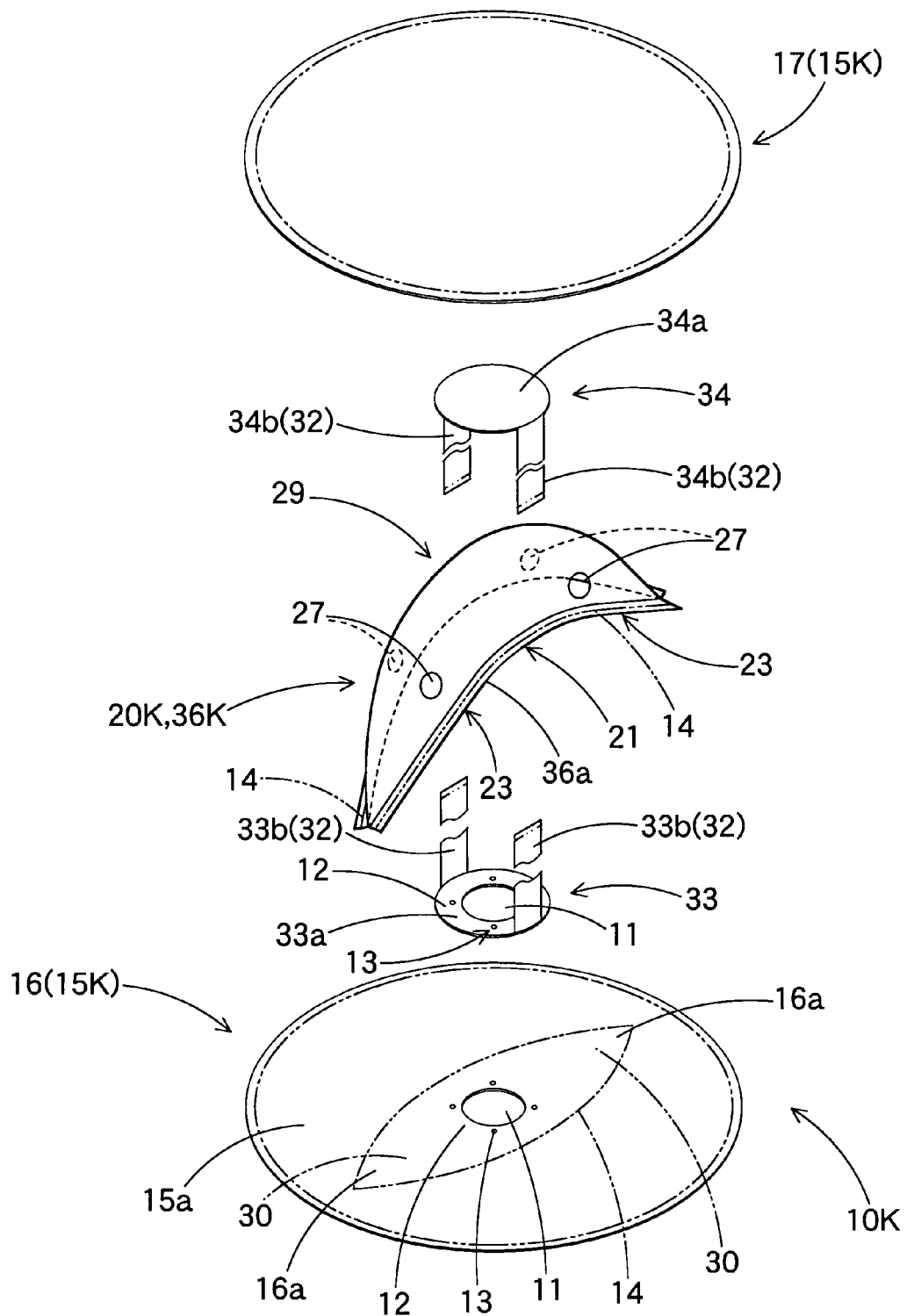
FIG. 40 is an exploded perspective view of components of an airbag used in an airbag apparatus according to the seventh embodiment of the invention.
Figure 41:
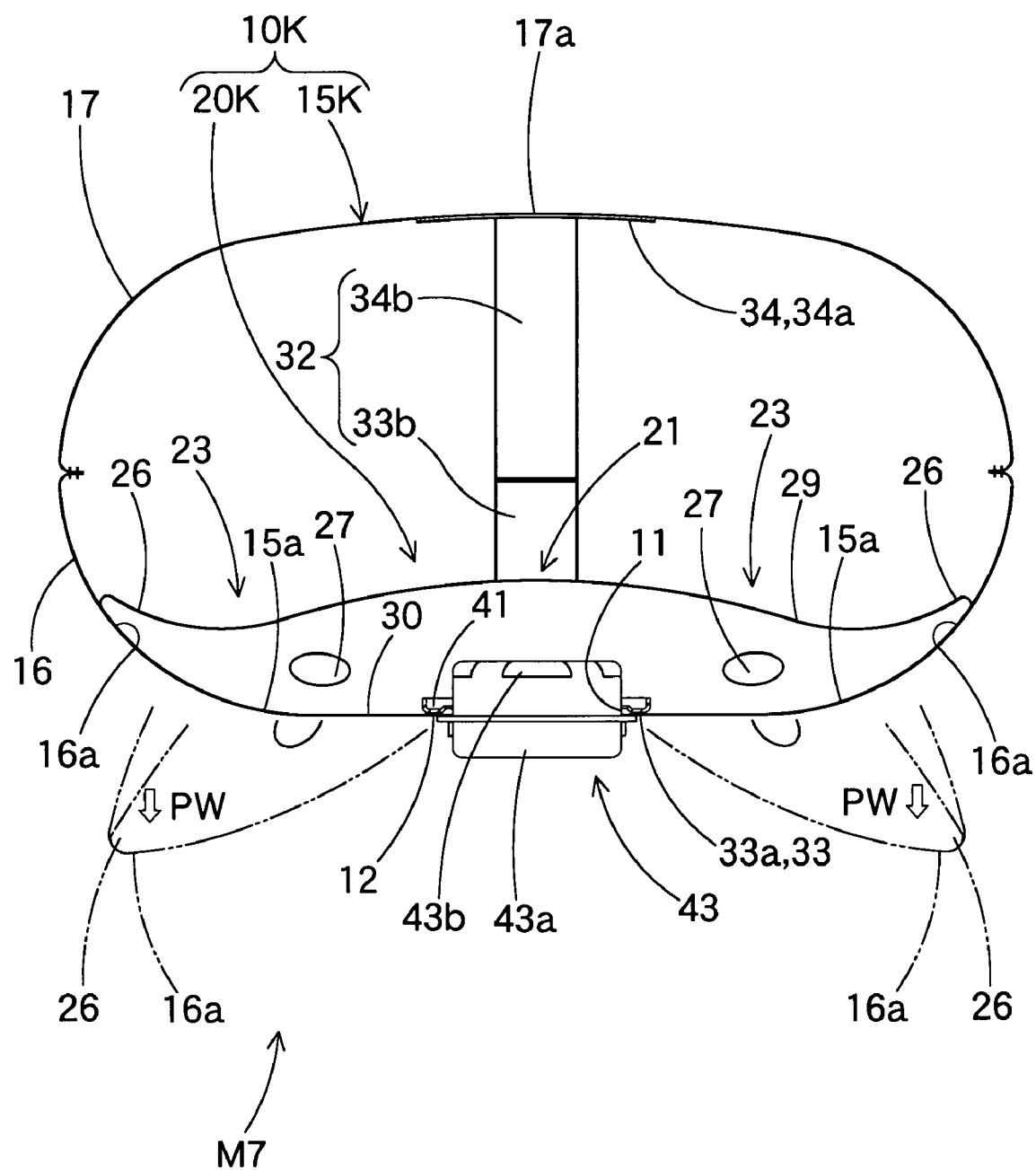
FIG. 41 is a schematic vertical section of the airbag of FIG. 40 taken along the longitudinal direction, which shows an inner bag in a deflated state while the airbag is completely inflated.

In order to join the inner bag to the outer bag by an area between the arms so that the inner bag may not be dislocated relative to the outer bag in the folding work, the airbag may be constructed as an airbag 10K of airbag apparatus M7 for a steering wheel according to the seventh embodiment shown in FIGS. 40 and 41. This inner bag 20K shares its lower wall 30 with outer bag 15K. In the illustrated embodiment, inner bag 20K is joined to outer bag 15K such that an outer edge 36a of sheet member 36K is so disposed to encircle inlet opening 11 of outer bag 15K, and is joined thereto by sewing with sewing yarn 14 or the like. In this inner bag 20K, too, upper wall 29 bulging upward holds down lower wall 30 at full inflation. That is, arms 23 inflated in a tapering manner press peripheral defected portion 16a of outer bag 15K which also serves as lower wall 30. Consequently, in airbag 10K, too, outer bag 15K inflates with its peripheral defected portion 16a suppressed from floating up from members disposed around the housing.

When joining an inner bag to an outer bag or joining outer edges of a sheet member to form an inner bag, the joining work may be conducted using an adhesive other than using sewing yarn 14. Additionally, when inner bag 20J shown in FIG. 39 is adhered to outer bag 15J, a generally whole area of lower wall 30, instead of a straight area between arms 23, may be adhered to outer bag 15J to such a degree that the pressing action of peripheral defected region 16a is not hindered.

What is claimed is:

1. An airbag apparatus comprising an airbag inflatable with inflation gas and a housing for housing the airbag in a folded state, the airbag being attached to the housing at a periphery of an inlet opening thereof for admitting inflation gas therefrom and protruding from the housing when fed with the inflation gas, the airbag including an outer bag constituting an outer wall of the airbag and an inner bag disposed inside the outer bag for covering the inlet opening, the inner bag comprising an outlet port supplying the inflation gas fed from the inlet opening into the outer bag and two arms inflatable into a bag shape with the inflation gas to protrude from the housing in such a manner as to extend in a direction generally orthogonal to an axial direction of the inlet opening, the arms are constructed to hold down a peripheral defected region of the outer bag, which is an area of the outer bag encircling the inlet opening and defected from the housing, onto members disposed around the housing by leading end regions of the two arms facing away from the inlet opening and being disposed at a position below an opening plane of the inlet opening when the inner bag is fed with the inflation gas and is completely inflated, the two arms of the inner bag extending along a diametral direction of the inlet opening from a bulged central area proximate the inlet opening while tapering toward the respective leading end regions, the outlet port of the inner bag is disposed relative to the inlet opening and relative to the leading end regions of the two arms so that circumferential walls of the leading end regions of the two arms inflate when the inner bag is inflated with the inflation gas fed from the inlet opening, relative to a direction that is orthogonal to an extending direction of the two arms, an edge line of the inner bag between the leading end regions of the two arms at a side opposing the inlet opening has a projected shape, and a length of the edge line connecting the leading end regions of the arms at the side opposing the inlet opening is longer than a length of an edge line of the inner bag between the leading end regions of the arms at a side where the inlet opening is located, when the inner bag is inflated with the inflation gas fed from the inlet opening, the inner bag is formed as a single flexible sheet member folded into two halves on a crease and with overlapped outer edges of the sheet member being joined, the crease on which the sheet member is folded is disposed along a region of the completely inflated inner bag connecting the leading end regions of the two arms at the side where the inlet opening is located, a joint edge, which is formed by joining the outer edges of the sheet member, is disposed on a region of the completely inflated inner bag connecting the leading end regions of the arms at the side opposing the inlet opening, and the sheet member has a flattened contour whose width in a direction orthogonal to the crease is reduced from a central region constituting the central area of the inner bag toward the leading end regions of the two arms of the inner bag.

2. The airbag apparatus as set forth in claim 1, wherein the outlet port of the inner bag is disposed so that an outflow direction of inflation gas flowing out of the outlet port at the complete inflation of the inner bag falls within a range of angle from a direction generally orthogonal to the holding direction of the leading end portion of the inner bag toward the members disposed around the housing to a direction opposite from the holding direction, such that the arm is prevented from moving.

3. The airbag apparatus as set forth in claim 1, wherein the two arms of the inner bag are separable from an inner surface of the outer bag except at least the respective leading end portions of the two arms.

4. The airbag apparatus as set forth in claim 1, wherein the respective leading end portions of the two arms of the inner bag are joined to the respective peripheral defected regions of the outer bag.

5. The airbag apparatus as set forth in claim 1, wherein the inner bag is formed by sewing up the sheet member with a seam allowance of the joint edge formed in the sewing work disposed inside the inner bag.

6. The airbag apparatus as set forth in claim 1, wherein:
the joint edge of the inner bag is formed straight from the leading end regions of the arms to the central area; and
the inner bag is disposed in a flattened manner inside the outer bag when the airbag is folded up to be housed in the housing in a state where:
the two arms extend along the diametral direction of the inlet opening;
the inner bag is expanded toward a direction orthogonal to the joint edge while the joint edge is congruent with the diametral direction of the inlet opening and is placed over the inlet opening; and
an opposing top portion of the inner bag opposing the inlet opening and facing away from the inlet opening at the central area is folded over the inner bag on a valley crease extending orthogonal to the joint edge.

7. The airbag apparatus as set forth in claim 6, wherein:
the airbag is folded up through:
a first step of reducing a width of the airbag in the direction orthogonal to the joint edge of the inner bag by bringing both edges of the airbag in the direction orthogonal to the joint edge of the inner bag close to the inlet opening from a flattened state around the inlet opening with the inner bag housed inside the outer bag; and
a second step of reducing a width of the airbag in an extending direction of the joint edge of the inner bag by bringing both edges of the airbag in the extending direction of the joint edge close to the inlet opening;
both areas of the airbag relative to the joint edge of the inner bag are folded up symmetrically relative to the joint edge in the first folding step; and
the outlet ports are formed symmetrically relative to the straight joint edge of the inner bag on each of the two arms in a state where the inner bag is housed inside the outer bag in the flattened manner.

8. The airbag apparatus as set forth in claim 7, wherein:
left and right edges of the airbag according to the lateral direction of vehicle at a complete airbag inflation are brought close to the inlet opening in the first folding step.

9. The airbag apparatus as set forth in claim 1, wherein:
the inner bag is formed by sewing up the sheet member;
the inner bag includes:
  the joint edge formed by sewing up the outer edges of the sheet member folded into two; and
  a height adjusting portion for changing deployed positions of the leading end regions of the two arms deployed away from the opening plane of the inlet opening along the holding direction of the leading end regions holding down the peripheral defected region of the outer bag when the inner bag is hypothetically inflated by itself; and
the height adjusting portion is formed by:
firstly flattening the inner bag having the joint edge by folding the inner bag on a valley crease extending along the diameter direction of the inlet opening and orthogonal to the joint edge so that the arms are overlapped with each other at the side where the inlet opening is located, and by folding an opposing top portion, which opposes the inlet opening and faces away from the inlet opening at the central area, on crest creases continuing from opposite ends of the valley crease;
then forming a straight sewing line on the opposing top portion, the sewing line being offset toward the valley crease from a top of the opposing top portion and extending in parallel to the valley crease.

10. The airbag apparatus as set forth in claim 1, wherein:
the apparatus is adapted to be mounted on a steering wheel comprising a ring for holding at the time of steering operation, a boss area disposed at the center of the ring, and spokes interconnect the ring and the boss area;
the housing of the airbag is disposed on top of the boss area of the steering wheel; and
the inner bag is constructed so that the leading end region of each of two arms reaches a position getting on a top plane of the ring disposed around the housing when inflated at the operation of the airbag apparatus.

11. The airbag apparatus as set forth in claim 10, wherein:
the two arms comprise a front arm and a rear arm that extend toward the front and rear overriding the top planes of a front part and a rear part of the ring at the complete inflation of the inner bag; and
the outer bag includes a stopper portion at a rear edge thereof, the stopper portion being deployable on top of a femoral area of a seated driver upon inflation to hold the femoral area from moving upward.

12. The airbag apparatus as set forth in claim 11, wherein a rear end of the rear arm of the inner bag is extended up to an area where the rear end is capable of holding the femoral area of the driver from moving upward when inflated.

13. The airbag apparatus as set forth in claim 12, wherein a longitudinal length of the inner bag at complete inflation is generally equal to a longitudinal length of the outer bag at complete inflation.

14. The airbag apparatus as set forth in claim 1, wherein:
the apparatus is adapted to be mounted on an instrument panel in front of a front passenger's seat;
the housing is mounted on the instrument panel; and
the inner bag is constructed so that the leading end region of each of the arms is extended to a position getting on a surface side of the instrument panel disposed around the housing when inflated at the operation of the airbag apparatus.

15. An airbag apparatus comprising:
a housing;
an airbag inflatable with inflation gas and housed in a folded state within the housing, the airbag being attached to the housing at a periphery of an inlet opening thereof and protruding from the housing when inflated with inflation gas, the airbag including
an outer bag forming an outer wall of the airbag and an inner bag disposed inside the outer bag for covering the inlet opening,
the inner bag comprising an outlet port supplying the inflation gas fed from the inlet opening into the outer bag and two arms inflatable into a bag shape with inflation gas to protrude from the housing in such a manner as to extend and taper in both an inflated state and deflated state in a direction generally orthogonal to an axial direction of the inlet opening,
the two arms, when inflated, being constructed to hold down a peripheral defected region of the outer bag encircling the inlet opening onto members disposed around the housing at a position below an opening plane of the inlet opening when the inner bag is inflated with the inflation gas.

16. The airbag apparatus as recited in claim 15, wherein the two arms of the inner bag taper along a diametral direction of the inlet opening from a bulged central area proximate the inlet opening toward respective leading end regions.

* * * * *